US011757289B2

(12) United States Patent
Carré et al.

(10) Patent No.: US 11,757,289 B2
(45) Date of Patent: Sep. 12, 2023

(54) CIRCUITS, DEVICES, METHODS AND SYSTEMS TO SECURE POWER-UP FOR BATTERY OPERATING DEVICES EVEN WITH LOW CURRENT CHARGERS AND TO EXECUTE OTHER PERFORMANCES

(71) Applicant: TEXAS INSTRUMENTS INCORPORATED, Dallas, TX (US)

(72) Inventors: Jean-Yves Carré, Antibes (FR); Pasi Juha Matias Palojärvi, Oulu (FI)

(73) Assignee: Texas Instruments Incorporated, Dallas, TX (US)

( * ) Notice: Subject to any disclaimer, the term of this patent is extended or adjusted under 35 U.S.C. 154(b) by 203 days.

(21) Appl. No.: 17/151,698

(22) Filed: Jan. 19, 2021

(65) Prior Publication Data

US 2021/0167606 A1  Jun. 3, 2021

Related U.S. Application Data

(60) Continuation of application No. 15/798,194, filed on Oct. 30, 2017, now Pat. No. 10,931,120, which is a division of application No. 13/449,900, filed on Apr. 18, 2012, now Pat. No. 9,806,547.

(30) Foreign Application Priority Data

Sep. 29, 2011 (EP) .................................... 11290452

(51) Int. Cl.
*H02J 7/00* (2006.01)
(52) U.S. Cl.
CPC .............. *H02J 7/00* (2013.01); *H02J 7/0068* (2013.01)

(58) Field of Classification Search
CPC .................................. H02J 7/00; H02J 7/0068
USPC .......................................... 320/103, 134–136
See application file for complete search history.

(56) References Cited

U.S. PATENT DOCUMENTS

| 5,844,884 | A | 12/1998 | Szlenski |
| 6,191,551 | B1 | 2/2001 | Fischer et al. |
| 6,208,114 | B1 | 3/2001 | Jones et al. |
| 6,271,605 | B1 | 8/2001 | Carkner et al. |
| 6,789,026 | B2 | 9/2004 | Barsoukov et al. |
| 6,832,171 | B2 | 12/2004 | Barsoukov et al. |

(Continued)

OTHER PUBLICATIONS

Maxim. Switch-Mode, Linear, and Pulse Charging Techniques for Li+ Battery in Mobile Phones and PDAs. App Note AN913, 2001. (5 pages).

(Continued)

*Primary Examiner* — Richard V Muralidar
(74) *Attorney, Agent, or Firm* — Carl G. Peterson; Frank D. Cimino

(57) ABSTRACT

An electronic power control circuit includes a power conditioner circuit (120, 130) having a charging input line (116), a battery-related line (133) of the power conditioner circuit (120, 130), and a power voltage output line (137); and an anti-crash loop mechanism (170) coupled to the battery-related line (133) and to the power voltage output line (137) of the power conditioner circuit (120, 130), the anti-crash loop mechanism (170) having a control output line (172, PWGOOD) to be selectively active and inactive in response to voltage levels over time on the battery-related line (133) and on the power voltage output line (137) of the power conditioner circuit (120, 130).

20 Claims, 31 Drawing Sheets

(56) References Cited

U.S. PATENT DOCUMENTS

| | | | |
|---|---|---|---|
| 6,856,922 B1 | 2/2005 | Austin et al. | |
| 6,892,148 B2 | 5/2005 | Barsoukov et al. | |
| 7,443,140 B2 | 10/2008 | Barsukov et al. | |
| 7,808,244 B2 | 10/2010 | Barsoukov et al. | |
| 7,856,328 B2 | 12/2010 | Barsoukov et al. | |
| 8,049,465 B2 | 11/2011 | Barsoukov et al. | |
| 8,050,657 B2 | 11/2011 | Hollander | |
| 8,368,358 B2 * | 2/2013 | Kim | H02J 7/00 320/162 |
| 9,515,502 B2 * | 12/2016 | Kim | H02J 7/0036 |
| 9,806,547 B2 * | 10/2017 | Carre | H02J 7/00 |
| 10,931,120 B2 * | 2/2021 | Carré | H02J 7/00 |
| 2005/0029988 A1 | 2/2005 | Tran | |
| 2005/0046391 A1 | 3/2005 | Veselic et al. | |
| 2007/0052391 A1 | 3/2007 | Kim | |
| 2009/0085737 A1 | 4/2009 | Estevez et al. | |
| 2009/0261786 A1 | 10/2009 | Hsu et al. | |
| 2009/0295397 A1 | 12/2009 | Barsukov | |
| 2012/0049802 A1 | 3/2012 | Barsukov et al. | |

OTHER PUBLICATIONS

USB Implementers Forum. Battery Charging Specification Revision 1.2. Dec. 7, 2010. (4 pages). http://www.usb.org/developers/devclass_docs.

* cited by examiner

CIRCUITS, DEVICES, METHODS AND SYSTEMS TO SECURE POWER-UP FOR BATTERY OPERATING DEVICES EVEN WITH LOW CURRENT CHARGERS AND TO EXECUTE OTHER PERFORMANCES

CROSS-REFERENCE TO RELATED APPLICATIONS AND PATENTS

This application is a continuation of U.S. patent application Ser. No. 15/798,194, filed Oct. 30, 2017, which is a divisional of U.S. patent application Ser. No. 13/449,900, filed Apr. 18, 2012, now U.S. Pat. No. 9,806,547, which is related to European Patent Application "Circuits, Devices, Methods and Systems to Secure Power-Up for Battery Operating Devices Even with Low Current Chargers and to Execute Other Performances" application Ser. No. 11/290,452.9/EP11290452, filed Sep. 29, 2011, for which priority is claimed under the Paris Convention under 35 U.S.C. 119 and all other applicable law, and both of which are incorporated herein by reference in their entirety.

This application is related to US Patent Application Publication 20080307240 "Power Management Electronic Circuits, Systems, and Methods and Processes of Manufacture" (TI-60478) dated Dec. 11, 2008, which is hereby incorporated herein by reference in its entirety.

This application is related to U.S. Pat. No. 6,892,148 "Circuit and Method for Measurement of Battery Capacity Fade" (TI-35733) dated May 10, 2005, and U.S. Pat. No. 7,443,140 "Method and Apparatus for Operating a Battery to Avoid Damage and Maximize Use of Battery Capacity by Terminating Battery Discharge" (TI-60811) dated Oct. 28, 2008, each of which patents are hereby incorporated herein by reference.

BACKGROUND

The field of the invention relates to integrated circuits such as processor circuits, digital logic circuits, mixed-signal integrated circuits, analog circuits and ASICs (application specific integrated circuits) and to other circuits that connect to battery chargers, batteries, and other power sources such as for electronic devices generally, and pertains to battery management and/or power management circuitry for mobile devices and wireless devices. Some forms of such circuitry may connect to a USB (universal serial bus) type of charger or other possibly-low-current type of charger.

USB charging for mobile equipments has became very popular, especially in Asia and Europe where it has been promoted as a universal charging solution by the Chinese government and the European Commission. USB charging potentially can offer user convenience and economy if it can make a separate battery charger unnecessary for one or more battery powered devices. Both the charger adapter and mobile equipment sides of USB charging systems are specified by standards like the Battery Charging Specification version 1.2. Specified electrical requirements as well as detection and control mechanisms are supposed to guarantee system functionality, manufacturer interoperability and seamless user experience.

USB, originally for the personal computer PC industry, allows many peripherals (devices) to be connected to a PC host for serial data transfers. USB can provide power as well to the devices via a tiered star topology, wherein a device is connected to a hub through a downstream port. Hubs may provide several downstream ports and a single upstream port, and hubs can be cascaded to provide many downstream ports for devices. Hubs provide power on ports through a VBUS bus line. USB port power capability is specified in unit loads, where one unit load can be 100 mA (milliamperes of electrical current). In a self-powered hub, externally-sourced power (often up to five 5 unit loads) goes to the USB downstream port, and the hub itself may also draw up to 1 unit load. In a bus-powered hub, power comes on a bus from the facing USB port, e.g. up to 5 unit loads; and power is then split for downstream ports and hub internal power. Self-powered and Low-powered devices may receive power up to one (1) unit load, and High-powered devices may receive up to five (5) unit loads. These definitions of port power consumption and capabilities might result in insufficient power for some devices or in some scenarios.

Using charger power or USB power to charge a battery can be vital to support primary device functions such as providing mass storage for documents, transferring multimedia content, calendar and email synchronization, modem accessing a global network, printing, GPS positioning, etc. Accordingly, the device might be set up in a recognized manner to report no more than one (1) unit load during a reporting process called enumeration to get supported by a USB system upstream. But with present battery capacities in the 1 Ah (ampere-hour) range, a five (5) unit load downstream port capability would be desired when possible. Host can choose the power configuration depending on its downstream port power capability as well as its own energy management, but may be prevented by its operating system from supporting some multiple configurations, and may also be influenced by a suspend state in the host. A dead battery might not only prevent a device from enumerating, but leave host prevented from charging it.

In an OTG 2.0 technology, power is provided to the bus VBUS or receives the power from the bus. In a Session Request Protocol (SRP) host can decide to un-power and restore power to the VBUS line. In OTG, host is called an A-device that always provides power to bus, and a peripheral is B-device that always receives power from a bus; and these roles can be negotiated. Some applications include connecting USB headset to a mobile phone or MP3 player, or a pod providing power and speakers for MP3 player, a docking station providing power to USB peripherals, a car kit providing a large touch-screen display and battery charging, and/or direct connection between two portable devices for file exchange, synchronization, connecting mass storage, etc.

For example if a battery powered mobile acting as A-device detects a headset, it could allow 100 mA to it. If the same A-device detects a battery powered peripheral reporting multiple power configurations, it might choose to provide no current at all. And if the same A-device detects a 500 mA PC mouse, it might shut down its VBUS and inform user of a non-supported peripheral.

Also, a number of low-cost charger adapters may comply with a country's specifications but be outside standard specifications in some other country. Some marginal or low-cost charger adapters may not comply with any particular standards at all, and might proliferate in emerging market areas with at least some penetration in more-developed market areas of the world as well. In systems where it is possible to supply a processor or other functional circuit directly with the charger adapter without the battery being previously charged, such systems might detect and identify the charger adapter to make sure it can deliver enough power for supplying the system. In such case, a charger identification status signal could be used as an input as a condition to be met before permitting the device to power-up. If a marginal or non-standard charger adapter can defeat the charger adapter identification process so that charger adapter identification process results in wrong identification of a marginal or non-standard charger adapter as allowable, then such identification-based system may take the decision to power-up and then crash the system. This problem can happen especially with USB charger adapters because of their potentially-insufficient current for charging particular systems or in particular scenarios. Moreover, a low-current charger adapter of whatever type may crash a device if use is attempted with or without concurrent charging of the device battery. If a system is arranged to not thus permit the charger adapter to supply the system, the user is left unable to use the system while the battery is being charged even by an adequate charger or in a scenario where sufficient current is indeed available.

A problem for mobile equipment makers thus is to provide users with mobile devices and other types of electronic devices that can support low-current chargers generally and this wide variety of charger adapters that have unknown or less than fully known characteristics or that may be insufficient on a scenario-specific basis, without affecting device robustness and user experience with chargers defined by and compliant with industry standards. Accordingly, significant technological departures are called for and would be most desirable in this technology field.

SUMMARY OF THE INVENTION

In general, and in a form of the invention, an electronic power control circuit includes a power conditioner circuit having a charging input line, a battery-related line of the power conditioner circuit, and a power voltage output line; and an anti-crash loop mechanism coupled to the battery-related line and to the power voltage output line of the power conditioner circuit, the anti-crash loop mechanism having a control output line to be selectively active and inactive in response to voltage levels over time on the battery-related line and on the power voltage output line of the power conditioner circuit.

In general, and in another form of the invention, an electronic power control circuit article includes a power conditioner circuit having a charging input line, a battery-related line of the power conditioner circuit, and a power output line, and an anti-crash loop mechanism having comparison circuitry coupled to the battery-related line and to the power output line of the power conditioner circuit to make threshold-based comparisons, the anti-crash loop mechanism having a control circuit responsive to the comparison circuitry to make a control output line of the control circuit selectively active and inactive in response to the threshold-based comparisons over time on the battery-related line and the power output line of the power conditioner circuit.

In general, a further form of the invention involves an electronic control circuit for use with a rechargeable battery. The electronic control circuit includes a powering circuit having an electrical input, a charging output and a voltage output; a functional electronic circuit coupled to the voltage output of the powering circuit, the functional electronic circuit subject to operational interruption if the functional electronic circuit uses more current to usefully operate than is available from the powering circuit; and a safe-start mechanism coupled by at least one input line from the powering circuit and by a control line to the functional electronic circuit, the safe-start mechanism operable to detect a condition indicative of such operational interruption of the functional electronic circuit and to thereafter cause the functional electronic circuit to be substantially powered-down until the charging output indicates sufficient charging to support subsequent useful operation by the functional electronic circuit and the safe-start mechanism operable thereupon to provide a signal coupled to enable such operation by the functional electronic circuit.

In general, a still further form of the invention involves a control process to use with an electronic system, the control process including using a first state to activate a control output to represent a power-good condition, and a second state to inactivate the control output; comparing voltage at a system power voltage line with a first threshold to transition from the first state to the second state when that system line voltage is less than a first threshold, and comparing that system line voltage with a second threshold and a battery line voltage with a third threshold to transition from the second state to the first state when the system line voltage exceeds the second threshold and the battery line voltage exceeds the third threshold.

In general, another further form of the invention involves a mobile electronic device for use with a rechargeable battery and occasionally with energy from a battery charger. The device includes a powering circuit having an electrical energy input, a charging output and a voltage output; a functional electronic circuit coupled to the voltage output of the powering circuit, the functional electronic circuit subject to operational interruption if the functional electronic circuit uses more current to usefully operate than is available from the powering circuit, the functional electronic circuit having a power management circuit with a control input; and an anti-crash loop mechanism having input sense lines coupled to the charging output and the voltage output of the powering circuit and the mechanism having a control line output to activate and inactivate the control input of the power management circuit, the mechanism operable to detect a condition indicative of such operational interruption of the functional electronic circuit from at least one of the input sense lines and free of any input from the functional electronic circuit and to consequently inactivate the control input of the power management circuit, the mechanism further operable thereafter to determine, independent of any charger detection, that a sufficient charging at the charging output has occurred and to signal a power-good determination via the control line output to the control input of the power management circuit to enable operation by the functional electronic circuit, whereby to facilitate dead-battery system start.

Other circuits, articles of manufacture, devices, systems and processes are disclosed and claimed.

Corresponding numerals or designators in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

Various ones of the embodiments provide uncomplicated, reliable electronic processes and circuits for supporting diverse charger adapters and securing system power-up so that the power-up process occurs successfully and is protected from adverse events and so that functional operation of the mobile device itself is initiated successfully from electronic and user viewpoints.

Different kinds of battery management subsystems are responsible for any one, some or all of: 1) Charging the main battery from several possible external supply sources like USB, DC connector, wireless charger, small generator, solar charger, etc. 2) Delivering a system supply to a power management subsystem in charge of supplying the various voltage domains of an electronic device or platform. System supply is provided from battery and/or external supply sources. 3) Managing the battery by including identification, authentication, voltage monitoring and gauging functions. 4) Ensuring system safety, such as for preventing either battery deterioration or even outgassing or explosion in case of battery overheating or external supply source failure.

Battery management in some of the embodiments is as much as possible made independent from the rest of the system, allowing more reliable and more nearly autonomous battery management operation and easier customization for design of particular systems.

Figure 1:
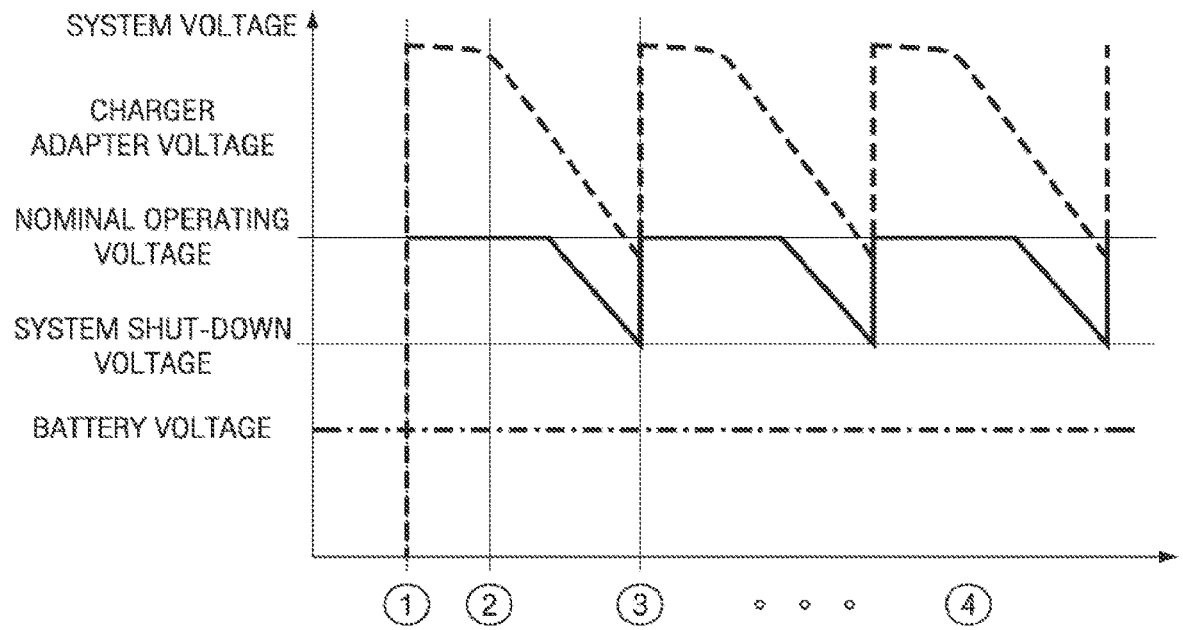
FIG. 1 is a waveform diagram of voltages versus time and depicting voltages in a system failure example due to the problem of repeated crashing when a less than fully adequate-current charger is used.

In FIG. 1 a system failure problem example due to a low-current charger is as follows. A dummy universal USB charger adapter with limited current capability is connected to a mobile device with an empty battery (see horizontal line representing low battery voltage). The mobile device, equipment, or handset is supposed to provide instant-on functionality so that system can be powered from the charger adapter or the battery or both charger adapter and battery. This is called a "supplement mode" herein regardless of whether it is successful.

Figure 2:
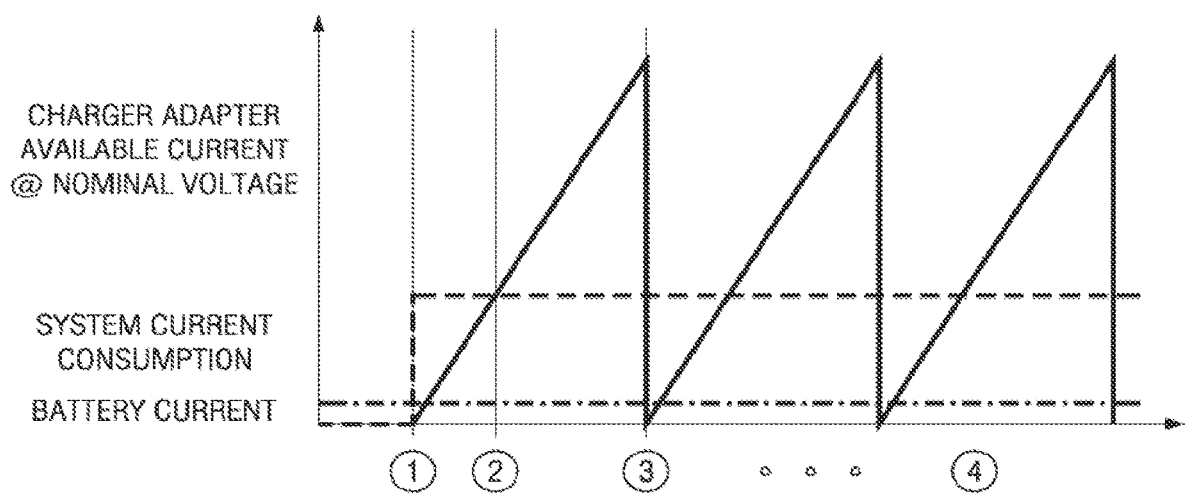
FIG. 2 is a waveform diagram of electrical currents versus time and depicting the currents in the system failure example of FIG. 1.

In FIGS. 1 and 2 crash loop phenomena of repeated crashing start from connecting a charger to a mobile device that has a dead battery. (Note that the word "crash" herein can refer either to an orderly software and hardware shutdown or instead to an improper shutdown—either way in circumstances of insufficient battery power.) Then a system current spike or ramp in FIG. 2 causes or leads to voltage decline in FIG. 1 and consequent system crash and system restart too soon for a power supplement mode to operate successfully. This problem is solved by introducing an anti-crash-loop mechanism 170 to form a system embodiment of FIG. 3 to prevent the premature system restart and re-crashing of FIGS. 1-2 when system current/power consumption exceeds charger capability.

Figure 3:
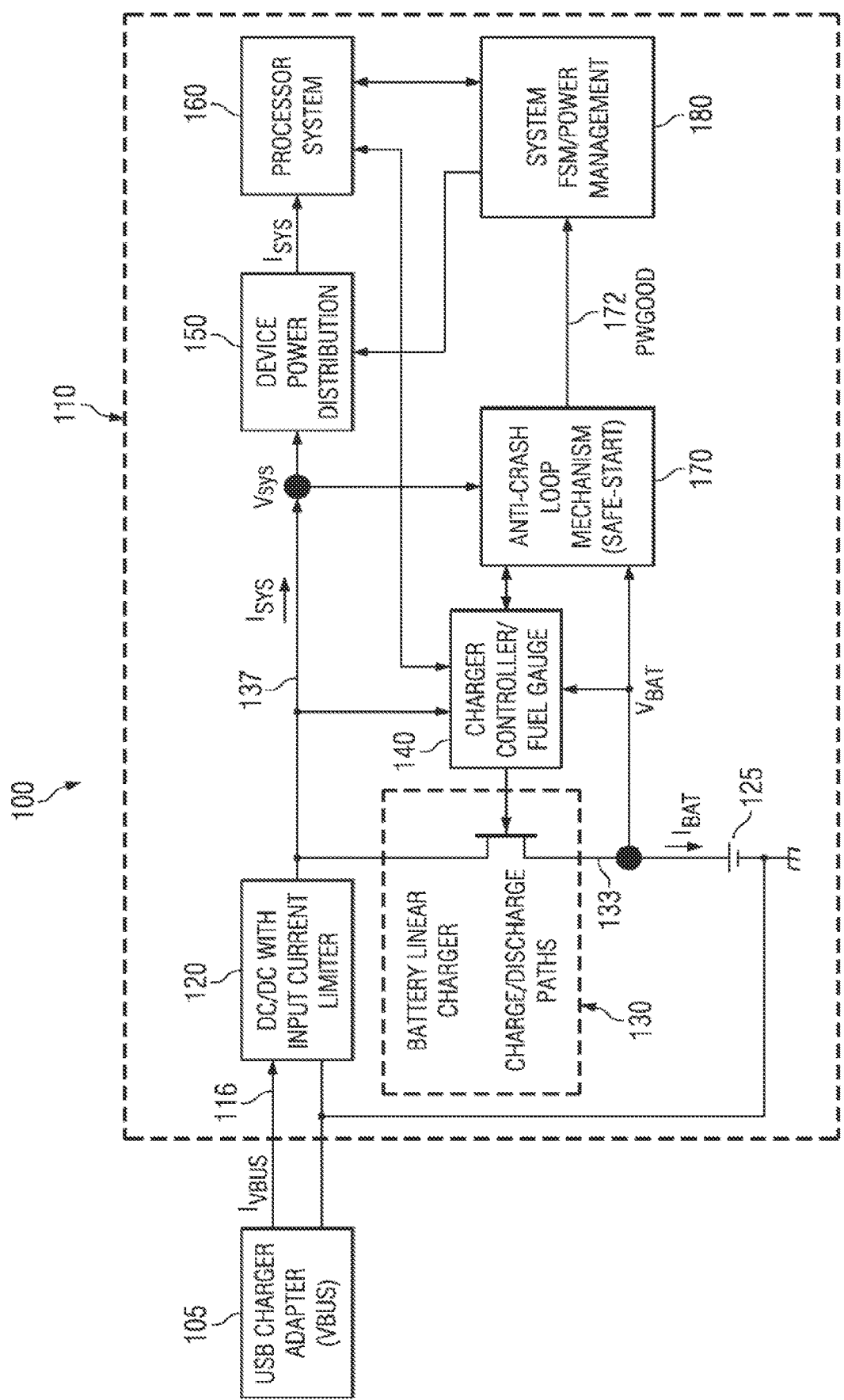
FIG. 3 is a block diagram an electronic device embodiment including an anti-crash loop mechanism embodiment, the device coupled with a USB charger adapter.

In FIGS. 1-3, when battery 125 is empty and therefore below a Vbatminhi threshold, system voltage $V_{SYS}$ might be nevertheless provided if an external charger 105 becomes connected to a DC or USB input by a charging input line 116 of a device embodiment 110. In such case, a functional system circuit 160 powers-up via a device power distribution circuit 150 and takes power from external charger 105 power. However, if system 160 draws more current in FIG. 2 than external charger 105 can sustain, charger voltage in FIG. 1 drops and $V_{SYS}$ voltage drops also, and system 160 crashes. Then with current $I_{VBUS}$ decreasing, charger 105 voltage rises again and system voltage $V_{SYS}$ rises again, and the system restarts until the next crash, and so on indefinitely. If system crash happens in the early startup time, application software would not be able to detect it in time, and a crash-loop of FIGS. 1-2 could happen until charger 105 is replaced with a more powerful charger or until the battery 125 is somehow charged or replaced. A combination circuitry embodiment 110 of FIG. 3 remarkably addresses this problem and provides anti-crash protection.

In FIGS. 1 and 2, when looking at voltage and current at the charger adapter, system and battery nodes, note the following step-by-step behavior of an unprotected system, wherein a sequence of crash loop steps are indicated chronologically by circled numerals beneath the time axis of FIG. 2:

Step 1—Charger adapter plug-in.

Step 2—System current consumption begins to increase in FIG. 2 part way toward a system operating current level, but the increasing current quickly exceeds charger adapter capability (upper horizontal line in FIG. 2) at nominal charger adapter voltage. In FIG. 1, the charger adapter voltage begins to fall, and before long, voltage regulation in the device (e.g. LDO low dropout regulator) becomes ineffective. In other words, the voltage regulation no longer can maintain a nominal system operating voltage in the device circuitry, and the FIG. 1 system voltage begins to fall. (The system voltage is somewhat less than the charger adapter voltage all through the process.)

Step 3—System crashes (electronically shuts its FIG. 2 supply current off) when system voltage has fallen to and reaches a predetermined system shut-down voltage level in FIG. 1. Accordingly, the initial part-way rapid rise of system current in FIG. 2 is suddenly terminated by the current shut-off operation of the device, so that a first sawtooth of current results in the current graph of FIG. 2. However, in FIG. 1, the charger adapter voltage remains applied to the mobile device, and with the device current shut off, the charger adapter voltage immediately returns to its open circuit level.

Step 4—The process of steps 1, 2, and 3 occurs all over again. Crashes repeat indefinitely without battery charging. System fails to successfully turn on, and operation is lost along with an opportunity for a pleasant user experience.

Figure 5A:
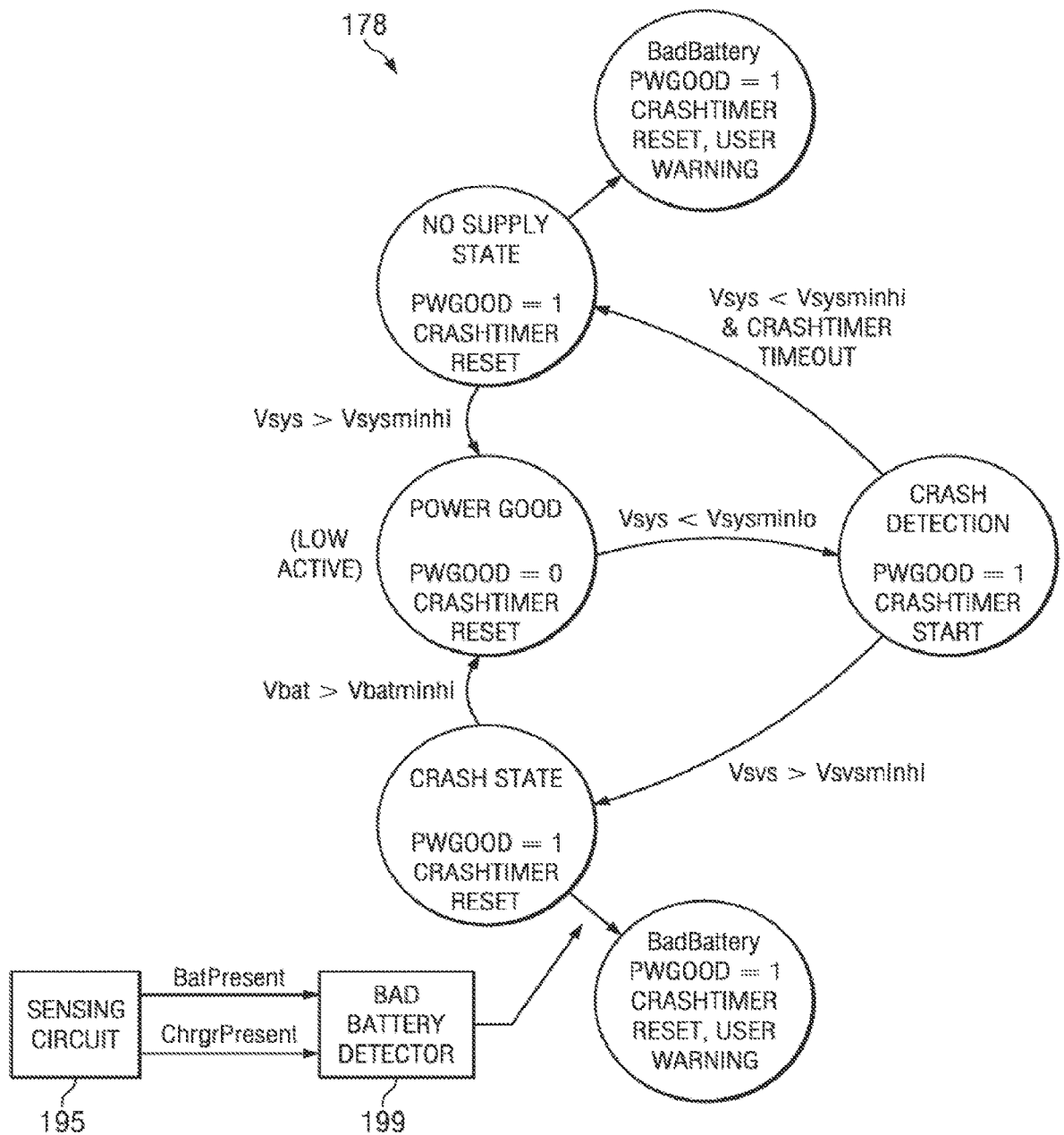
FIG. 5A is a state transition diagram of a state machine embodiment for use in the anti-crash loop mechanism of any of FIGS. 3, 4, 9A, 9B, 10A, and 16A and producing a power-good control signal PWGOOD.
Figure 5B:
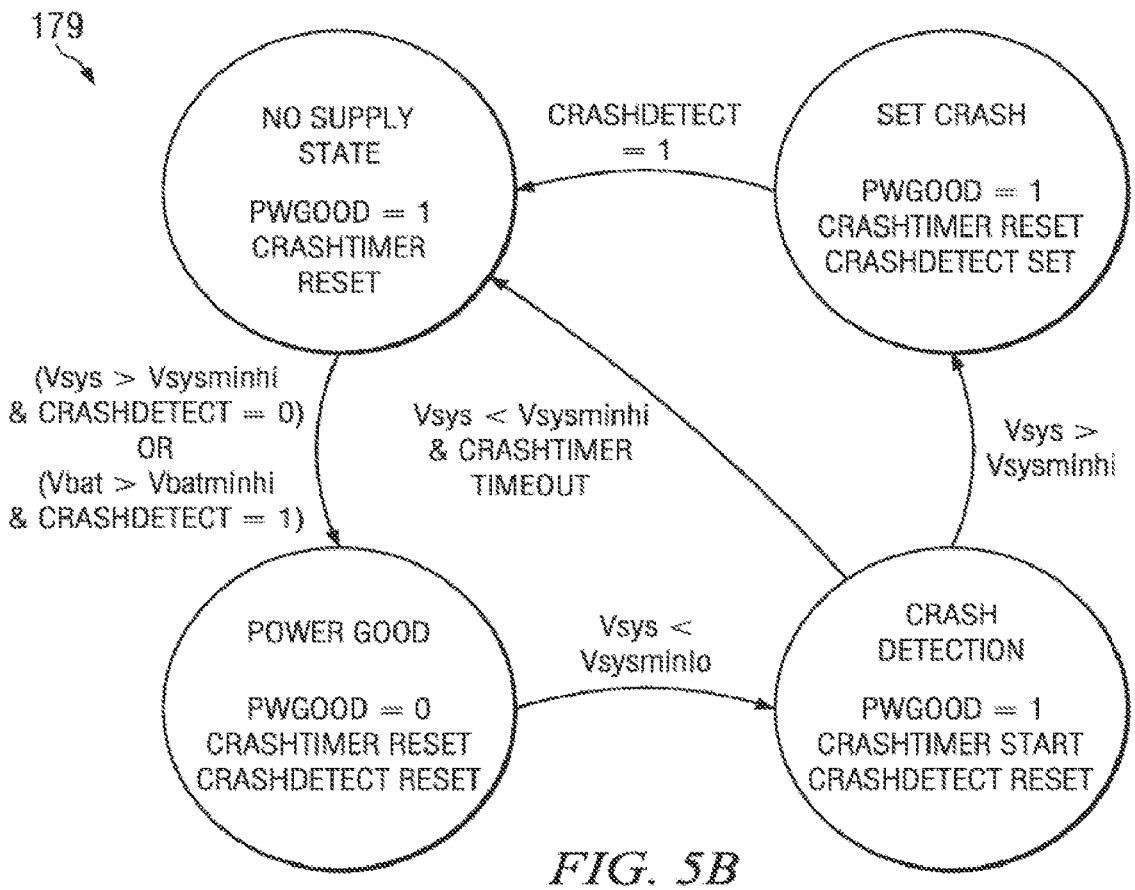
FIG. 5B is a state transition diagram of another state machine embodiment for use in the anti-crash loop mechanism of FIG. 4 and producing a power-good control signal PWGOOD.
Figure 5C:
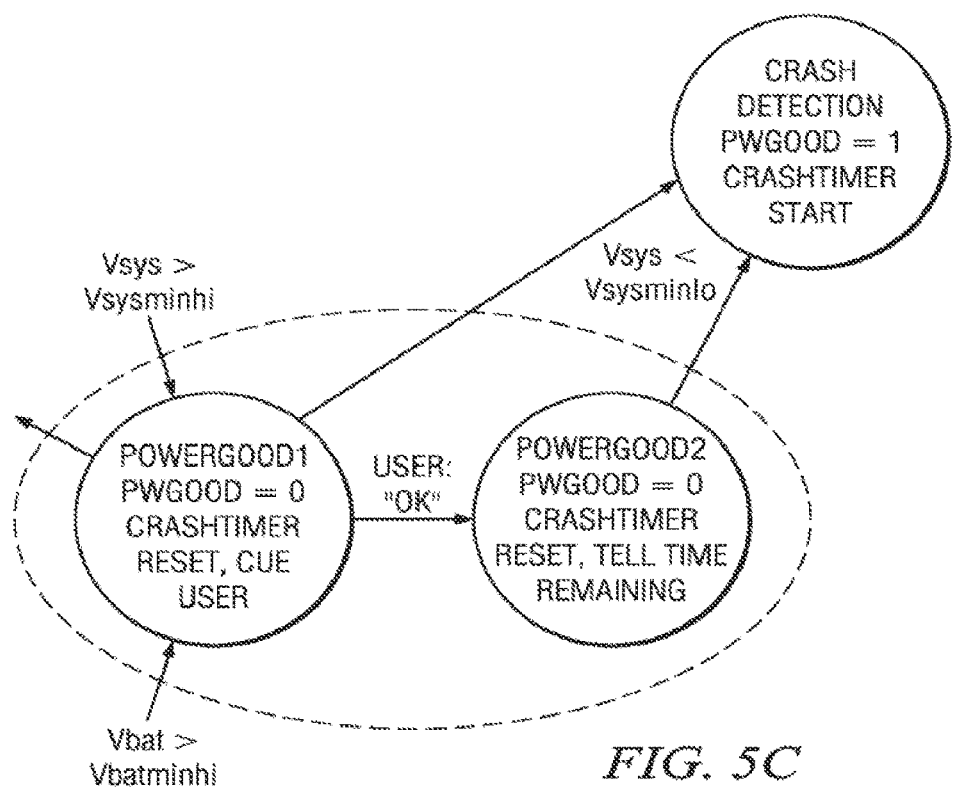
FIG. 5C is a state transition diagram that illustrates for some embodiments, a state machine of FIG. 5A that has a subdivided POWER GOOD state.
Figure 5D:
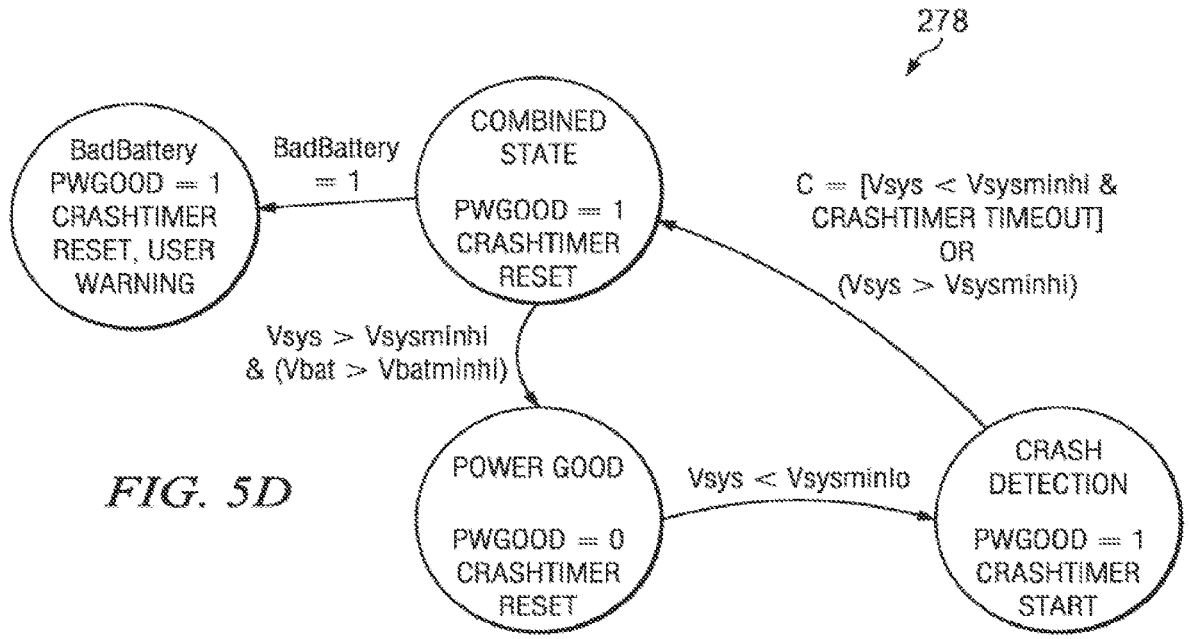
FIG. 5D is a state transition diagram of another type of state machine embodiment having a Combined state for use in the anti-crash loop mechanism of any of FIGS. 3, 4, 9A, 9B, 10A, and 16A and producing a power-good control signal PWGOOD.
Figure 5E:
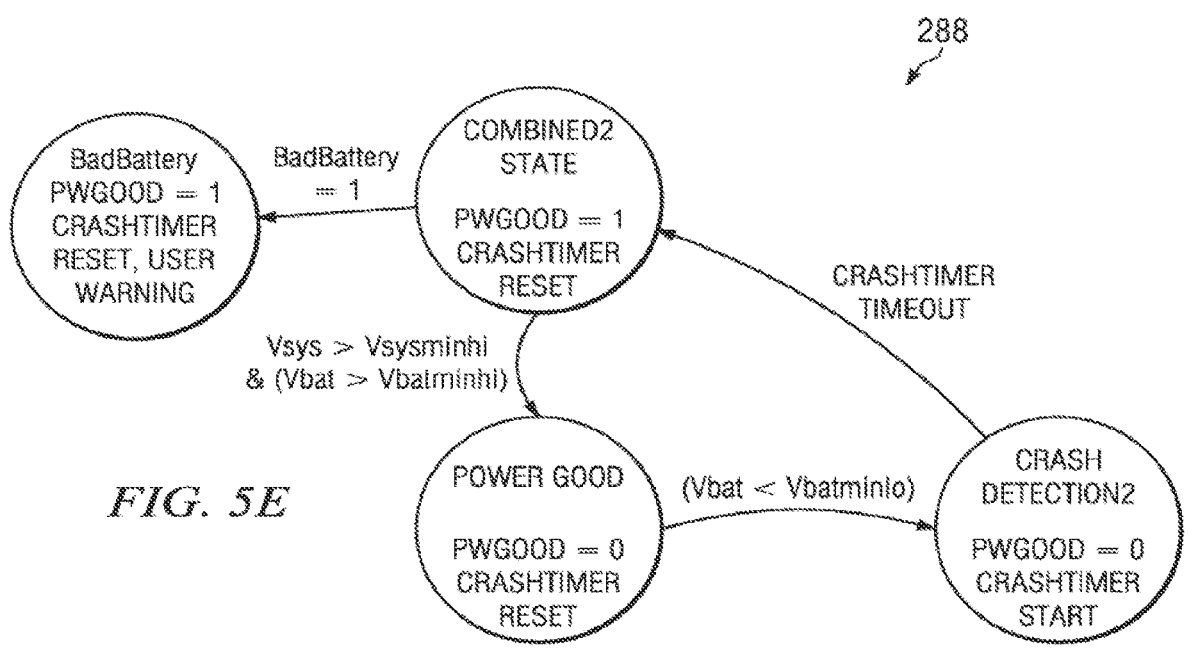
FIG. 5E is a state transition diagram of an alternative form of state machine embodiment having a Combined state for use in the anti-crash loop mechanism of any of FIGS. 3, 4, 9A, 9B, 10A, and 16A and producing a power-good control signal PWGOOD.
Figure 5F:
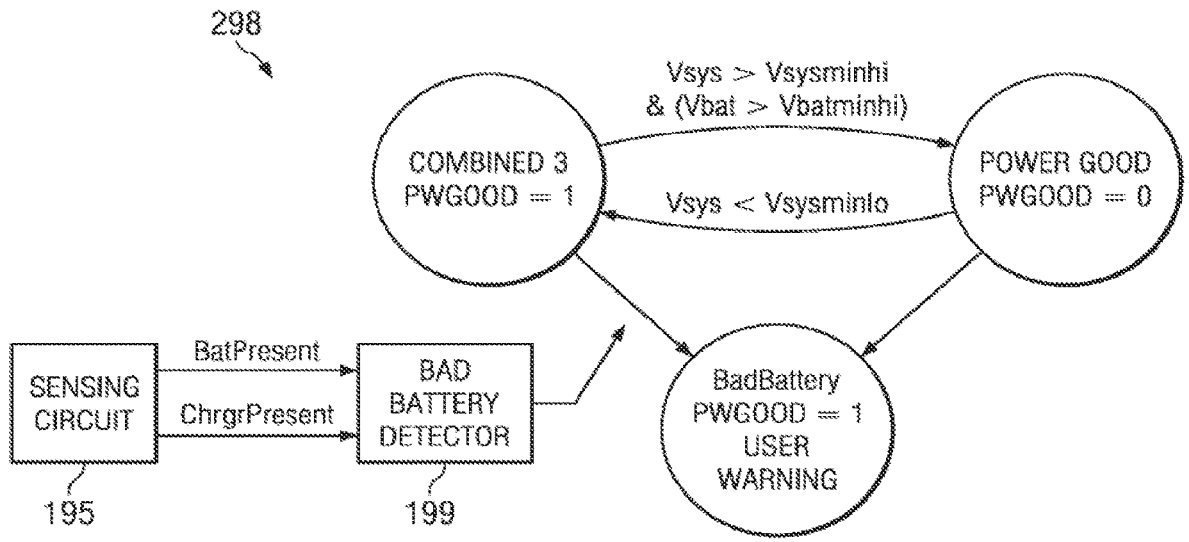
FIG. 5F is a state transition diagram of another alternative form of state machine embodiment having a Combined state for use in the anti-crash loop mechanism of any of FIGS. 3, 4, 9A, 9B, 10A, and 16A and producing a power-good control signal PWGOOD.
Figure 6:
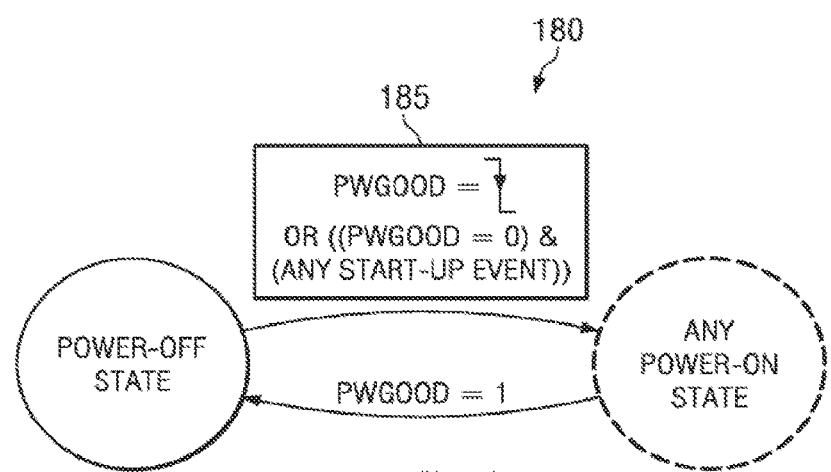
FIG. 6 is a state transition diagram showing an embodiment including revisions to a system power-up Finite State Machine (FSM), to which FSM a separate state machine embodiment as in any of FIGS. 5A-5E, 9C-9E, or 20-25 couples the PWGOOD signal, and the FSM state transition diagram of FIG. 6 is simplified to focus on transitions between a power-off state and other states generally that the FSM may have.
Figure 7:
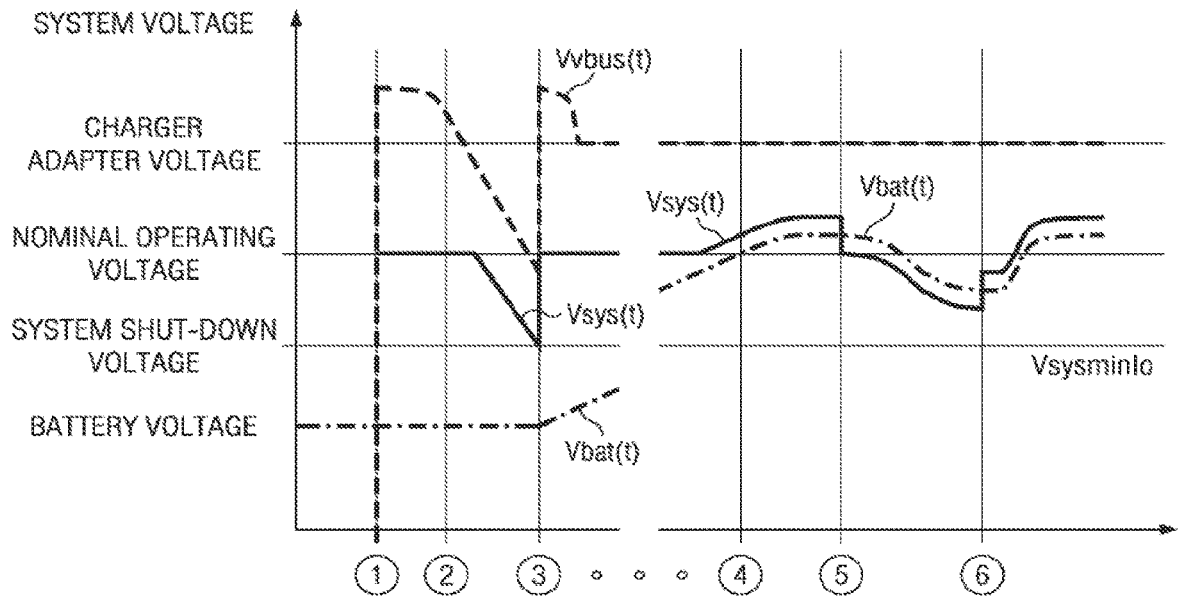
FIGS. 7 and 8 are waveform diagrams respectively of voltages and currents versus time in a process embodiment for a successful supplement mode of operation in a device embodiment of FIGS. 3, 9A, 9B, 10A and 16A.
Figure 8:
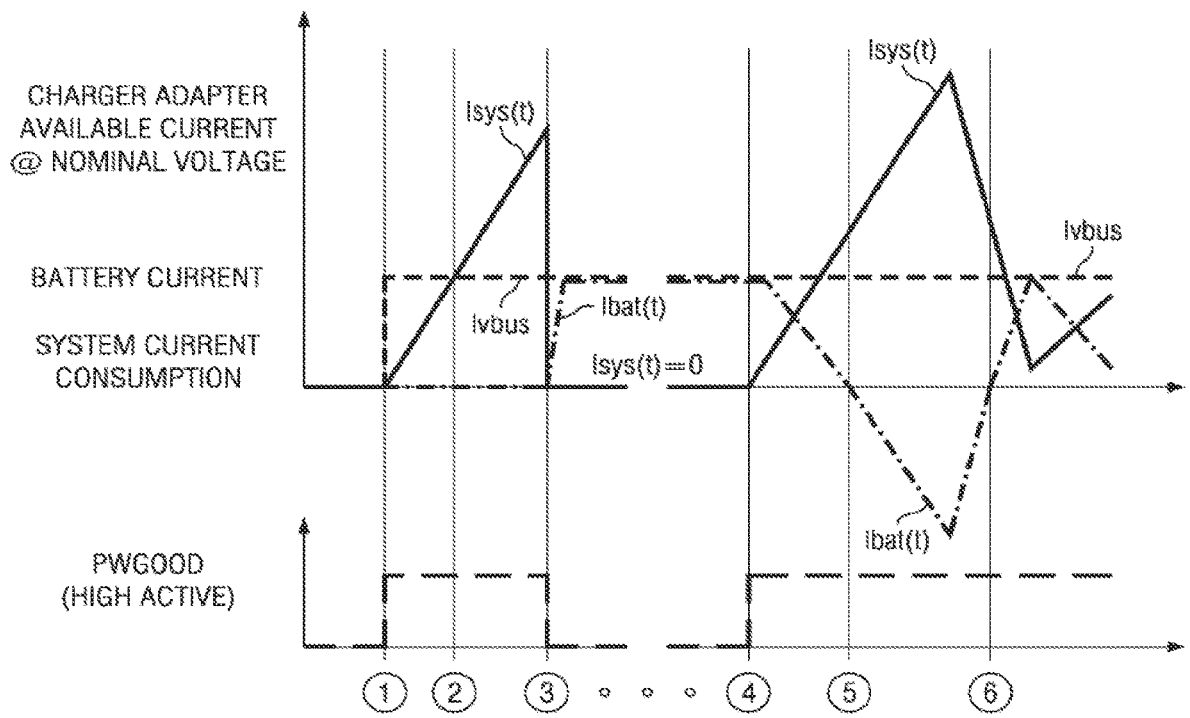

In FIGS. 3-8, a device embodiment 110 with an anti-crash-loop mechanism 170 in combination as shown prevents overall system instability in problematic conditions that could otherwise occur as discussed for FIGS. 1-2. The anti-crash-loop mechanism 170 has a state machine 178 or 278 or other such control circuitry, that constantly monitors system voltage $V_{SYS}$ when $V_{BAT}$ is below Vbatminhi even when a charger 105 is connected. In such case a power-good control line 172 supplies a PWGOOD signal output or indicator active (e.g., low) to at least briefly attempt to operate the system. If $V_{SYS}$ comes to drop below Vsysminlo and external charger 105 voltage is collapsing, this is a crash condition and PWGOOD output goes high impedance (inactive, decoupling the system from most or all power) and this makes or lets the system voltage $V_{SYS}$ rise in magnitude. Then PWGOOD stays inactive high (=1) and battery charging current $I_{BAT}$ is thereby maximized and continued until battery voltage $V_{BAT}$ reaches threshold Vbatminhi. Once $V_{BAT}$ has reached Vbatminhi, a current supplement mode can be successfully provided or ensured by causing PWGOOD to fall low-active (=0) and in turn causing system 160 to power-up safely. Anti-crash-loop mechanism 170 supporting system behavior is depicted in FIGS. 7 and 8 (e.g., with PWGOOD high active hardware alternative). If external charger 105 becomes disconnected from and reconnected to charging input line 116 while anti-crash-loop mechanism 170 is active, mechanism 170 is reset and a FIG. 5A POWER GOOD state machine state grants system power-up again by putting PWGOOD active.

In FIG. 3, system 100 has, e.g., a USB charger adapter 105 connected to a crash-loop protected mobile device embodiment 110. Mobile device 110 includes a DC/DC conversion circuit 120 with input current limiter for providing charging current $I_{BAT}$ by a battery-related line 133 to a battery 125 and through linear charger circuit 130 (e.g., a low-noise linear charger) shown with a series transistor. If the charger 105 can raise system voltage $V_{SYS}$ to a sufficient line level, current can also pass through power output line 137 to device power distribution 150 and system 160. When the USB charger adapter 105 is disconnected from mobile device 110, battery 125 supplies system current $I_{SYS}=-I_{BAT}$ in a reverse direction through the circuit 130 via the power output line 137 to device power distribution circuit 150 to a functional circuit 160, such as an application processor system. For some background on some examples of functional circuitry 160 and device power distribution 150, see US Patent Application Publication 20080307240 "Power Management Electronic Circuits, Systems, and Methods and Processes of Manufacture" (TI-60478) dated Dec. 11, 2008, which is hereby incorporated herein by reference in its entirety.

During the charging process, DC/DC conversion circuit 120 via a charge path in battery linear charger 130 provides charging current $I_{BAT}$ by a battery-related line 133 of linear charger 130 to battery 125. In one form of operation, Charger controller/Fuel gauge 140 cooperating with anti-crash loop mechanism 170 initiates and controls such battery charging automatically when the system 160 is not operating. (Notice that "fuel"-gauge refers to an indicator of battery electrical charge level or energy level in this technology. Notice also that battery voltage at the $V_{BAT}$ node and system voltage node $V_{SYS}$ may sometimes be somewhat independent of each other due to the circuitry in blocks 120, 130, 140.) Charger controller/Fuel gauge 140 cooperating with anti-crash loop mechanism 170 can initiate and control such battery charging relatively independently, if desired, even when the system 160 is operating partially or fully powered. In the latter form of operation, circuit 120 provides at least some current $I_{SYS}$ directly for device power distribution circuit 150 to distribute to application processor system 160 if anti-crash loop mechanism 170 sets PWGOOD active; and battery 125 can jointly contribute at least some current $I_{SYS}$ via a discharge path in block 130 to ensure a successful supplement mode. After the charger 105 is disconnected, current $I_{SYS}$ becomes entirely sourced from battery 125.

In FIG. 3, the example of a category of embodiments solves the problem shown in FIGS. 1-2 by recovering and securing, protecting, and more-fully ensuring system power-up and subsequent operation of the system. Safe-start anti-crash mechanism 170 operates as protective circuitry associated with the Charger controller/Fuel gauge 140. Anti-crash mechanism 170 is detailed in FIGS. 4-6 and is responsive to battery voltage at a $V_{BAT}$ node and to system voltage node $V_{SYS}$ to provide controls to Charger controller/Fuel gauge 140 so that it monitors both battery voltage $V_{BAT}$ node and system voltage node $V_{SYS}$ itself with the Charger controller/Fuel gauge 140. Anti-crash mechanism 170 also generates the special PWGOOD signal to a system power-up Finite State Machine (FSM) 180. The PWGOOD signal is added as an important input and provided with appropriate logic coupled with FSM 180. In this way PWGOOD active allows FSM 180 to power up the system by any suitable operations provided in FSM 180. On the other hand, such logic responds to PWGOOD inactive to cause FSM 180 to transition from any FSM 180 state to an Off state in FSM 180 in FIG. 6 instead and thereby force system 160 to a power-off state or other substantially powered down state such as a significantly-reduced power state.

In FIGS. 3 and 6, one embodiment has a type of power management state machine 180 using an Off Request logic to cause it to fall into an Off state. One of some Off Request logic conditions is made responsive to a PWGOOD inactive signal from safe-start mechanism 170. Each FSM 180 power transition accesses a sequence in nonvolatile one-time programmable (OTP) memory that defines of one or several power management register accesses that control the resources 150, 160 accordingly and may also control a battery pack and circuits in FIG. 18 accordingly. An Off Request causes the FSM 180 to switch Off the device circuits 150, 160, meaning transition from SLEEP or ACTIVE to OFF state. Some types of Off Request herein include PWGOOD inactive as taught extensively herein, long-duration Power On key press by user, PWRDOWN (using PWGOOD and other inputs), Watchdog Timeout, Thermal Shutdown, etc. Off Requests are arranged to have highest priority with no gating or conflicting conditions like an intervening Sleep Request or On Request. Subsequently, the FSM of block 180 in the Off state can respond to an On Request, such as triggered by PWGOOD active as in FIG. 6 or some other On Request if any, to turn on again and go to the ACTIVE state. Sleep Requests trigger FSM 180 to transition from ACTIVE to SLEEP state, and that causes an embedded power controller to execute a power management sequence to carry the transition into effect unless a pending unmasked interrupt exists. An interrupt or Not-Sleep signal inactive (high) generates a Wake Request to wake up the device by transitioning from SLEEP state to ACTIVE state and applying the effectuating power management sequence.

Such an embedded power controller circuit in FSM block 180 is coupled with and manages the state(s) of the device power distribution 150 and functional circuitry 160 during power transitions of FSM 180. In one example, and according to types of requests such as On Request, Off Request, Sleep Request, and Wake Request the embedded power controller executes any selected one of several predefined power sequences to control the state of all power and circuit resources in blocks 150 and 160 and elsewhere such as a backup battery with battery 125. Each resource is configured through register bits, which can either be statically controlled by the user through control interfaces (e.g., I2C or SPI) or automatically controlled by the embedded power controller during power transitions.

Block 180 in one example is composed of three modules: 1) an event arbitration module used to prioritize the ON, OFF, and SLEEP requests, 2) a power state-machine used to determine which power sequence to execute, based on the system state (supplies, temperature, etc.) and requested transition from the event arbitration module, and 3) a power sequencer that fetches from OTP (one-time programmable) memory the selected power sequence and executes it. Based on the definition of each sequence, the power sequencer sets up and controls all resources accordingly.

Figure 4:
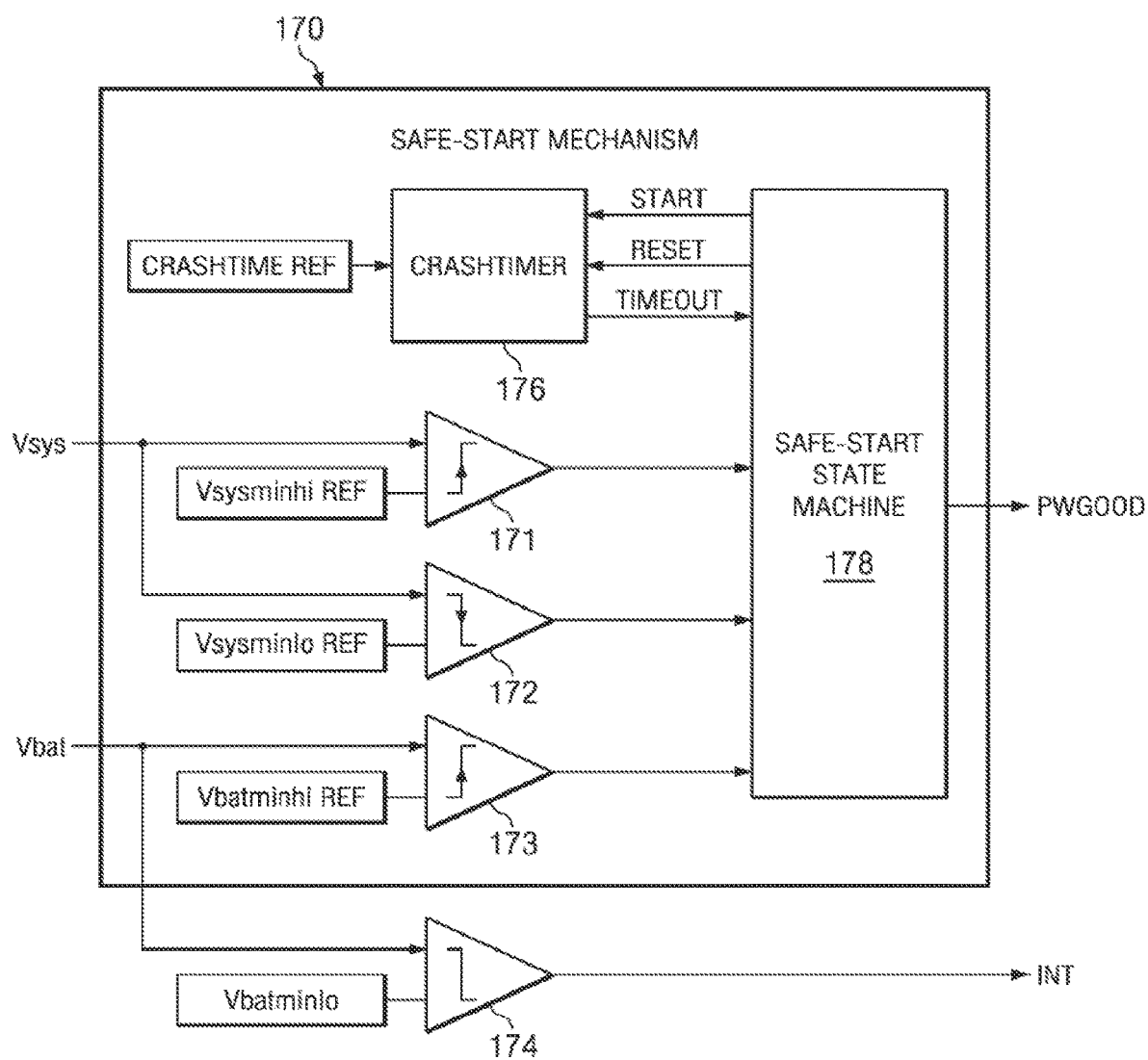
FIG. 4 is a block diagram of an anti-crash loop mechanism embodiment for use in the electronic device of FIG. 3.

Turning to FIG. 4, an anti-crash-loop mechanism embodiment 170 implements, for example, three (3) voltage comparators 171, 172, 173, a time-out timer 176 and Safe-Start Finite State Machine 178 of FIG. 5A. Comparators 171, 172, 173 are coupled at respective outputs to inputs to the Safe-Start Finite State Machine 178. Comparator reference Ref thresholds for FIG. 4 comparators 171, 172, 173 are defined for example as follows. Different definitions can be used in some other embodiments and types of performances.

Vsysminhi reference for comparator 171 is set to a high enough value of system supply voltage to be useful for possible turn-on purposes and below which the system is able to operate at least for a while successfully as system voltage declines after turn-on. Comparator 171 has its other input fed with the actual voltage $V_{SYS}$ itself. System 110 is authorized to power-up (so that PWGOOD goes active e.g., low) when $V_{SYS}$ goes above this threshold when running from input power except if a crash has previously occurred and battery is not-yet charged thereafter. Vsysminhi is used as a power-on system voltage threshold that may be hardwired or statically configured suitably. During battery charge, system 160 automatically powers-on or is enabled for a user power-on command when battery voltage reaches this value Vsysminhi. In some other embodiments Vsysminhi is programmed for and fed to comparator 171 such as by hardware and/or software running on a microcontroller in the fuel gauge/charger controller 140 (or in 340, 410, or 620), to match battery characteristics.

Vsysminlo reference for comparator 172 is set to the minimum or low-end value of system supply voltage for the system to operate successfully and including voltage margin for current consumption spikes due to high activity of system 160. Comparator 172 has its other input fed with the actual voltage $V_{SYS}$ itself, and the comparator 172 operates in reverse sense to comparator 171. When $V_{sys}$ goes below this threshold Vsysminlo, PWGOOD goes to high-impedance (HZ, inactive) and system 160 is immediately shut down as discussed in connection with FIGS. 5A-6. Vsysminlo may be hardwired or statically configured suitably. In some other embodiments Vsysminlo is programmed for and fed to comparator 172 such as by hardware and/or software running on a microcontroller in the fuel gauge/charger controller 140 (or in 340, 410, or 620), to match battery characteristics and currently-existing loading based on $I_{SYS}$ current level measurements.

Vbatminhi reference for comparator 173 is set to the minimum battery voltage value based on battery characteristics and above which voltage Vbatminhi the system 160 is able to operate successfully in a supplement mode least for a while when operating from battery 125 only. In some other embodiments, circuitry may be provided to adaptively set this reference value Vbatminhi somewhat lower based on actually-needed battery discharge current $-I_{BAT}$ for a successful supplement mode based on the difference of currently-requested loading $I_{SYS}$ less actually-available measured charger current, e.g. $I_{VBUS}$. This reference Vbatminhi includes or may include voltage margin for current consumption spikes due system high activity and/or some expected decline in battery voltage during supplement mode. Comparator 173 has its other input fed with the actual battery voltage $V_{BAT}$ itself, and the comparator 173 operates in the same sense as comparator 171. When $V_{BAT}$ goes above this threshold Vbatminhi, PWGOOD goes active (e.g., low), and the system is authorized to power up from reset. If the system has previously crashed, this $V_{BAT}$>Vbatminhi resets the anti-crash-loop mechanism 170 to the FIG. 5A POWER GOOD state.

Vbatminlo is a low-voltage reference for an input of an additional FIG. 4 comparator 174 that sends an interrupt to host processor in circuit 160 or elsewhere to signal low battery level. Comparator 174 has its other input fed with the actual battery voltage $V_{BAT}$ itself. In some embodiments comparison with Vbatminlo has no action on PWGOOD, or as in FIG. 5A such comparison is not used at all in block 178. Vbatminlo comparator 174 is re-initialized and/or produces output to release an interrupt or other control signal line when battery voltage is no longer low, i.e. $V_{BAT}$>Vbatminlo.

Vbatminlo is a shut-down condition that is thus not necessarily used in safe-start state machine 178. Vbatminlo is used in the system for generating an interrupt to a processor in functional circuit 160, alerting it about the low level of the battery 125. Accordingly, when the processor in circuit 160 is running from battery 125 only and low-battery condition Vbat<Vbatminlo occurs, software responsively performs a clean shut-down of the system such as by saving the context and user parameters when Vbat<Vbatminlo. The value of this Vbatminlo threshold is set so that this low-battery condition Vbat<Vbatminlo happens before Vsys<Vsysminlo when battery is discharging, ensuring time for the application to shut-down properly. When the system is running from both battery 125 and charger adapter 105, an active Vbat<Vbatminlo condition signifies that charger adapter 105 is not providing enough power to the system and the battery 125 is still discharging and has become a low-battery. Therefore, the response by or effect on the system will be exactly the same, wherein software performs a clean shut-down of the system such as by saving the context and user parameters when Vbat<Vbatminlo. To summarize, system undervoltage Vsys<Vsysminlo is a condition used to trigger the HW safe-start state machine 178, i.e. to shut down the system by inactivating the control signal PWGOOD (e.g., from 0 to 1). Low-battery condition Vbat<Vbatminlo is a condition to trigger a clean shut down of the SW applications beforehand, i.e. perform context and user data saving and then shut-down is initiated by software.

Vsysminhi, Vsysminlo and Vbatminhi are programmed into a flash memory for such data on manufacture and not thereafter programmable by ordinary device software. Vbatminlo initial value can also be set in flash and revised for a different type of battery 125 or different battery condition of battery 125. Other thresholds that can be applied by circuitry in some embodiments include Vsysmaxhi (maximum tolerable system voltage, disconnect FIG. 3 blocks 150, 160 from higher voltages), Vbatmaxhi (maximum tolerable battery voltage, disconnect charger 130 from higher battery voltages).

In FIG. 4, Crashtimer 176 has two inputs Start and Reset fed from Safe-Start Finite State Machine 178, and a further configurable input Crashtime_ref for a timeout reference also called Crashtime. This counter 176 timeout parameter Crashtime is defined as and set suitably in flash memory or other storage to a value representing, e.g., a short time in case a human user unplugs and re-plugs the charger adapter 105 into the assembled mobile device 110. Given the waveforms of FIGS. 7-8, the system voltage $V_{SYS}$ is likely to take no more than a few tens of milliseconds and perhaps a lot less than that amount of time to rise above threshold Vsysminhi upon a deactivation of PWGOOD in the presence of a low-current charger 105. Accordingly, the Crashtime value can be selected from values anywhere in a range of as little as about 100 milliseconds up to as much as two (2) or a few seconds, or in an intermediate range of about 0.5-1.0 seconds as desired. Suppose the user manipulates a charger plug somewhat uncertainly or perhaps to be certain that the plug is fully seated. With crash timer 176, and notwithstanding those manipulations, the state machine 178 operates in an even more fully-stable manner and does not needlessly transition back to NO SUPPLY state. Other values for Crashtime may be used instead or selectively used for particular purposes as the skilled worker sees fit.

Turning to FIG. 5A, one example of a safe-start state machine 178 of FIG. 4 generates the PWGOOD signal as depicted in the state transition diagram of FIG. 5A. The PWGOOD signal output is fed to FSM 180 in FIG. 3 as one of the FSM 180 power-on/power-off conditions for FIG. 6. In some embodiments, the safe-start state machine 178 is even combined with the FSM 180 and a merged state transition diagram describes them together. Because of the chip partitioning in this particular embodiment that maintains some independence or self-sufficiency of battery management relative to power management in FIG. 3, safe-start state machine 178 is shown by itself in this example.

FIG. 5A is suitably compared with voltage and current behavior in FIGS. 7 and 8 when looking at voltage and current $I_{VBUS}$ for the charger adapter, the system voltage node $V_{SYS}$, and the battery voltage node $V_{BAT}$, as well as the PWGOOD signaling. (To illustrate different embodiment logic possibilities, PWGOOD is shown Low-Active in FIGS. 5A and 12A/12B, and High-Active in FIGS. 7 and 8 and 11A/11B.) Charger adapter 105 voltage drop in FIG. 7 is limited by anti-crash loop mechanism 170 using the state transition diagram of FIG. 5A. Let the default or starting state be POWER GOOD in state machine 178. Suppose the charger adapter 105 is not yet plugged in nor otherwise connected/coupled into device 110 or is plugged-in but not yet energized. If the battery charge level is at first sufficient even if getting somewhat low, the absence or presence of the charger 105 does not involve the system crash issue and the state machine 178 remains in POWER GOOD state. In POWER GOOD state, the output signal PWGOOD is active (e.g., low PWGOOD=0) and the crash timer 176 is held in reset. However, if the state machine 178 detects a system undervoltage condition represented by the Boolean expression Vsys<Vsysminlo, such as from low battery or inadequate charger current, then a transition is made to a CRASH DETECTION state that causes deactivation PWGOOD=1 (which de-activates system 160) and then starts the crash timer 176. Crash timer 176 times out in the absence of charger operation, and a condition ((Vsys<Vsysminhi) & crashtimer timeout) goes active and causes a transition from CRASH DETECTION state to a NO SUPPLY state that causes crash timer reset and keeps PWGOOD inactive (high in FIG. 5A, shown low in FIG. 8).

In some embodiments, the NO SUPPLY state is used as the default or starting state instead of POWER GOOD, and it can be seen from the various parts of this description that the choice of starting state is not critical and any of still other states can be used as default state. If the system has a power source, it will soon reach POWER GOOD state even if temporarily. And if the system lacks most power, it will soon reach NO SUPPLY state. And if the battery 125 is removed and re-inserted or replaced, the very-low-power state machine 178 robustly goes to its starting state and resumes operation.

Next, suppose the charger adapter 105 is plugged in and now energized, and safe-start state machine 178 operation is currently in the NO SUPPLY state. The charger 105 may have known or unknown power characteristics. Then due to the charging, system voltage $V_{sys}$ at first rises to nominal operating voltage whereby Vsys becomes higher than Vsysminhi, i.e., voltage condition $V_{sys}$>Vsysminhi becomes applicable. Then in such case comparator 171 causes a state machine 178 transition from NO SUPPLY state to the POWER GOOD state even if the charger available current $I_{VBUS}$ is not fully adequate. In the POWER GOOD state, the output signal PWGOOD is forced active (low, PWGOOD=0, or high as in FIG. 8) and the crash timer 176 still remains reset. The system starts to power up in FIGS. 7-8, step 1 using charger power. In a normal starting sequence having sufficient power and time, a processor if used in functional block 160 would execute its booting sequence, launch an Operating System (OS) and make software applications available for the user. However, if the battery 125 is insufficiently charged, then in FIGS. 7-8, step 2, system current consumption $I_{sys}$ quickly starts to exceed charger adapter capability $I_{VBUS}$ at nominal voltage so that the FIG. 7 charger adapter 105 voltage Vvbus and the system voltage $V_{sys}$ both fall and an undervoltage condition $V_{sys}$<Vsysminlo (FIG. 7 system shut-down voltage) becomes applicable in FIGS. 7-8 step 3. Comparator 172 senses that undervoltage condition and causes state machine 178 to transition from the POWER GOOD state to its CRASH DETECTION state, which causes deactivation of PWGOOD and thereby removes power from system 160 and concurrently starts the crash timer 176. Among the operations at that step 3 of system crash detection, the system voltage $V_{SYS}$ goes below system 160 shut-down voltage Vsysminlo, and state machine 178 terminates and forbids system 160 power-on thru PWGOOD going inactive to FSM 180.

As noted above, the charger 105, even if inadequate in current capacity, is capable of at least briefly achieving $V_{sys}$>Vsysminhi when the system 160 is off. Charger adapter 105 voltage Vvbus rises to a higher level in FIG. 7 and then settles downward somewhat as battery charging current $I_{BAT}$ commences at step 3. Vsys rises again immediately above Vsysminhi (in a period shorter than crashtime) because system power-consumption becomes nearly zero watts (0 Wt.) during shut-down. Indeed, the charger already did so earlier to go from FIG. 5A NO SUPPLY state (system Off) to the POWER GOOD state (system On). (In the NO SUPPLY state, the linear charger 130 control over its current initially prevents the nearly-dead battery from immediately loading down $V_{sys}$.) Upon reaching the CRASH DETECTION state, the system is again Off, and the charger 105 again at least briefly achieves $V_{sys}$>Vsysminhi. Consequently, state machine 178 soon operates, before crash timer 176 times out, to take the system from its temporary sojourn in CRASH DETECTION state to CRASH state. In the CRASH state the state machine 178 remains much longer since significant battery charging may take a substantial length of time. (If crash timer 176 had timed out earlier in CRASH DETECTION state, the timeout would have indicated that the charger 105 had become disconnected or something wrong with the battery. Operations would have gone back to NO SUPPLY state in those cases.) In the brief time in CRASH DETECTION state and then the likely much longer time in CRASH state, fuel gauge/charge controller 140 starts and continues battery charging at approximately constant current $I_{BAT}$ through battery linear charger 130 while state machine 178 prevents system 160 current draw ($I_{SYS}(t)$=0). The system including circuit 160 is not started again until battery 125 has reached a sufficient level ($V_{BAT}$>Vbatminhi) at subsequent step 4 for sustaining system hardware and software application operation whatever the charger 105 power capability is. Therefore, system operation is secured and crash does not occur again in the type of loop of FIGS. 1-2.

Note that a charger adapter 105 disconnection could occur during the CRASH state, and state machine 178 as illustrated in FIG. 5A does not and need not detect that disconnection. This can happen, for instance, if user comes to replace the charger adapter 105 unit by another charger adapter unit for charger 105. In that case, state machine 178 is desirably still in its CRASH state and remains there until battery 125 reaches a sufficient level Vbatminhi. Then operations go to POWER GOOD. One good reason for staying in CRASH state upon a charger disconnection is to avoid a possibly-annoying, visible system power up and crash for a user who has several kinds of charger adapter available, and who might be unnecessarily led by such visibility to try exchanging charger adapters as if needed to get the application to become usable and stable. Depending on design objectives, however, in some other embodiments an additional transition can be provided to FIG. 5A based on the system undervoltage condition (Vsys<Vsysminlo) to take state machine 178 from the CRASH state to the NO SUPPLY state to detect this charger disconnect condition and always return it to NO SUPPLY state if the battery is too low.

The embodiment 110 thus detects the system crash by monitoring the system voltage $V_{SYS}$. One crash event due to an insufficient-capacity charger 105 and system on—indicated by undervoltage condition $V_{sys}$<Vsysminlo—remarkably trains or causes the safe-start state machine 178 to intervene in and interrupt what would otherwise be an indefinite repetition of uselessly-repeating crash-charge-crash events of FIGS. 1-2. The safe-start state machine 178 responds to the first crash event sequence to apply the CRASH DETECTION state to inactivate PWGOOD (e.g., to =1 in FIG. 5A, to =0 in FIG. 8). And then in response to temporary $V_{sys}$>Vsysminhi due to presence of the charger 105 with system now off, state machine 178 quickly moves to CRASH state for battery charging, see FIGS. 7-8 step 3. That way, battery 125 can be charged sufficiently to run the system 160 if possible and as soon as possible. In this way system operation is secured and protected, and user experience is extended and enhanced.

In the CRASH state, the output signal PWGOOD remains inactive (e.g. high, PWGOOD=1) and the crash timer 176 is reset. If the battery 125 is not already charged so that voltage condition $V_{BAT}$>Vbatminhi, charging continues until the battery voltage $V_{BAT}$ satisfies that voltage condition. Thus when $V_{BAT}$>Vbatminhi becomes applicable, state machine 178 transitions from CRASH state to the POWER GOOD state. In the POWER GOOD state, the output signal PWGOOD is forced active (e.g., low, PWGOOD=0 at FIGS. 7-8 step 4) and the crash timer 176 still remains reset. In this way, the combination of the CRASH DETECTION state and the CRASH state in the embodiment charge the empty battery 125 and verify the successful charging before transitioning to the POWER GOOD state that starts the system 160 again. Approximately-nominal operating voltage is provided thereafter by battery 125 and charger 105 to sustain system 160 power consumption (Vsys exceeding Vsysminlo) while battery voltage $V_{BAT}$ continues and varies in the vicinity of nominal operating voltage.

In FIG. 5A and FIGS. 7-8, step 5, system 160 current consumption exceeds charger adapter 105 capability. However, now battery voltage $V_{BAT}$ becomes somewhat greater than system voltage $V_{SYS}$ in FIG. 7, and battery 125 current (shown negative in FIG. 8 due to the sense of the $I_{BAT}$ arrow in FIG. 3) supplements charger adapter 105 current $I_{VBUS}$ successfully. This is because the active PWGOOD signal generated by state machine 178 in its POWER GOOD state causes FSM 180 to power up system 160 at least for a user-meaningful time interval during which the at least partially-charged battery 125 starts to discharge. System crash does not occur as the battery 125 can successfully sustain current flow to the system 160 beyond what the charger 105 may be able to sustain. User can, for instance, use the time interval to read and send e-mails, operate a web browser, and/or perhaps make at least a short cell phone call.

In FIG. 5A and FIGS. 7-8, step 6, the user ceases using the software application(s) to permit completion of charging. Step 6 marks an end of the operation in supplement mode, and the battery 125 continues to charge. In due course, the user disconnects the USB charger 105 or other charger adapter, or removes the mobile device 110 from a charging cradle of a charger or docking station, etc. Safe-start state machine 178 remains in the POWER GOOD state wherein the output signal PWGOOD remains low-active (PWGOOD=0) and the crash timer 176 still remains reset. The system operation is successfully sustained thanks to PWGOOD signal behavior. If the user wants to turn off the system 160, user gives the appropriate command such as a long power key-press. FSM 180 responds and then effectuates the actual power management sequence that turns off the system 160. If charging is in progress, it suitably continues because the battery management parts 120, 130, 140, 170 of the device 110 operate with desirable independence from system 160.

In FIG. 5A, safe-start state machine 178 thus operates according to the illustrated sequence of transitions. These transitions and states in the transition diagram of FIG. 5A correspond to a type of process and/or circuit embodiment successfully securing a device such as a mobile device and providing remarkable anti-crash operation in which a mobile device can also be used while the battery is charging.

Notice that if the charging adapter 105 has a very substantial amount of current capacity that can both operate the mobile device system 160 and charge battery 125 concurrently, then operations in FIG. 5A quickly go from NO SUPPLY state to the POWER GOOD state and stay in the POWER GOOD state at least as long as the charger adapter 105 is connected. However, state machine 178 as described hereinabove beneficially also handles a more challenging Scenario #1, in which the mobile device circuitry 160 has a current consumption that exceeds what some charger adapters can or will support alone. The state machine 178 remarkably transitions to CRASH DETECTION state and subsequently to CRASH state, and the battery 125 in both of these states with PWGOOD inactive charges a short but sufficient time and then in due course transitions back to the POWER GOOD state that sets PWGOOD active so the user can use system 160 and benefit (at least for a limited but user-meaningful time interval) from system 160 operation using a combination of charger adapter-plus-battery even though the battery be only partially charged by then. If during this Scenario #1 sequence the user comes to disconnect the charger adapter 105 but battery 125 has not sufficiently charged, Vsys becomes lower than Vsysminlo, state machine 178 branches or falls into the CRASH DETECTION state and inactivates PWGOOD so the system shuts-down immediately and until the battery 125 can be further charged as narrated hereinabove. If Vsys is keeping low below Vsysminhi for a long time (longer than crashtime), that means that charger adapter 105 has been disconnected and state machine 178 returns to NO SUPPLY state until the next charger adapter plug-in event.

FIG. 5B shows an alternative state transition diagram of an alternative state machine 179 for safe-start mechanism 170. Here, the CRASH state is merged, combined, or amalgamated with the NO SUPPLY state because they have identical control outputs in FIG. 5A. Further in FIG. 5B, the transition logic is substantially revised to control transitions into and out of this merged state NO SUPPLY. A Crashdetect flag is introduced for memorizing the crash condition. Operations commence in default state POWER GOOD, which resets crash timer 176 and a flip-flop called Crashdetect to hold that flag. If $V_{SYS}$<Vsysminlo, the system recognizes a crash condition and enters CRASH DETECTION state for anti-crash operation. If no charger is connected, as indicated by both $V_{SYS}$<Vsysminhi and crash timer 176 timeout, then operations go to NO SUPPLY state similar to FIG. 5A. Otherwise, in FIG. 5B a SET CRASH state is entered from the CRASH DETECTION state if the condition $V_{SYS}$>Vsysminhi is satisfied and thus indicates that a charger of some kind is connected. SET CRASH state sets flip-flop Crashdetect herein, and then operations thereupon go directly to NO SUPPLY state (a misnomer with charger connected), which does not alter whatever state that flip-flop Crashdetect has been given. In both of those states SET CRASH and NO SUPPLY, the PWGOOD signal is kept inactive and the crash timer 176 is reset. Then the transition from NO SUPPLY to POWER GOOD state is controlled by a logic that depends on the state of the flag Crashdetect. If Crashdetect is inactive (e.g., 0), then that transition is only made if $V_{SYS}$>Vsysminhi. If Crashdetect is active (e.g., 1), then that transition is only made if $V_{BAT}$>Vbatminhi. POWER GOOD state and CRASH DETECTION state each reset the flag Crashdetect. The rest of the description of FIG. 5B tracks that of FIG. 5A. Notice in FIGS. 5A and 5B that POWER GOOD state is the only state that activates PWGOOD, and the other states deactivate PWGOOD or keep it deactivated. If the charger 105 is connected, operations proceed as described above.

Notice in FIGS. 5A and 5B that the threshold "Vsysminhi" used in the transition condition between the NO SUPPLY state and POWER GOOD state does not need to be the same as the threshold Vsysminhi used elsewhere in FIGS. 5A and 5B. That threshold "Vsysminhi" used in the transition condition between the NO SUPPLY state and POWER GOOD state is set in a range somewhat greater than Vsysminlo and less than a value that would prevent reliable detection of a charger 105 being connected; and in that way that threshold "Vsysminhi" is suitably made approximately similar in value to the threshold Vsysminhi used elsewhere in FIGS. 5A and 5B.

FIG. 5C illustrates for some embodiments, a state machine 178 that has a subdivided POWER GOOD state of FIG. 5A. In FIG. 5C, a POWERGOOD1 state not only activates PWGOOD (e.g. =0) but also initiates a low-power display message to cue the user in case the system is in a charging mode and/or is temporarily usable e.g., if the user clicks an "OK" button. (OR-Logic to signal charging mode is suitably fed from each of several alternative charger inputs that the device may have. If any charger is active when POWERGOOD1 state is reached, then user is cued.) The "OK" button-press state-transitions state machine 178 to a POWERGOOD2 state to give another display message that can further identify particular temporarily usable applications and how much time (e.g., estimated number of minutes) is available for each such application used individually or a minimum time available for a most power-consuming application in a given set of applications. Analogously, other FIG. 5A states of the state machine 178 can be used to initiate other display messages such as a message from the CRASH state indicating that the battery is X % full (designated by X % ChargeLevel) and estimated minimum time Tminest remaining until POWER GOOD temporary usage becomes available. Charger controller/fuel gauge 140 may also be arranged to generate such information in FIGS. 3, 9A, 9B, 10A, and 16A. For some background on battery voltage and fuel gauge monitoring, depth of discharge DOD, and time-remaining t rem estimations, see U.S. Pat. No. 6,892,148 "Circuit and Method for Measurement of Battery Capacity Fade" dated May 10, 2005, and U.S. Pat. No. 7,443,140 "Method and Apparatus for Operating a Battery to Avoid Damage and Maximize Use of Battery Capacity by Terminating Battery Discharge" dated Oct. 28, 2008, each of which patents are hereby incorporated herein by reference.

In some embodiments, the FIG. 5A POWER GOOD state can also initiate a display message that no charger is connected (if that case pertains) and a maximum time Tmaxest remaining for use of current application(s). For instance, Tminest and Tmaxest can be electronically estimated by processing represented by Equations (1A) and (1B) or any other suitably-effective equations as follows:

$$Tminest=-[\text{Temp \%}-X\% \text{ ChargeLevel}]/(k^*I_{BAT}) \quad (1A)$$

$$Tmaxest=X\% \text{ ChargeLevel}/(k^*I_{BAT}) \quad (1B)$$

In words, Equations (1A) and (1B) say that these time durations are shorter or longer in relation to the battery current $I_{BAT}$ then being greater or less. In Equation (1), parameter Temp % represents a minimum amount of charge level for running a desired application temporarily on the particular mobile device architecture, and values Temp % can be pre-stored in an electronic memory table that is accessed depending on what application(s) the user identifies in the FIG. 5C POWERGOOD2 state to temporarily run. In both Equations (1A) and (1B), parameter k is a parameter of the battery in units of %/coul, where k is approximately equal to 1% divided by the number of coulombs of electric charge that increases battery fuel percentage by 1%. In Equation (1A), current $I_{BAT}$ is the amount of charging current at the time of charging and the leading minus sign accounts for the reverse direction of current into the battery 125. In Equation (1B), current $I_{BAT}$ is the average amount of current delivered by the battery 125 to system 160 at the time of use if the user-identified application(s) were activated and used.

Further in FIG. 5C, more particularized transition conditions can be established and used to control different transitions out of the NO SUPPLY state, POWERGOOD1 and 2 states, CRASH DETECTION state and CRASH state. Such transition conditions can be conditions placed on any one, some, or all of $V_{SYS}$, $V_{BAT}$, Charge Level Q, X % ChargeLevel relative to a "100%" value of Charge Level, Battery energy $E_{BAT}$, elapsed charging time $t_{CH}$, and these and other variables individually or jointly. Battery voltage $V_{BAT}$ for example is an increasing function $f$ of the X % ChargeLevel, which in turn is an increasing function v (nu) of time-accumulated (integrated) current $I_{BAT}$. Function $V_{BAT}=f(X \% \text{ ChargeLevel, a, b, Tbat})$ also is affected by variables like battery age a, and materials/chemistry type b and battery temperature Tbat. Conversely, X % ChargeLevel=g($V_{BAT}$, a, b, Tbat) and so $V_{BAT}$ may be a feasible but less-than-fully-satisfactory proxy for X % ChargeLevel or Energy_Bat or other metric. Instead, X % Charge Level may be measured by the fuel gauge usingk*∫Ibat(t)dt, where constant k relates accumulated current to percentage of charge, or some more refined procedure is used. Battery energy $E_{BAT}=\int Vbat(Q)dQ$ or time integral $\int Vbat(t)Ibat(t)dt$ can also be measured (or estimated in fuel gauge/charger controller 140 and adjusted with a subtractive dissipation term) and thresholded in safe-start mechanism 170. When the current behavior of the battery charging circuit 130 over time is constant or otherwise known, and the battery is not defective, elapsed charging time $t_{CH}$ can be used as a proxy for battery charge level for threshold comparisons in some of the embodiments. Accordingly, any of these variables individually and in combination can be usefully applied in conditions such as threshold conditions in the embodiments. Other types of conditions such as fuzzy-logic conditions can also be applied in some embodiments.

Suppose for instance, that the user had already started to dial a cell phone number during or before the POWER-GOOD2 state. Suppose also that the charger adapter after a brief interval of battery charging could support an e-mail program in a supplement mode but not support a higher current consumption of a cell phone application without a longer interval of battery charging beforehand. Accordingly, parameters such as any or all of the threshold values Vsysminlo, Vsysminhi, Vbatminhi and/or Energyminhi can be retrieved from a table based on the user clicking a respective button telling what type of application is desired. That way, various transitions between states would occur after a shorter or longer period of time as a consequence of the particular threshold value or values accessed in response to the user choices of application(s).

Either in connection with FIG. 5C or independently, system or application software can also protect the system so it does not crash during the cell phone application even if state machine 178 crash-protects the e-mail application. When system or application software is running, it has access to fuel-gauge 140 information registers independently from the safe-start mechanism 170. Fuel gauge 140 can continually provide information such as the energy level of the battery, battery charging or discharging indication, amount of power consumed by the system, estimated remaining running time left, estimated charging time left, etc. Accordingly, the software can evaluate in advance if any particular one or another application can run successfully and consequently alert the user if needed.

After a state machine 178 sequence of CRASH state and a successful second power-up, fuel-gauge 140 information is used by system or application software in such embodiment. Anti-crash-loop mechanism 170 with safe-start state machine 178, as seen from the perspective of that type of embodiment, provide a protection mechanism coming on top of appropriately-structured system or application software that operates in combination beneath the safe-start and is effectively protected or surrounded for the purpose by the anti-crash mechanism 170 with safe-start state machine 178.

In a variation of the embodiment in FIG. 5A, the Vbatminhi threshold, which gates the transition from CRASH state to the second power-up in POWER GOOD state, is set extra high, or high enough so that all application use cases can be handled by the battery 125 alone. A reasonable run-time margin in the Vbatminhi threshold is included to enhance user experience. Analogously, Vbatminlo is set for adequate run-time margin for cleanly or properly closing the applications before state machine 178 inactivates PWGOOD to the system hardware.

In FIGS. 3 and 5A, consider a Scenario #2 wherein the mobile device 110 has an application that can be supported by the charger 105 while the battery 125 is still charging and also later ordinarily when the battery reaches a threshold level of voltage. However, suppose the battery 125 has lately become defective in a way that draws very little current and the battery will not store energy adequately, although the battery voltage does ineffectually rise to the threshold level of voltage Vbatminhi in response to the charger 105. In other words, due to the inadequate charge in the defective battery, the mobile device application cannot actually be supported by the charger-plus-battery combination having this different kind of defect. Notice first of all that this defect is not confused with a charged good battery that would perhaps also accept little charging current. FIG. 5A operations commence in POWER GOOD state, and a full battery does not lead to transitions from POWER GOOD state to NO SUPPLY state in FIG. 5A. Scenario #2 is also distinguished from a situation of battery 125 removed (merely absent from device) but with charger 105 present. For this, a sensing circuit 195 such as a transistor is included in some embodiments to respond to the presence or absence of the battery by supplying a signal BatPresent active (present) or inactive (absent). (Even if a battery cell has an open circuit, one of the other terminals in a battery connector to an e.g. battery pack or to a 4-terminal battery package will indicate an impedance to circuit 195.) If BatPresent is inactive, a display message "Insert Battery" is suitably output. If BatPresent is active, operations analyze the battery 125 as described next. Sensing circuit 195 can also provide a signal ChrgrPresent such a line from Vvbus or responsive to it and indicating charger 105 is physically present and energized.

For this Scenario #2, the embodiment further includes a Bad Battery Detector circuit 199 to support safe-start state machine 178. Bad Battery Detector circuit 199 responds to a fuel gauge 140 measurement X % ChargeLevel and/or the rate of change of X % ChargeLevel or to charging current $I_{BAT}$. Since this defective battery Scenario #2 features insufficient charging current $I_{BAT}$ but adequate charging voltage, some embodiments contemplate use of an electronic detection circuit and process represented by Equation (2) to detect whether both the X % ChargeLevel remains insufficient (<Th2 threshold) for greater than a predetermined amount of time 'TimeTh2' AND the X % ChargeLevel rate of change represented by current magnitude $|I_{BAT}|$ is lower than a threshold value THRate1. Time is counted by a Timer2, which is started when charging current is indicated by the current direction $I_{BAT}<0$ when the operations are in either the NO SUPPLY or CRASH state. (Some embodiments may omit Timer2 and replace the Timer2 Boolean in Equation (2) with the Boolean condition $I_{BAT}<0$.) A bad-battery qualifying condition of sufficient battery voltage Vbat>Vbatmed is included in case the charger 105 has quite low current capacity and a good battery 125 will charge to only a lower voltage than configurable threshold Vbatmed by TimeTh2. Threshold Vbatmed is suitably set less than Vsysminhi so that detecting an actual Scenario #2 bad battery will produce a timely transition to the BadBattery state instead of possibly going to POWER GOOD instead. Electronic detection according to Equation (2) or (2A) or similarly effective equation (such as based on Battery energy $E_{BAT}$ and/or its rate of change) is used to initiate one or more suitable transitions between states in this somewhat more elaborate safe-start state machine 178 embodiment that prevents repeated crashes and can warn the user of the nature of the battery problem. In case of a defective battery, the mobile device is thereby desirably locked out from the battery 125 by applicable transition to a state BADBATTERY in FIG. 5A. The charger subsystem 120, 130, 140 is desirably also arranged to detect a not-charging battery independently from the safe-start mechanism 170, and each can provide desirable redundancy for the other.

$$\text{BadBattery2}=\text{BatPresent }\&[(X\% \text{ ChargeLevel}<\text{Th2})\\ \&(\text{Timer2}>\text{TimeTh2})\&(\textit{V}\text{bat}>\textit{V}\text{batmed})\&\text{Chrgr-}\\ \text{Present }\&(I_{BAT}\mathord{<}{=}0)\&(|I_{BAT}|<\text{ThRate1})] \qquad (2)$$

For use with a truly constant-$I_{BAT}$ current charger 130, see an alternative Equation (2A) representing a circuit and process with a time threshold TimeTh2A set small enough that a good battery would not charge in voltage in excess of Vbatmed, but a bad battery sets a flip-flop FF to supply output BadBattery2:

$$\text{BadBattery2}=\text{BatPresent }\&\text{ FF}[(\textit{V}\text{bat}>\textit{V}\text{batmed})\&\\ (\text{Timer2}{=}\text{TimeTh2}A)\&\text{ChrgrPresent}\&(I_{BAT}\mathord{<}{=}0)] \qquad (2A)$$

Next consider a leaky-battery Scenario #3 that is somewhat like open-battery Scenario #2 in which the mobile device 110 has an application that can be supported in the FIG. 5A supplement mode by the charger 105 while the battery 125 is still charging and ordinarily after the system 160 and battery 125 reach their respective threshold levels of voltage Vsysminhi and Vbatminhi. However, suppose the battery 125 has become defective in a way that draws some current dissipatively as well as perhaps some current that modestly but inadequately does charge the battery to the threshold level of voltage Vbatminhi. In other words, due to the leakage current inside the defective battery, the mobile device application cannot actually be supported by the defective battery. Scenario #3 is suitably handled by an embodiment including a condition in safe-start state machine 178 that responds to a joint function of the voltage $V_{BAT}$, fuel gauge 140 measurement X % ChargeLevel and/or the rate of change of X % ChargeLevel. This type of defective battery has more than insignificant leakage current, or even has excessive leakage current that might cause excessive temperatures and even physical failure of the battery case. The fuel gauge measurement can be useful for establishing state machine 178 embodiments to handle this Scenario #3 as well. In other words, such fuel gauge measurement is useful even if the fuel gauge 140 measures a charging current $I_{BAT}$ or its time integral or time-accumulation and creates an excessive value of X % ChargeLevel due to leakage current contribution, as if the excessive value were a true X % ChargeLevel for a non-defective battery.

To handle this Scenario #3, some embodiments contemplate use of fuel gauge 140 and an electronic detection circuit and process represented by Equation (3) to detect a joint condition that determines whether the X % ChargeLevel is excessive (>Th3 threshold) for greater than a predetermined amount of time TimeTh3 OR the ChargeLevel rate of change magnitude $I_{BAT}$ is greater than a threshold value ThRate2 after charging to a given battery voltage level such as Vbatminhi. Time is counted by a Timer2, which is started when charging current is indicated by the current direction $I_{BAT}<0$ when the operations are in either the NO SUPPLY or CRASH state. (Some embodiments may omit Timer2 and replace the Timer2 Boolean in Equation (3) with the Boolean condition $I_{BAT}<0$.) Such detection is then used to initiate one or more suitable transitions between states in a somewhat more elaborate safe-start state machine 178 embodiment that prevents repeated crashes and can warn the user of the nature of the battery problem. In a case of a condition of this Scenario #3 type that rises to the level of signifying a defective battery as well, the mobile device 110 is desirably locked out from the battery. The charger subsystem 120, 130, 140 is desirably also arranged to detect a not-charging battery of Scenario #3 independently from the safe-start mechanism 170, and each can provide desirable redundancy for the other.

$$\text{BadBattery3}=[(I_{BAT}<0)\&(X\% \text{ ChargeLevel}>\text{Th3})\&\\ (\text{Timer2}>\text{TimeTh3})]\text{OR}[(I_{BAT}<0)\&\\ (|I_{BAT}|>\text{ThRate2})\&(\textit{V}\text{bat}>\textit{V}\text{batminhi})] \qquad (3)$$

For use with a truly constant $I_{BAT}$ current charger 130, see an alternative Equation (3A) representing a circuit and process with a time threshold TimeTh3A set long enough that a good battery should have charged in voltage in excess of Vbatminhi, but a Scenario #3 bad battery does not reach Vbatminhi and so sets a flip-flop FF to supply output BadBattery3:

$$\text{BadBattery3}=FF[(I_{BAT}<0)\&(\textit{V}\text{bat}<\textit{V}\text{batminhi})\&\\ (\text{Timer2}{=}\text{TimeTh3}A)] \qquad (3A)$$

If the problem is unrecoverable except by replacing the battery 125, as indicated by Equation (4), a transition is suitably made from NO SUPPLY state or CRASH state to a BAD BATTERY state in FIG. 5A. In BAD BATTERY state, the system power is deactivated by PWGOOD=1 (high inactive), keeping the crash timer reset, and sending to a display a User Warning recommending battery replacement and indicating the nature of the battery defect. The transition condition to initiate the electronic transition from CRASH state to BAD BATTERY state is suitably that either Equation (2) or (3) be true, as represented by Equation (4). Bad Battery Detector circuit 199 electronically implements, e.g., Equations (2), (3), (4) or other effective bad battery detection operations. Notice that the charging behavior of a merely-discharged good battery 125 does not meet the conditions of being a bad battery in Equations (2), (3), (4). Put another way, some embodiments provide a beneficial mutual exclusivity or priority of one, some or all of BadBattery2 (or other open battery detection logic), BadBattery3 (or other leaky battery detection logic), or BadBattery transition logic. Such logics are suitably given mutual exclusivity or priority over at least one other state transition such as transition to POWER GOOD (PWGOOD active) from a state wherein e.g. PWGOOD is inactive.

$$\text{BadBattery}=\text{BadBattery2 OR BadBattery3} \qquad (4)$$

Some alternative embodiments also provide for a detection and transition from one, some or all of BadBattery2, BadBattery3, or BadBattery from POWER GOOD state. For instance, excessive or even dangerous battery internal current leakage might be detected only near full 100% battery 125 charge level in POWER GOOD state. Some other states include qualification (AND, NAND) logic for qualification by one, some or all of BadBattery2, BadBattery3, or Bad-Battery with a given state machine 178 (or 278, etc) state such as NO SUPPLY, CRASH or COMB or COMB2 or COMB3. One way such a latter qualification can be useful distinguishes open-battery Scenario #2 from a full battery. A full battery does not lead to transitions from POWER GOOD state to NO SUPPLY state in FIG. 5A for instance. In some embodiments, if the bad battery detector 199 is also operative in POWER GOOD state, qualifying Equation (2) for Scenario #2 with NO SUPPLY state active would be beneficial.

Regarding the Bad Battery detection in e.g. FIGS. 5A, 5D, 5E, and 5F, when the Bad Battery condition or detection disappears, the circuit comes back to previous state or starting state. For instance, the circuit is made to respond to an event of physical insertion of a battery to re-initialize operations to starting state.

In FIG. 5A, state machine 178 is arranged in this example to also robustly permit some use, to the extent possible and safe, with a battery that has somewhat less than brand-new level of operability. For example, suppose a battery is either a little more leaky than it should be or a little diminished in capacity bordering on Scenario #2 or #3, but the battery will take a charge that can power the mobile device for some useful time interval at a useful voltage level. In that case, state machine 178 quite slowly over time might execute a usefully-long cycle of states POWERGOOD, CRASH DETECTION, CRASH, POWERGOOD, CRASH DETECTION, CRASH, etc. The system 110 in some embodiments thereby could permit functional circuitry 160 to deliver some emergency operations or other functional operations with useful durations during the usefully-long cycle in contrast with the rapidly repeating useless crashes depicted in FIG. 1.

Compared to FIG. 5A, the safe-start state machine 178 in some embodiments replaces or supplements the $V_{BAT}$>Vbatminhi condition with a joint condition: 1) sufficient system voltage Vsys>Vsysminhi, AND 2) sufficient charge level X % ChargeLevel is present as indicated by X % ChargeLevel>Th4. Threshold Th4 is set to a suitable configured threshold value.

In FIG. 5D, the state transition diagram for an alternative state machine 278 embodiment is rearranged so that it has somewhat different transition logic than in FIG. 5A. State machine 278 powers up and defaults to any particular predetermined default state, e.g., the POWER GOOD state. If the state machine 278 detects a system undervoltage condition represented by the Boolean expression Vsys<Vsysminlo, such as from low battery or inadequate charger current, then a transition is made to a CRASH DETECTION state that causes deactivation PWGOOD=1 (which de-activates system 160) and then starts the crash timer 176.

In FIG. 5D, a COMBINED state is provided as an amalgam of the NO SUPPLY state and CRASH state of FIG. 5A, which have different transition conditions to respectively reach them in FIG. 5A. Accordingly, in FIG. 5D an electronic transition from CRASH DETECTION state to get to the COMBINED state is made by state machine 278 when a combined Boolean condition C is true, i.e. when a crash-timer 176 timeout is accompanied by insufficient system voltage Vsys<Vsysminhi OR, instead, when simply it is true that a sufficient system voltage Vsys>Vsysminhi has occurred even if briefly due to a charger 105. Notice that an equivalent condition C could be implemented by alternative electronic logic to set condition C to logic one when either a crashtimer timeout has occurred or it is true that a sufficient system voltage Vsys>Vsysminhi has been obtained without the crash timer timing out. This equivalence is seen by letting a first Boolean A=(Vsys<Vsysminhi) and a second Boolean B=crashtimer timeout. Then apply the following Boolean logic identity of Equation (5):

$$AB+!A=AB+(!A)(B+!B)=(A+!A)B+!A!B=B+!A!B=C \qquad (5)$$

In FIG. 5D, State machine 278 in the COMBINED state maintains PWGOOD deactivated (e.g. =1, system off), and that COMBINED state waits for a charger 105 to be connected and energized if a charger has not already been thus provided. If a BadBattery condition of Equation (4) is detected while operations are in the COMBINED state, a transition to a BAD BATTERY state is included if desired to warn user and lock out the battery. Ordinarily, a transition is made from the COMBINED state to the POWER GOOD state when successful charging is indicated by both sufficient system voltage Vsys>Vsysminhi, AND sufficient battery voltage Vbat>Vbatminhi being present. The POWER GOOD state activates PWGOOD=0 and resets the crash timer 176. Thereafter, a transition in FIG. 5D from the POWER GOOD state to the CRASH DETECTION state can occur upon a subsequent system undervoltage similar to that transition in FIG. 5A if and when Vsys<Vsysminlo occurs. In some embodiments, the subdivided POWER GOOD state of FIG. 5C is also introduced into FIG. 5D if desired.

In FIG. 5E, a state transition diagram for another alternative state machine 288 embodiment is rearranged so that it has different transition logic and states of operation than in FIG. 5A or 5C or 5D. State machine 288 powers up and defaults to any particular predetermined default state, e.g., the POWER GOOD state. In FIG. 5E and FIG. 4, an input line from comparator 174 to state machine 288 logic is included so that if FIG. 4 comparator 174 detects a low battery condition (Vbat<Vbatminlo) during POWER GOOD state, then a transition is made to a CRASH DETECTION2 state that maintains activation PWGOOD=0 and then starts the crash timer 176. CRASH DETECTION2 state thus keeps system 160 powered instead of being Off as in the FIG. 5A CRASH DETECTION state.

This FIG. 5E embodiment accommodates a system circuit 160 that independently does an orderly shutdown in response to low battery condition (Vbat<Vbatminlo). As noted earlier hereinabove, threshold Vsysminlo can be set in a way to implicitly allow enough time for a clean system shutdown in case of low battery. Using the low battery condition Vbat<Vbatminlo to trigger the transition into CRASH DETECTION2 can save some time elapsing before getting crash timer 176 started in FIG. 5E relative to some time that might be consumed in FIG. 5D POWER GOOD state between the instant of Vbat<Vbatminlo and the instant of Vsys<Vsysminlo. In FIG. 5E, the crash timer 176 timeout interval Crashtime is explicitly set long enough to encompass a reasonable interval needed for the system including circuit 160 to do such orderly shut down.

In FIG. 5E, when the crash timer 176 then times out, state machine 288 executes a transition from CRASH DETECTION2 state to a COMBINED2 state that resets the crash timer 176 and deactivates PWGOOD (e.g. high inactive=1), which now does remove power from system 160. State machine 288 in the COMBINED2 state waits for a charger 105 to be connected if a charger has not already been provided. In FIG. 5E, the COMBINED2 state is provided as an amalgam of the NO SUPPLY state and CRASH state of FIG. 5A. If a BadBattery condition of Equation (4) is detected, a transition from the COMBINED2 state to a BAD BATTERY state is included if desired to warn user and lock out the battery. In some embodiments, the subdivided POWER GOOD state of FIG. 5C is also introduced into FIG. 5E if desired.

Turning to FIG. 5F, a state transition diagram for another alternative state machine 298 embodiment is rearranged for extreme simplicity and economy so that it has different transition logic and states of operation than in any of FIGS. 5A-5E. State machine 298 powers up and defaults, e.g., to a COMBINED3 state that outputs inactive PWGOOD=1 for FIG. 3 system FSM/power management circuit 180 to at least initially keep current $I_{SYS}$ off to system 160. Ordinarily, a transition in FIG. 5F is soon made from the COMBINED3 state to the POWER GOOD state when an at-least-partially charged battery 125 is present or successful charging of battery 125 has occurred or a battery charger 105 is connected and adequate to satisfy the conditions of sufficient system voltage Vsys>Vsysminhi, AND sufficient battery voltage Vbat>Vbatminhi being present.

In FIG. 5F, the POWER GOOD state activates PWGOOD=0 to system FSM/power management circuit 180. Subsequently, a transition in FIG. 5F from the POWER GOOD state back to the COMBINED3 state can occur upon a subsequent system undervoltage if and when Vsys<Vsysminlo occurs. State machine 298 in COMBINED3 state then waits for a charger 105 to be connected and energized if a charger has not already been thus provided. COMBINED3 state can also trigger a display message "Connect and Energize Battery Charger" if no energized battery charger is detected by a suitable sensor circuit, e.g. in FIG. 16A. If a BadBattery condition of Equation (4) is detected while operations are in the FIG. 5F COMBINED3 state, a transition to a BAD BATTERY state is included if desired to warn user and lock out the battery.

In FIG. 5F, moreover, the circuit addresses a Scenario #4 wherein the battery is a dissipatively bad battery and the charger 105 is inadvertently still connected and powerful enough to bring the battery voltage up so Vbat>Vbatminhi and Vsys>Vsysminhi and state machine 298 transitions to POWER GOOD state and charger 105 powers the system 150, 160 and battery 125 thereafter. If a BadBattery condition of Equation (4) is detected while operations are in the POWER GOOD state, a transition to a BAD BATTERY state is included as well to warn user and lock out the battery Note further in FIG. 5F that the COMBINED3 state is provided as if an amalgam of the NO SUPPLY state, CRASH DETECT state and CRASH state of FIG. 5A. Crash timer 176 can be omitted from FIG. 4 when using the FIG. 5F embodiment. As noted earlier hereinabove, threshold Vsysminlo can be set in a way to implicitly allow enough time for a clean system 160 shutdown in case of low system voltage Vsys<Vsysminlo. In some embodiments, the subdivided POWER GOOD state of FIG. 5C is also introduced into FIG. 5F if desired.

Under the definitions of Vsysminhi and Vbatminhi earlier above, the transition from the applicable one of a CRASH state or a given COMBINED (_ or _2 or _3) state generally would occur in FIGS. 5A-5F when battery 125 is charged partially and at least enough to power the system 150, 160 for some moderate, useful interval. It should be understood that safe-start state machine 178 thus provides basic protections and an at least adequate amount of charging and then reaches the POWER GOOD state in which charging can continue unless the system current drain exceeds the maximum current $I_{VBUS}$ that the charger 105 can deliver. Thus the battery will ordinarily continue to charge beyond the moderate amount that caused safe-start state machine to initially reach the POWER GOOD state unless the user then decides to use the system 160 to a degree that exceeds the available $I_{VBUS}$ current level of the charger 105 while state machine 178 is in the POWER GOOD state. Leaving this discretion to the user to use the system before battery 125 might be fully charged is believed to be acceptable and indeed desirable. In the POWER GOOD state if the system is OFF, then charging can continue until the battery 125 is full. In the POWER GOOD state if the system is ON with minimal application current involved or with no applications running, then charging can also continue until the battery 125 is full. In the POWER GOOD state if the system is ON with moderate, varying application current involved such as with some applications running with varying activity, then charging can also continue but it may take a longer time until the battery 125 is full. In the POWER GOOD state if the system is ON with high levels of varying system current $I_{SYS}$ involved such as with some applications running very actively and continually, then charging might occasionally occur during short intervals of lower system current $I_{SYS}$ but the high current drain would likely decrease the battery charge level significantly. In that case, it would be desirable to defer the very active operation so the battery can be charged up some more in the meantime.

In FIG. 6, the interaction and effects of PWGOOD signal provided to the processor system power management state machine FSM 180 are shown. PWGOOD is treated as an important one of the power-on/power-off conditions as follows: 1) PWGOOD high is a power-off condition, 2) PWGOOD falling edge is a power-on condition, and 3) PWGOOD low with any start-up event is a power-on condition.

In FIG. 6, the PWGOOD signal is added, such as with any appropriate logic 185 (e.g., combinational logic such as any of OR, NOR, AND-OR, NAND-NOR, etc.) and coupled with FSM 180. PWGOOD is thus used as an important input to such logic 185. In this way PWGOOD active allows FSM 180 to power up system blocks 150, 160 by any suitable operations provided in FSM 180. FIG. 6 shows logic 185 responsive to PWGOOD falling edge as a power-on condition OR PWGOOD active (low) as a qualifying input whereupon power-up occurs in response to any startup event like user key-press, etc. PWGOOD inactive causes FSM 180 to transition from any FSM 180 state to an Off state in FSM 180 in FIG. 6 instead and thereby force system 160 to a power-off state.

In some functional circuits, a return to a powered up state can be speeded up if the system 160 is instead put in a reduced power state other than the Off state in response to PWGOOD inactive. Accordingly, it is emphasized that the "Off" state is referred to herein in a relatively generic way and without limitation. Various embodiments can have various circuits put in suspend, sleep, retention, off, or other types of reduced power conditions respectively provided for circuits individually or some or all of the circuits together and in a manner that may be statically configured in some embodiments or may dynamically take account of and respond to the amount of charger 105 current that is available in some other embodiments.

The structure and process embodiments of FIGS. 3-6 together show some examples of an electronic control circuit for use with a rechargeable battery, where the electronic control circuit includes a power conditioner or powering circuit (e.g. blocks 120, 130) having an electrical input for charger 105, a battery-related charging output for connection to battery 125, and a power voltage output line such as to device power distribution 150. A functional electronic circuit such as processor 160 via its power distribution 150 or otherwise is coupled to the voltage output of the powering circuit, e.g. to DC/DC portion 120. The functional electronic circuit, e.g. 160, is subject to operational interruption if the functional electronic circuit uses more current $I_{SYS}$ to usefully operate than is currently available from the powering circuit such as current $I_{VBUS}$. A safe-start mechanism 170 is coupled to the powering circuit, e.g. at DC/DC portion 120 for $V_{SYS}$ and/or linear charger portion 130 for $V_{BAT}$. Safe-start mechanism 170 is also coupled to the functional electronic circuit 160 such as by the PWGOOD control line and FSM 180. Safe-start mechanism 170 remarkably detects such operational interruption of the functional electronic circuit like 160 and thereafter causes it to be substantially powered-down (such as by inactivating PWGOOD). This PWGOOD inactive condition continues, keeps and maintains that power-down until the charging output for $V_{BAT}$ and/or for $I_{BAT}$ indicates sufficient charging to support subsequent useful operation by the functional electronic circuit.

Safe-start mechanism 170 operates thereupon to provide the PWGOOD signal active to allow such operation.

The embodiments remarkably prevent system power-up instability after a less-than fully adequate charger adapter plug-in, while providing at least temporary and adequate user experience when the user may want it during charging. Such type of embodiment is different from a method that identifies the charger before taking a power-up decision that is in USB.org "Battery Charging Specification revision 1.2". It is believed that method does not probably work with charger adapters not fulfilling the standards specification.

Among the advantages of various ones of the embodiments are any one or more of 1) flexibility to work with any dummy charger adapter outside standard specifications, 2) provide better possible system quick start, 3) no need to rely on charger detection for taking a power-on decision, 4) no need of feedback signal from the system nor need to monitor SW execution.

Various embodiments improve user-experience by extending product operation range. The circuitry adaptively learns a system behavior with unknown charger adapter, and can work with any system or wide variety of applicable systems to which its advantages commend it. Modification of a pre-existing platform power-up state machine FSM 180 to introduce PWGOOD input for system safe-start operation is economically implemented. Anti-crash mechanism 170 secures system operation start in a dead battery situation, whatever the charger characteristics, and therefore eliminates device deadlock risk for the end user.

PWGOOD, or a substantially similar control provided as taught herein but with some other name, can be generated by circuitry and/or software arranged have either a logic high or low represent its active state and the complementary logic level represent its inactive state. Note that electronic circuits for producing PWGOOD and any of various other signals in various embodiments can have high-active logic, or low-active logic instead, or mixtures of high or low active logic in different parts of the circuit or software. Some embodiments can encode PWGOOD states in the form of multiple-bits for error correcting code (ECC) purposes and/or for embodiments having more than two useful states of PWGOOD. ECC can be useful in high noise or other demanding environments or system specifications. More than two states of PWGOOD might be used to represent and trigger some intermediate state of system functionality or of power conservation as in FIGS. 5A or 5B, or to respond to multiple POWER GOOD1, 2, etc states of FIG. 5C.

In FIGS. 7-8, power path operation as shown involves delivery of system supply power that is derived from a battery when no external power source is connected to USB or DC input. System supply voltage $V_{SYS}$ node is shown unregulated and follows battery voltage in such case even if or when some voltage regulation is employed deeper into block 150 or functional circuit 160. When an external power source 105 is connected through a USB or DC auxiliary input, the battery discharging path (FIG. 18) is inactive and battery 125 is charging as far as external power source 105 can sustain system load. If system load comes to increase so that external source 105 cannot sustain system load, system supply voltage $V_{SYS}$ starts to drop. If system supply voltage $V_{SYS}$ drops below battery voltage $V_{BAT}$, the battery discharging path becomes active supplementing the system supply with battery. FIGS. 7-8 show battery and system voltage behaviors during battery charging and in case of supplement mode and are described further elsewhere herein.

Figure 9A:
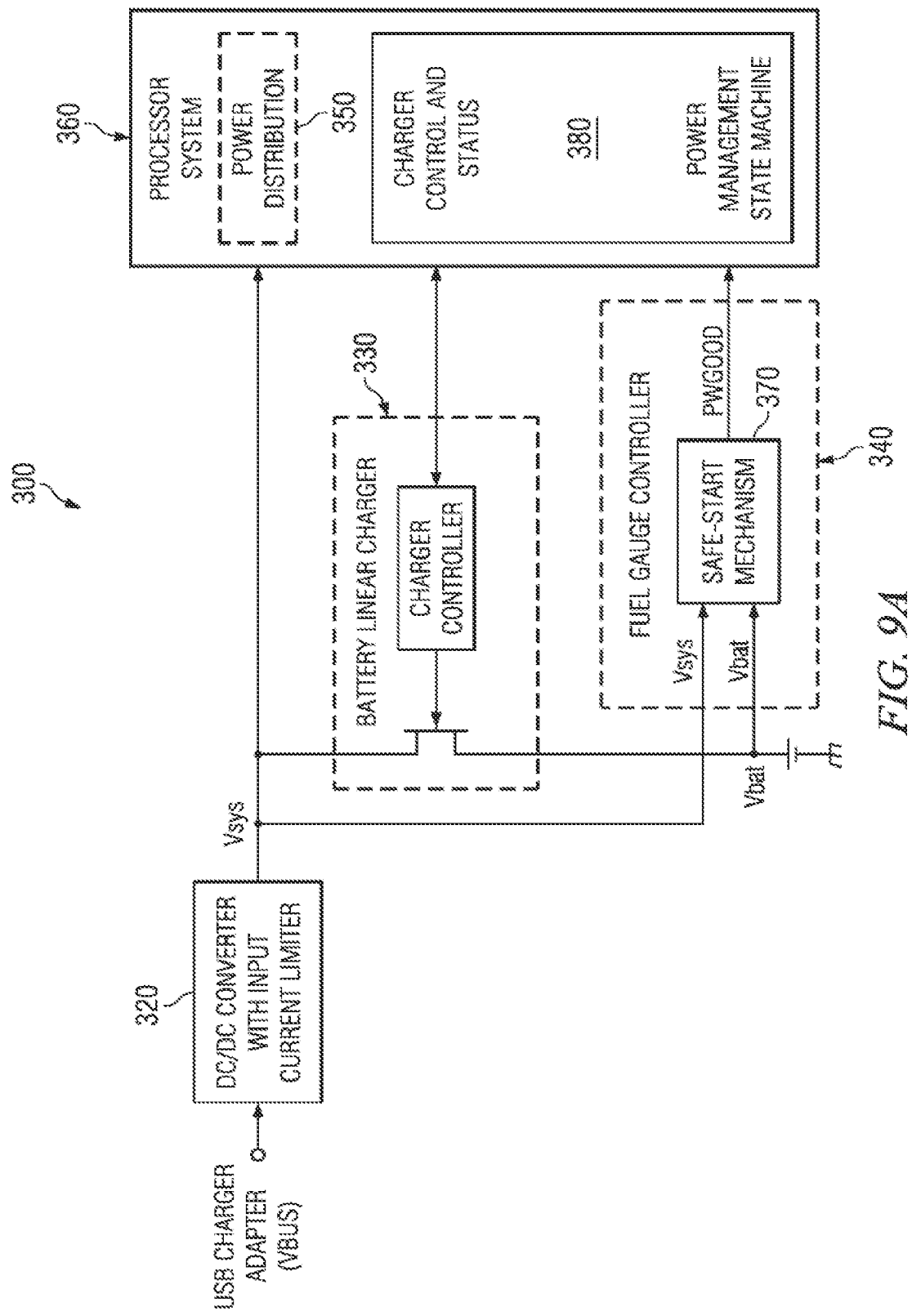
FIG. 9A is a block diagram of another device embodiment including a fuel gauge/controller sub-combination embodiment having a safe start mechanism circuit embodiment of any of FIGS. 4-5E or FIGS. 20 and 21 or 22.

In FIG. 9A, another protective safe-start system embodiment 300 has a safe-starting anti-crash-loop mechanism 370 (170) integrated into a Fuel Gauge controller 340, and in combination they together continuously monitor Battery voltage $V_{BAT}$ and System Supply voltage $V_{SYS}$ and fuel-gauge level X % ChargeLevel for controlling power management state machine 380. Interaction or coupling with processor system 360 provides the PWGOOD signal from a safe-start state machine (e.g. 178, 278, or otherwise) in anti-crash-loop mechanism 370 to a processor system power management state machine 380 as an important one of the power-on/power-off conditions. The PWGOOD signal is used to allow the system 360 to power-up or to force power management state machine 380 to an Off state or other appropriate state instead. Safe-starting anti-crash-loop mechanism 370 in some embodiments is thus made part of a fuel-gauge controller 340 to economically benefit by resource-sharing of voltage measurement function and micro-controller functions in Fuel Gauge controller 340 and integrate the Safe-start mechanism 370 into a low-cost system 300.

Accordingly, the specific circuitry 3xx of system 300 in FIG. 9A may differ economically and operationally from the approximately-corresponding circuitry 1xx of system 100 in FIG. 3, while similar block-level functions are assigned corresponding reference digits "xx" to point out the correspondences without need of further description. In some other embodiments, the safe-starting anti-crash-loop mechanism 370 is alternatively and feasibly made part of a chip with respect to which the fuel-gauge and battery are separate and connected. In other words, various embodiments can be provided by partitioning and/or combining the circuitry of FIG. 3 in different ways.

Various embodiments can thus be used to upgrade various electronic circuits and systems, applications processors, and mobile devices and modules. The embodiments can be implemented in battery fuel-gauge products and charger-plus-fuel-gauge combo products, and in or with various battery-impedance tracking circuits, and can be added to battery packs, power management integrated circuits and all other components, devices and systems to which their advantages commend their use. Such system applications can include smart phones, PDAs, digital still and video cameras, handheld terminals, and audio content players or multimedia players, among other devices.

Figure 9B:
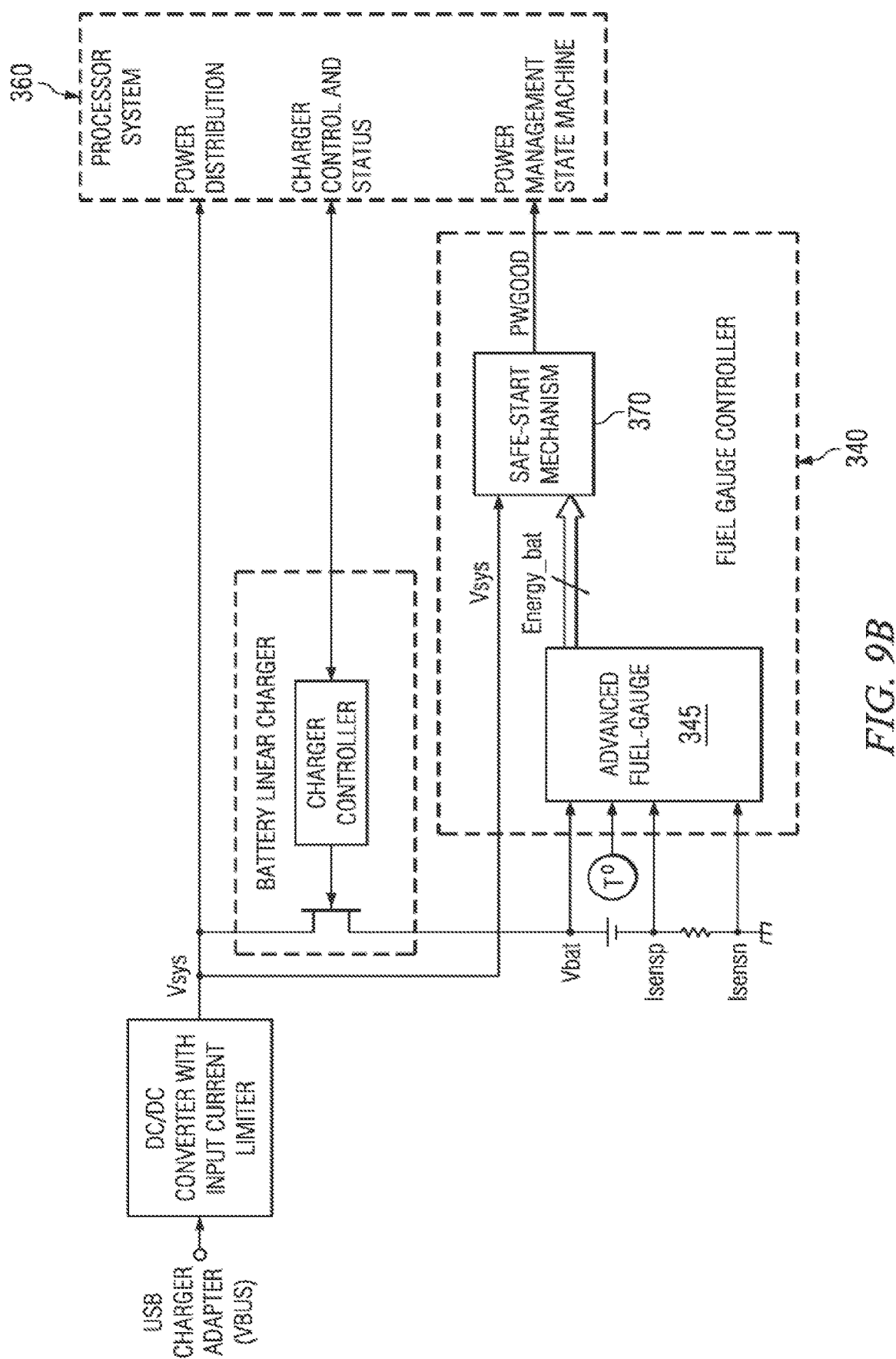
FIG. 9B is a block diagram of a further device embodiment including a fuel gauge/controller sub-combination embodiment having a safe start mechanism circuit embodiment of FIGS. 9C and 9D, or FIGS. 23 and 24 or 25, and current sensing.

In FIG. 9B, an enhanced embodiment of a fuel gauge controller 340 with advanced fuel-gauge processing 345 uses a safe-start mechanism 370 monitoring battery voltage $V_{BAT}$ to check if the system is able to operate successfully from the battery following a crash situation. However, in some embodiments it is desirable to track the battery energy. Battery voltage $V_{BAT}$ is highly dependent on battery pack temperature and battery age so that $V_{BAT}$ may only approximately represent the energy accumulated into the battery 125. In FIG. 9B, an alternative for safe-start mechanism 370 employs an advanced Fuel Gauge (FG) process for electronically generating a measured or estimated value representing the battery accumulated energy level instead of $V_{BAT}$ measurement alone. Such advanced Fuel Gauge can measure such variables as battery voltage $V_{BAT}$, instantaneous battery current $I_{BAT}$, and battery pack temperature $T_{BAT}$ (see temperature sensor for T°) to calculate battery accumulated energy in Amp-hour, percentage of total battery capacity, or remaining run-time in seconds, all as various functions of a measured variables.

Figure 9C:
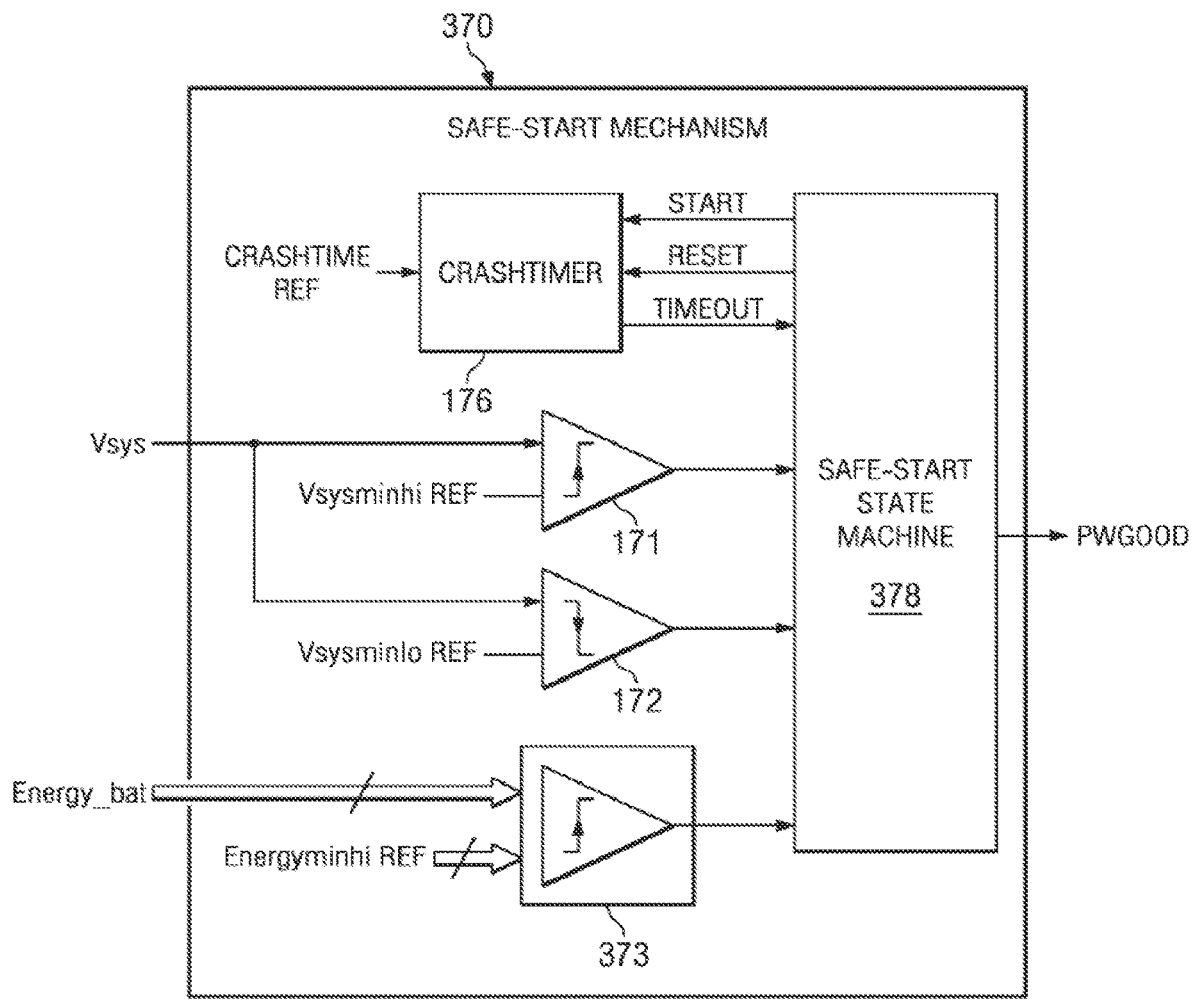
FIG. 9C is a block diagram of an anti-crash loop mechanism embodiment for use in the electronic device of FIG. 9B.

In FIG. 9B, anti-crash-loop mechanism 370 includes a safe-start state machine 378 of FIG. 9C. The measurements available to the anti-crash mechanism 370 not only include system voltage $V_{SYS}$ and battery voltage $V_{BAT}$ but also a sensing voltage proportional to battery current $I_{BAT}$ from a current-sensing low series resistance with terminals Isensp, Isensn. In this way, the embodiment can deduce whether a charger of sufficient or insufficient capacity is connected, as well as make battery energy measurements to help control the operations during charging and discharging.

In FIG. 9C, an energy level digital comparator 373 replaces Vbat comparator 173 of FIG. 4. Comparators 171 and 172 and crashtimer 176 are similar to those of FIG. 4. A threshold Energyminhi is set to the minimum battery accumulated energy needed to operate the system successfully when operating from battery 125 only. The Energy_bat signal from fuel-gauge circuit 345 and an Energyminhi reference are provided to a comparator 373 as digital values representing any one or more of the estimated battery accumulated energy in Amp-hours (Ah), percentage of battery total capacity, or remaining run-time in seconds.

Figure 9D:
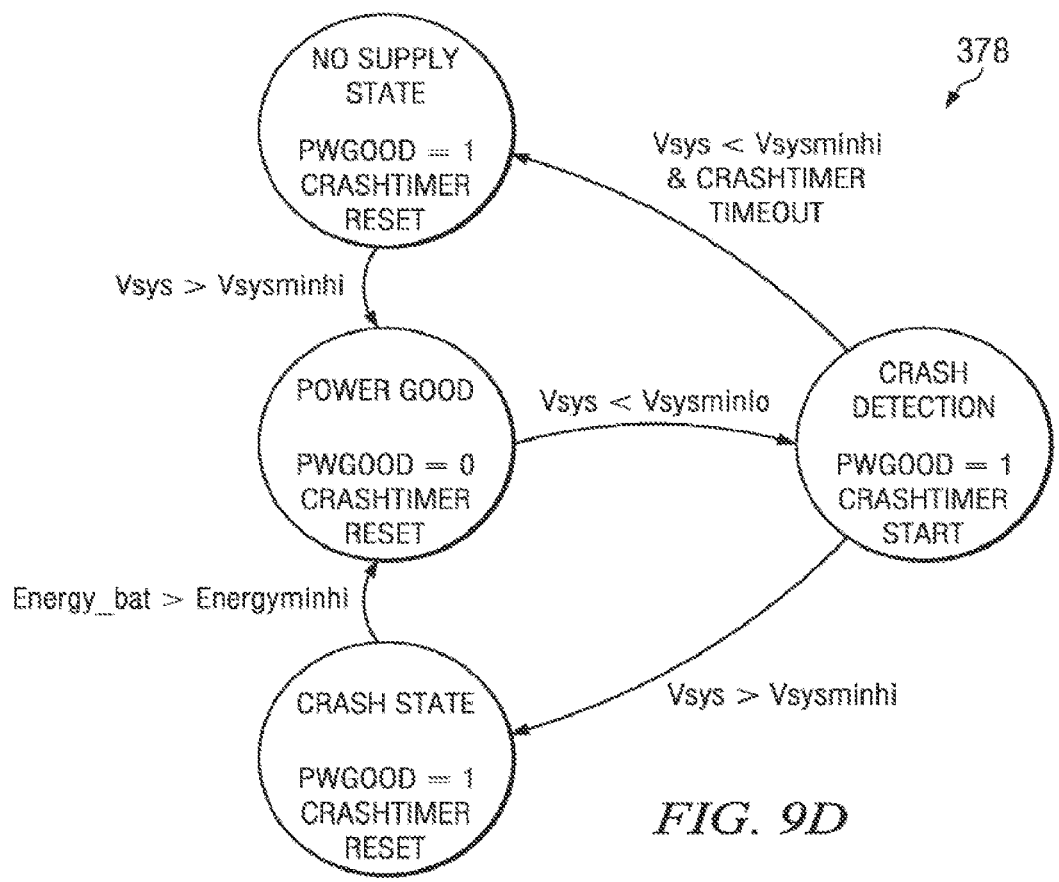
FIG. 9D is a state transition diagram of a state machine embodiment for use in the anti-crash loop mechanism of any of FIGS. 9B, 9C, 10A, and 16A and producing a power-good control signal PWGOOD.

In FIG. 9D, anti-crash mechanism 370 of FIGS. 9B and 9C includes a safe-start state machine 378 as detailed. The transition from CRASH state to POWER GOOD state is triggered when battery energy exceeds an energy reference, i.e., Energy_bat>Energyminhi. When a charger of insufficient charging capacity $I_{VBUS}$ is present, the logic prevents a transition from CRASH state to POWER GOOD state until the energy condition is satisfied.

Also, in some embodiments when a charger of sufficient capacity is present, the state machine 378 is arranged to transition sooner in response to an alternative condition (6):

$$(\text{Energy\_bat} > \text{Energyminhi}) \text{ OR } [(V_{SYS} > V\text{sysminhi}) \& (I_{BAT} > \text{Th5})] \quad (6)$$

Condition (6) expresses the situation where the charger 105 is not only present but because both the system voltage is adequate and also the battery current $I_{BAT}$ exceeds a threshold current level Th5 such as some quite substantial positive charging level that should support many or all anticipated application current loads in circuit 160. In that case, the measurements demonstrate that the charger is a fully adequate capacity charger and not an insufficient capacity charger or charging scenario. The rest of the description of safe-start state machine 378 tracks that of FIG. 5A. Notice that CRASH state could be reached if the system circuit 160 (360) had earlier drained the battery and put it in CRASH DETECT state, whereupon a charger of fully adequate capacity were then connected. This case is believed relatively unlikely because the NO SUPPLY state would be reached by state machine 178 as soon as the brief Crashtime period had elapsed, and then the POWER GOOD state would be reached as soon as any charger were connected. But in that case, or in some state machine embodiment having a longer crashtime period otherwise rearranged to have this case be relevant, it would be desirable to have the ($I_{BAT}$>Th5) part of Condition (6) to take the system back from some CRASH state (or from some combined No Supply/Crash state as in FIG. 9E) to POWER GOOD even though the battery were still low.

Figure 9E:
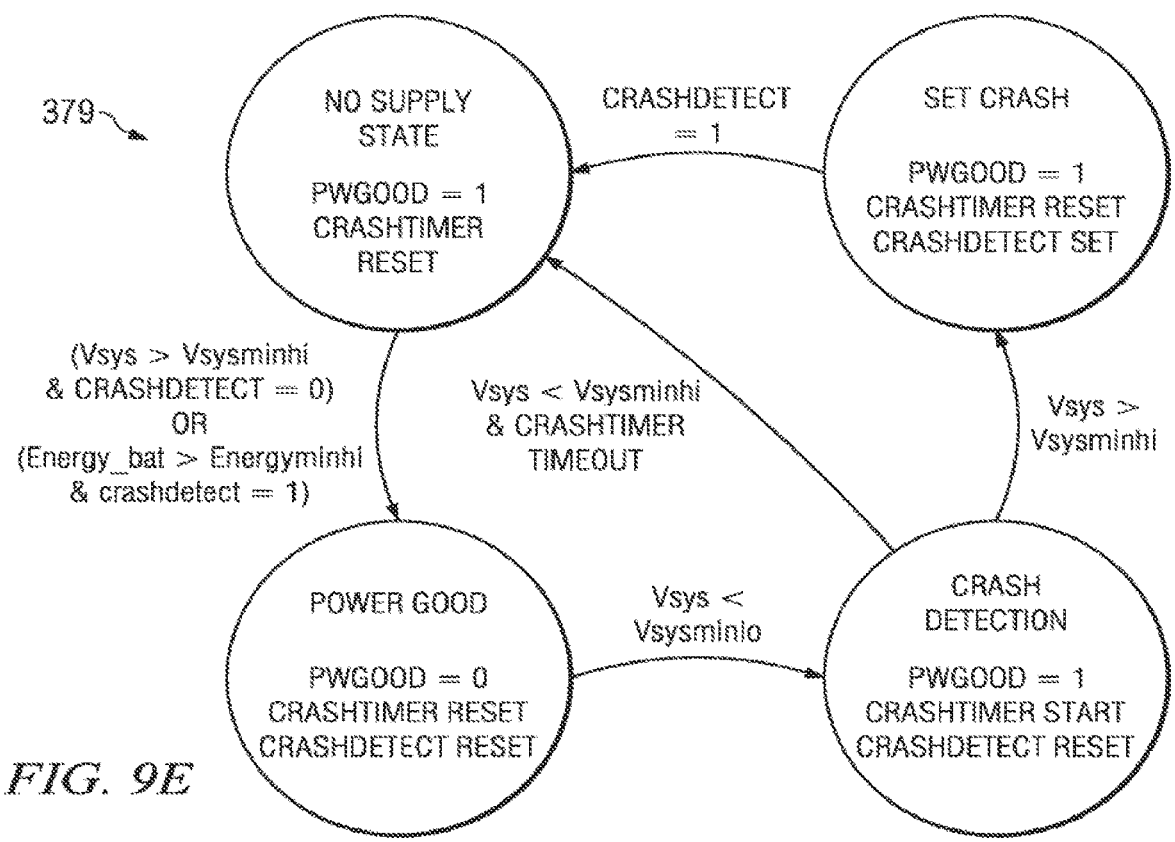
FIG. 9E is an alternative state transition diagram of a state machine embodiment for use in the anti-crash loop mechanism of any of FIGS. 9B, 9C, 10A, and 16A and producing a power-good control signal PWGOOD.

In FIG. 9E, an alternative state transition diagram is shown for an alternative safe-start state machine 379 for anti-crash-loop mechanism 370. The description of FIG. 9E tracks that of FIG. 5B except that in the transition logic between NO SUPPLY state and POWER GOOD state, the FIG. 5B Boolean involving battery voltage Vbat>Vbatminhi is replaced by an analogous FIG. 9E Boolean involving battery energy Energy_bat>Energyminhi instead. Some embodiments also provide battery energy thresholds to control other transitions in place of the illustrated transition conditions. For example a transition condition such as Energy_bat<Energyminlo is suitably used in place of the illustrated Vsys<Vsysminlo to control the transition from POWER GOOD state to CRASH DETECTION state. If a charger is connected at the time, the transition condition can be expanded to include current-related aspects as well.

Figure 10A:
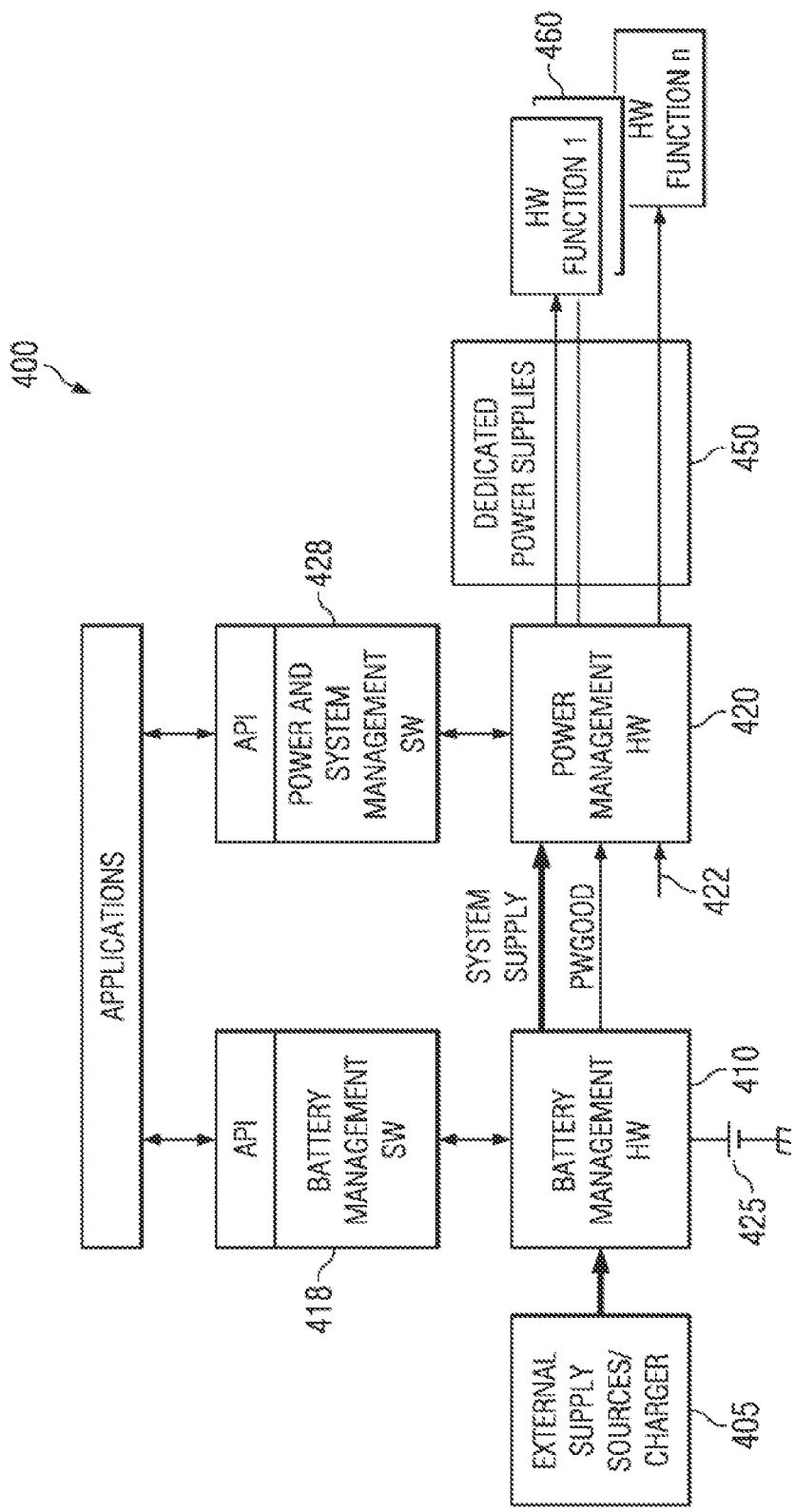
FIG. 10A is a block diagram of a further device embodiment including hardware HW and software SW blocks with a safe start mechanism therein in hardware, software, or both, analogous to FIG. 3, 9A or 9B and any of the state transition diagram Figures herein.

In FIG. 10A, an embodiment 400 provides battery management hardware 410 separate from and coupled with power and system management circuitry 420 such as for power up control. Each of these circuits 410, 420 are coupled with corresponding software modules 418, 428 in stored in memory for supporting and controlling them. Thus, battery management and power and system management are separated or split from both the hardware and software points of view. Voltage measurement circuits in battery management hardware 410 connect to an inexpensive battery management microcontroller that is also situated in hardware 410. The voltage measurement circuits include circuits with comparators analogous to those in FIG. 4 or 9C with programmable reference voltages and/or circuits with analog-to-digital ADC measurement, which are used to sense external supply sources such as Vbat, Energy_bat, and Vsys of FIGS. 3, 9A, 9B, etc. Some embodiments have analog-to-digital circuits for voltage and/or current measurements and to provide comparison outputs as well. Embodiments can have the safe start mechanism 170 (370) be either implemented as software/firmware into a programmable microcontroller system 410 as in FIG. 10A or alternatively as a hardcoded logic state-machine hardwired into the fuel gauge IC 340 in the battery management hardware of FIG. 9A or provided instead into the system 110 as shown in FIG. 3. A safe-start state machine 178, 179, 278, 288, 298, 378, 379, 778, 779, 978, or 979 of various transition diagram Figures or otherwise may be used in FIG. 10A. In the FIG. 10A software/firmware case, one implementation example provides the safe-start state machine as a firmware executable on a MSP430™ microcontroller from Texas Instruments Inc., Dallas, Tex., as a soft state machine. This safe-start state machine then receives and sends signals between it and the rest of the system 400 through microcontroller lines and bus connections.

Figure 10B:
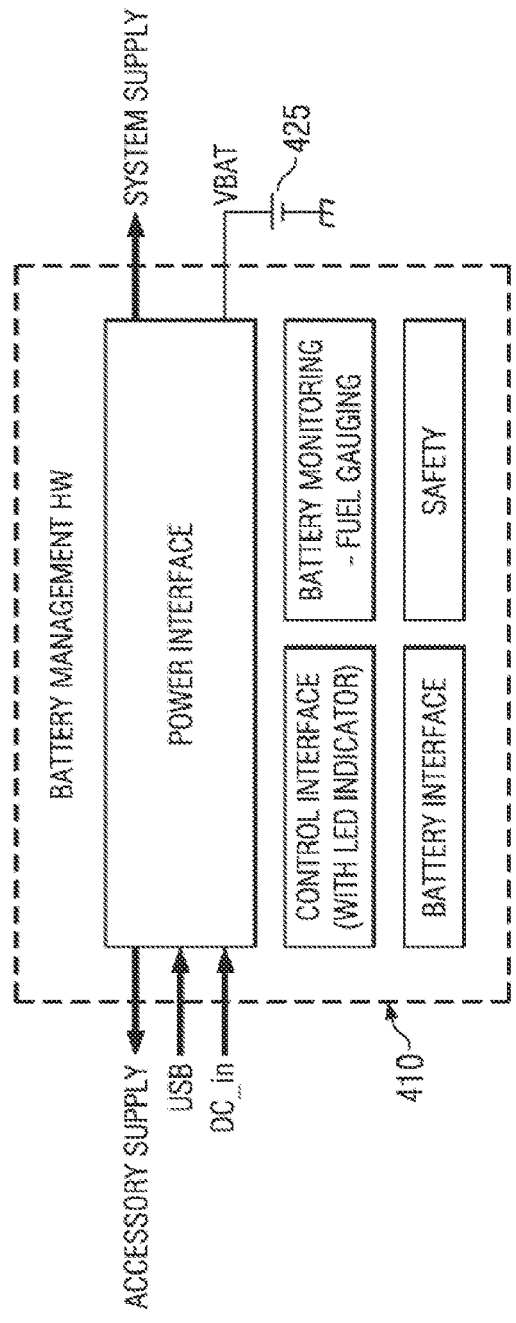
FIG. 10B is a block diagram detailing battery management HW for an embodiment of FIG. 10A and as in FIGS. 3-6 or other analogous Figures herein.

In FIGS. 10A and 10B, battery management 410 integration in the system 400 is also illustrated. Battery management 410 includes battery monitoring and gauging features and alerts the system for software cut-off control when the battery 425 is losing almost all charge and becoming dead. In some embodiments the FIG. 10B Battery monitoring—Fuel Gauging block in battery management HW 410 has a hardware state machine as represented by any of the transition diagram Figures herein. In FIG. 10A, power management 420 includes system supply monitoring for safe-controlled HW system cut-off. Backup battery function is or can be also included in power management sub-system 420. Both battery management 410 and power management 420 are coupled with their software 418 and 428 stored in a memory. In some embodiments they are further coupled via API (application peripheral interface) software to an operating system OS and applications on a main applications processor or system processor in a HW function 460.$i$ of FIG. 10A such as a module, core, or accelerator in functional circuit 160 of FIG. 3.

Battery Management 410 and Power Management 420 are specific functions. Battery management 410 pertains to type of battery and charger, and operations and controls configurable by user or manufacturer. Power Management 420 is used to control power distribution such as dedicated controllable power supplies 450 for functional circuitry 460 in the system, and for instance can be application processor specific. The battery management hardware 410 couples any or all the following information, for instance, to the battery management software 418: battery voltage $V_{BAT}$, energy level, charge level or X % ChargeLevel, external power connection, and charging state. Battery management 410 can have features such as in FIG. 16A for USB charging input, detection and protections; system supply management (power path), thermal safety for heat sources, battery safety circuits including battery over-voltage, over-current, over-temperature of That; battery temperature Tbat sensing; battery removal detection; and a hardware control interface. Various customizable features can include DC charging input, DC charger detections and protections, battery monitoring and gauging, and battery interface status indicia such as presence, identification, and authentication. A charge indicator such as an LED as in FIG. 16A or display screen-based charge indication is also suitably provided.

In FIG. 10A, for battery and system voltage start-up and shut-down conditions, battery management 410 and power management 420 provide distinct functional blocks in some system embodiments 400. Consequently, battery and system voltage start-up and shut-down conditions are partitioned between those two functional blocks 410, 420. Providing a safe-start state machine as in FIG. 5A in battery management sub-system 410 is believed more flexible or customizable regarding battery characteristics. Accordingly, battery management 410 manages the startup and shut-down conditions from energy standpoint, and provides the PWGOOD signal to power management 420 to allow system hardware functions 460 to be powered-on or not by controllable power distribution/supplies 450. Battery management 410 suitably provides/uses Vbatminhi and Vbatminlo start-up and shut-down triggers when running on battery 425, and provides/uses Vsysminhi and Vsysminlo or other suitable start-up and shut-down triggers when running on charger or combo. Battery management 410 provides or includes a safe start mechanism like block 170 for anti-crash operation that, e.g., detects if Vsys goes below Vsysminlo during the case of charger connected and dead battery. Then most or all the controllable power distribution/supplies 450 and system hardware functions 460 are gated off until battery voltage Vbat reaches Vbatminhi to power-on again in response to activation of the PWGOOD signal by anti-crash-loop mechanism 170. Conditions stay valid until a new charger 405 is connected or battery 425 is replaced.

Power Management PM 420 in some embodiments is arranged to remove any dependencies of PM 420 on battery 425. Accordingly, PM 420 need not have any knowledge of what supply voltage Vsys actually is. PM 420 can be directly controlled based on the PWGOOD signal so that with PWGOOD low (active) the system can be powered-on, but with PWGOOD high (inactive) the system is powered off. A comparator like 172 of FIG. 4 is responsive to Vsys as a security for allowing powering-on or not, and the threshold for this comparator is set to the minimum input voltage Vsysminlo=Vinmin of power distribution 450 (150).

PWGOOD becoming active (e.g., by falling low) indicates or provides a startup event. Some embodiments as in FIGS. 16A and 17 further detect charger 105 (405) connection itself as a start-up event such as in the case of good battery, system is powered-off, and a charger is becoming connected. For that purpose, PM 420 provides both USB and DC charger detection inputs 422. This leads to detection of charger connection as start-up event, such as through an interrupt INT line or other appropriate manner.

In FIG. 10A, additional unmarked inputs to power management hardware 420 can include startup triggers such as charger connection, power-on button, and battery replacement. The power management hardware 420 can couple system power state and startup event information to the power and system management software 428.

In FIG. 10B, battery management hardware includes five main functional blocks: 1) Power Interface including charging inputs (USB, DC-In), battery connection for $V_{BAT}$, System supply output, and Accessory supply output; 2) Control interface including all IO controls interfacing the system, setting/configuration/parameter registers and LED charging state indicator; 3) Battery monitoring and fuel gauging, 4) Battery interface for communication with battery pack, 5) Safety management as described hereinabove and providing all safety mechanisms linked to battery and charging inputs. Battery Management HW 410 may be organized/allocated/distributed into one or several ICs. In some embodiments the Battery monitoring—Fuel Gauging block has a hardware state machine as represented by any of FIGS. 5A-5E.

In FIG. 10B, the Control interface in some embodiments includes a microcontroller that is used to administer the battery management sub-system 410 for fuel-gauge calculation and charging control such as described in U.S. Pat. No. 6,892,148 "Circuit and Method for Measurement of Battery Capacity Fade" dated May 10, 2005, and U.S. Pat. No. 7,443,140 "Method and Apparatus for Operating a Battery to Avoid Damage and Maximize Use of Battery Capacity by Terminating Battery Discharge" dated Oct. 28, 2008, each of which patents are hereby incorporated herein by reference. This micro-controller simplifies the middleware and application SW complexity for battery management SW 418 and allows a better flexibility for custom implementations. The separate microcontroller hardware also increases system security in an open source OS environment insofar as battery parameters are hardcoded and do not rely on any application programming.

Figure 10C:
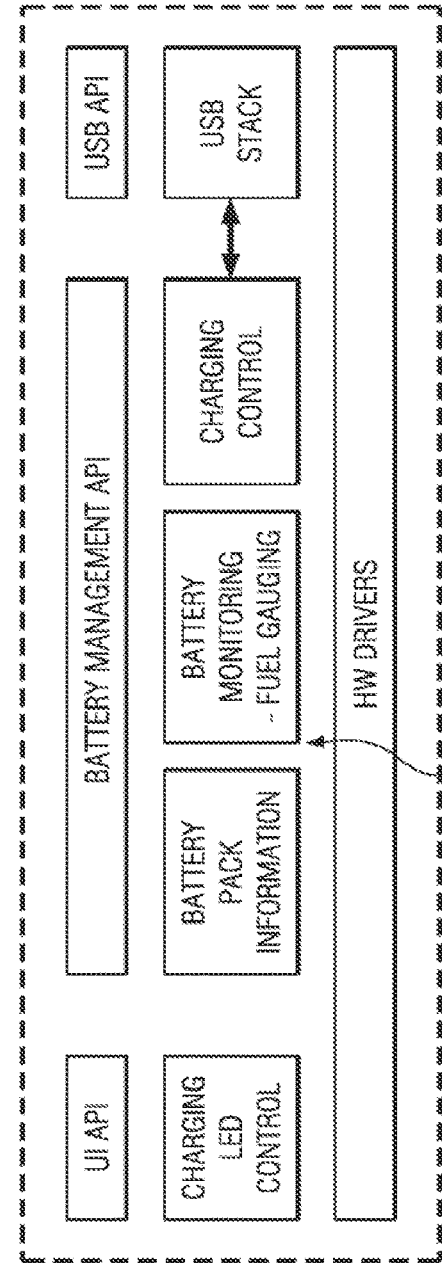
FIG. 10C is a diagram detailing software modules for battery management SW for an embodiment of FIG. 10A and as in FIGS. 5A-6 or other analogous Figures herein.

In FIG. 10C, a system with, e.g., an open source operating system OS architecture interacts with SW generic APIs in charge of 1) battery management 418 for charging control, battery life information and fuel-gauging, battery voltage alert and battery pack information; 2) USB to set the amount of power available from the USB port for battery charging and system purposes; and 3) a user interface (UI) to manage system LEDs such as one or more LED indicators if any.

In FIG. 10C, separate SW/HW stacks and their APIs are provided for Battery Management and USB. The USB stack has device detection when a USB plug is asserted, and VBUS management (host/device negotiation, suspend state). Battery Management 418 involves battery charging and VBUS signaling. SW manages interaction between USB and Battery Management 418 via USB charging plugging below API level, and can also go through an application layer above the APIs. USB charging plugging sets a charging current limit, for instance, depending on USB device detection and bus state on USB side. Some USB-related battery charging terminology is described further to provide some context or background for FIG. 10C and FIGS. 13-14.

The Application layer can configure Battery Management 418 depending on battery condition as Good, Weak and other USB-related features. HW layer can generate a USB_MODE signal as another communication link between USB stack and Battery Management stack 418 in a Dead Battery situation when charger 105 is in HW control mode.

Battery level is defined dynamically in USB Battery Charging. Voltage threshold between Good and Dead battery depends on whether charger is controlled by a HW control mode or a Boot ROM SW control mode, and Weak battery is specified only when Application SW is running but not otherwise.

In a USB HW control mode, Dead battery voltage lies in a pre-charge voltage range (0V to $V_{PRCH\_MAX}$), and Good battery has higher voltage than $V_{PRCH\_MAX}$. Charger is enabled only in Dead battery situation. Threshold $V_{PRCH\_MAX}$ is set greater than a $V_{SYS\_Min\_HI}$ power-up threshold and high enough for Application SW to be executing before battery voltage reaches $V_{PRCH\_MAX}$ when charging. Charging current is limited in order to not deteriorate the battery (battery conditioning).

In the USB Application SW control mode, Dead battery is defined as below a SW_cut-off threshold minimum battery level where application functionalities are able to operate properly. SW_cut-off may be dynamically defined depending on the usage of application functionalities. During battery discharge, the application ends operations and shuts down the platform when SW_cut-off threshold is reached. Once platform is shut-down, Dead battery situation is managed by HW.

Weak battery is defined for USB by battery voltage in a range (SW_cut-off to SW_weak_battery). End-user is informed that loss of application software operation is imminent. Application is permitted to exceed USB VBUS current draw rules to conserve functionality if charger will permit (host is at liberty to drop the USB connection). But when battery is dead or weak and system 400 has a charger 405 that will maintain the USB connection, such current may be drawn.

With the USB description providing some further background, problems with low-current charging scenarios and non-standard chargers do arise and are solved as described earlier hereinabove and as further described hereinbelow.

Figure 11A:
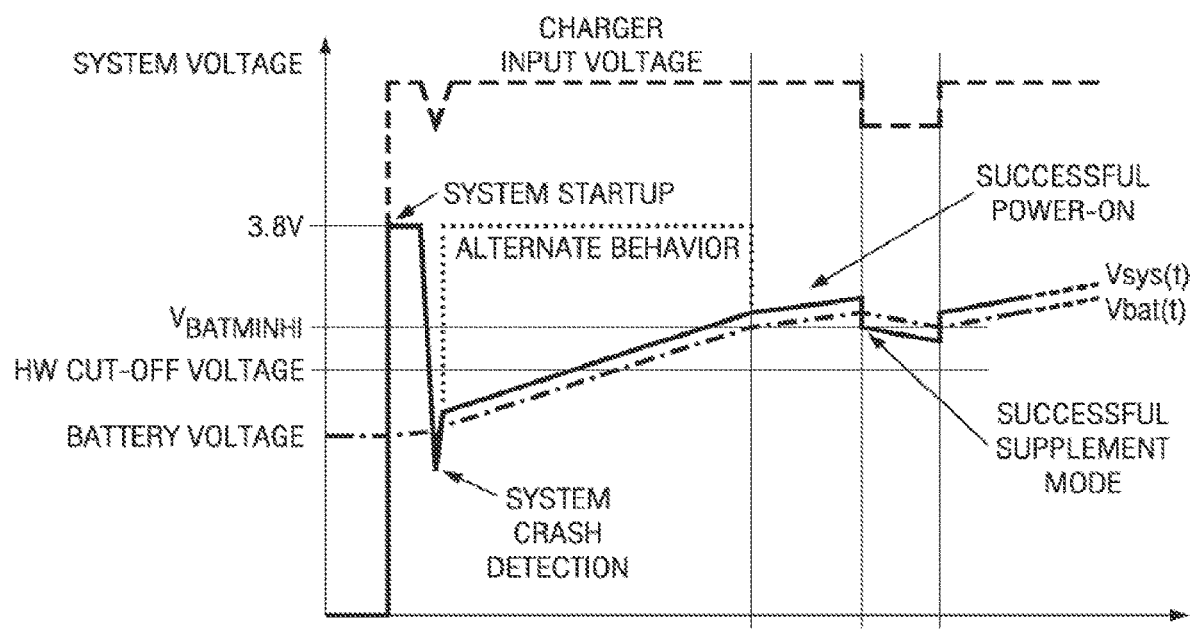
FIGS. 11A and 11B are waveform diagrams respectively of voltages and currents versus time in another process embodiment showing a successful supplement mode of operation in a device embodiment of any of FIGS. 3, 9A, 9B, 10A and 16A.
Figure 11B:
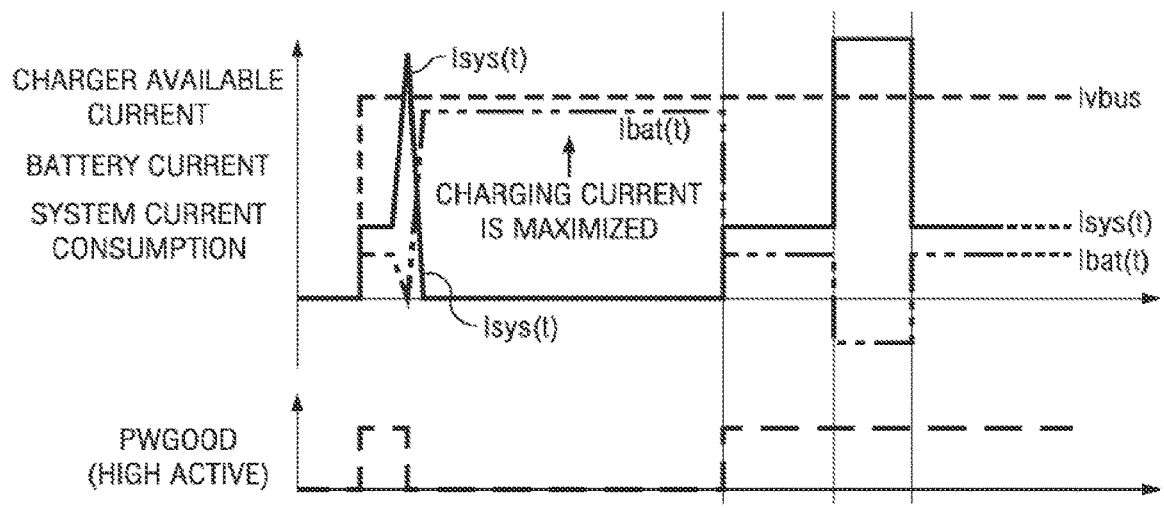

Turning to FIGS. 11A and 11B, respective graphs for voltage and current depict another process embodiment of desired operation resulting from the structure embodiment of FIG. 3 when used with a charger of only modest charging current capacity. (A dotted line "alternate behavior" is also present to indicate alternative operation with a charger of fully adequate, substantial charging current capacity and need not be further described.) Here, the output control voltage PWGOOD from the anti-crash mechanism 170 is arranged as high-active logic for some embodiments. In FIG. 11A, the charger 105 (405) with a modest charging current is connected, and the charger input voltage immediately rises on the mobile device connector side to a high charging voltage level. System voltage $V_{SYS}$ starts at a high level (e.g., 3.8 v nominal) but soon falls below a low hardware cutoff voltage due to the system load exceeding the capacity of the inadequate charger, whereupon the system crashes.

In the meantime, in FIG. 11B, control voltage PWGOOD from the anti-crash-loop mechanism 170 (370) is briefly high upon charger connection, and as a result the system current $I_{SYS}$ rapidly rises before the system crash subsequently due to insufficient charger available current. Anti-crash-loop mechanism 170 indirectly detects the system crash via comparator 172 (Vsys<Vsysminlo). Then state machine 178 forces control voltage PWGOOD inactive (e.g., low in FIG. 11B), and the system current $I_{SYS}$ falls to near zero as a result. PWGOOD is forced inactive not only to deactivate the functional circuit 160, if that is not already occurred, but also to maintain such deactivation until the battery can be at least somewhat charged and thereby prevent repeated crashes. Accordingly, the system power is turned off upon system crash in response to PWGOOD inactive (=0 in FIG. 11B) and kept off or very much reduced. At this point, the battery charging current $I_{BAT}$ rises to a current level almost equal to the charger available current. Battery 125 voltage $V_{BAT}$ in FIG. 11A gradually charges over time to a level exceeding the threshold Vbatminhi, and state machine 178 activates PWGOOD (e.g. =1).

In FIG. 11B, charging current $I_{BAT}$ into the battery 125 correspondingly falls from a fast-charging level to a lower trickle charging level when the battery voltage $V_{BAT}$ reaches threshold Vbatminhi. Charging may continue for a while to a somewhat higher voltage level. If the user needs to temporarily use the functional circuit 160, the system powers up in response to user request, gets used, and then is powered down. This temporary use is reflected by a substantial increase of the system current $I_{SYS}$ to an operating current level in FIG. 11B accompanied and successfully supported not only by the charger available current $I_{VBUS}$ in FIG. 11B but also outflow of supplementing battery current $I_{BAT}$. (Battery current $I_{BAT}$ outflow is shown negative because in a direction opposite to the arrow of FIG. 3 charging current into the battery 125.) Correspondingly in FIG. 11A, the battery voltage falls a little but not enough to crash the system during this temporary operation, and the supplement mode is successful. Upon completion of the temporary use of the system, battery charging may be continued and completed, as indicated by a resumption of an upward battery charging voltage ramp in FIG. 11A and a positive battery current $I_{BAT}$ in FIG. 11B. The control signal PWGOOD remains high (PWGOOD=1) since the power availability continues good. Some embodiments can provide a user choice that explicitly indicates that the system is temporarily usable or can be turned off to get a faster charge, depending on the user choice.

Figure 12A:
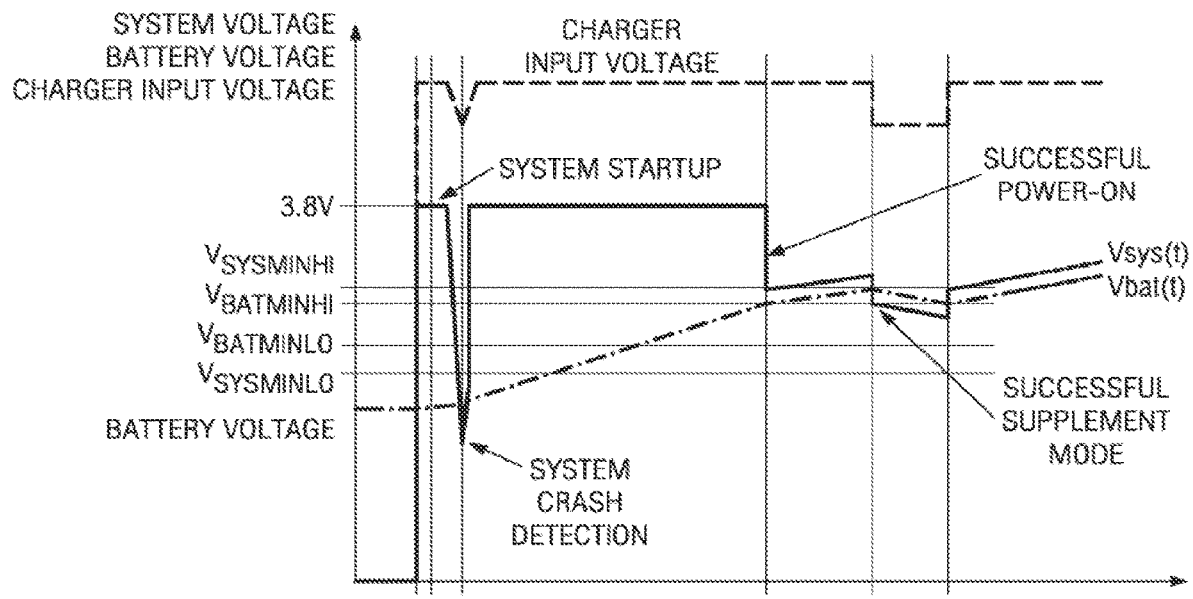
FIGS. 12A and 12B are waveform diagrams respectively of voltages and currents versus time in still another process embodiment showing a successful supplement mode of operation in a device embodiment of any of FIGS. 3, 9A, 9B, 10A and 16A.
Figure 12B:
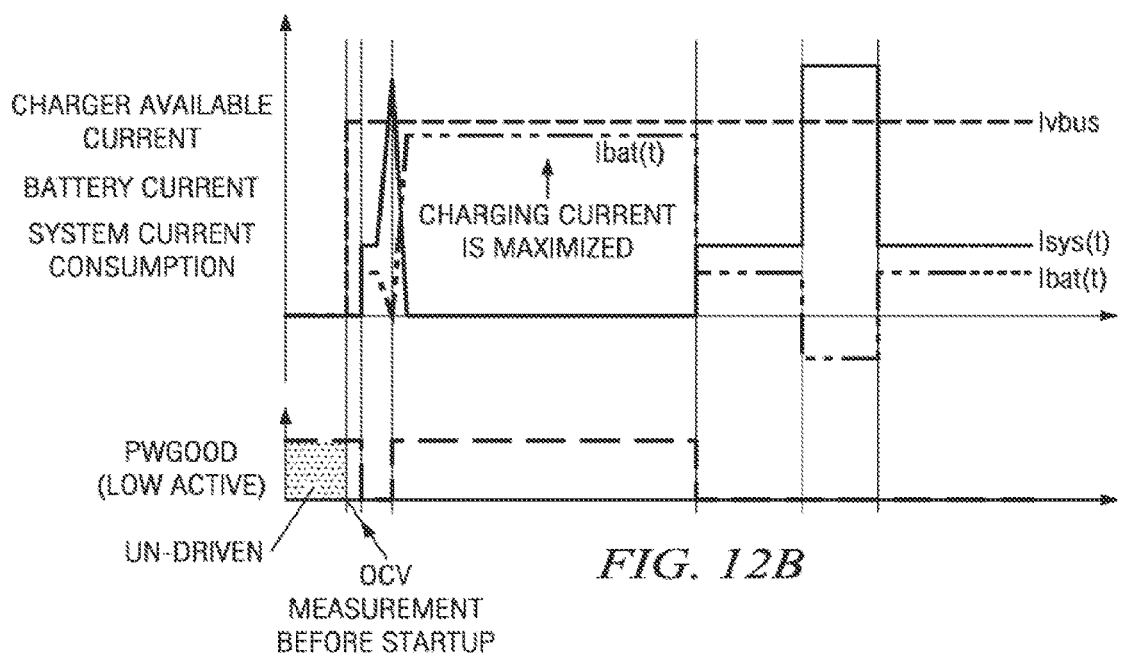

Turning to FIGS. 12A and 12B, respective graphs for voltage and current depict another process embodiment of desired operation resulting from the structure embodiment of FIG. 3, 9A or 10A when used with a charger 105 (405) of only modest charging current capacity. In this embodiment, the output control voltage PWGOOD from the safe-start anti-crash-loop mechanism 170 is arranged as low-active logic, opposite to that of PWGOOD in FIG. 11B. Notice that the graph in FIG. 12A shows all four thresholds Vsysminhi, Vbatminhi, Vbatminlo, Vsysminlo in descending order and having corresponding software values statically configured or dynamically established in battery management software 418 or hardware 410. The rest of the successful process embodiment of operation of FIGS. 12A and 12B is generally similar to that of FIGS. 11A and 11B, and for conciseness a description is not repeated. Note that the FIG. 12B operation of PWGOOD signal is reversed in voltage sense from that of PWGOOD in FIG. 11B.

In FIGS. 12A and 12B, consider some embodiments by comparison with FIGS. 3 and 5. If external charger 105 comes to be disconnected while anti-crash-loop mechanism 170 is active, mechanism 170 is reset again in some embodiments and/or returns to NO SUPPLY state. In other embodiments such as FIG. 5A, the transition to NO SUPPLY state may depend on crash timer 176 operation during CRASH DETECTION state. A transition to NO SUPPLY state may be omitted from CRASH state as in FIG. 5A. When the charger 105 is reconnected, state machine 178 may operate the PWGOOD signal to grant system power-up again almost immediately if the charger has sufficient capacity to maintain the system voltage and charge the battery. See description of FIG. 9D and Condition (6) discussed earlier hereinabove. Otherwise, with a charger of insufficient capacity, state machine 178 will operate to deactivate PWGOOD to permit battery charging without system crashes. Then, as soon as enough battery charging has occurred to successfully supplement the insufficient charger, PWGOOD will enable or grant system power-up upon user request. By comparison with FIG. 10A and FIG. 16A, such as in an embodiment with two chips implementing blocks 410 and 420, anti-crash-loop mechanism 170 constantly monitors $V_{SYS}$ and $V_{BAT}$ in a battery management IC 410 (620). If $V_{SYS}$ drops below Vsysminlo and/or external charger 105 voltage is collapsing, this is a crash condition and the device is shut down until the battery can be at least somewhat recharged.

Two start-up sequences are contemplated depending on the usage of the anti-crash-loop mechanism 170 (370) doing battery detection in the battery management IC 410 (620). In a first start-up sequence without the use of a battery detection mechanism, the device is powered-up again once $V_{BAT}$ has reached Vbatminhi in FIG. 5A or when there is a charger 105 connection. If a second consecutive crash happens, then the state machine 178 is arranged to restart the system only when a charger plug is detected or when the user presses any key. In this way, that second consecutive crash is regarded as signifying that no battery is present, or that the battery has failed open or with very high impedance. In a second or alternative start-up sequence with the use of a battery detection mechanism, the device is powered-up again once a battery is detected and $V_{BAT}$ has reached threshold Vbatminhi or when there is a charger connection. An EPROM bit in the power IC device 420 (650) is suitably provided to configurably enable a battery detection mode of the second startup sequence, or enable the first startup sequence instead. The anti-crash-loop mechanism 170 is reset when a charger plug is detected.

Figure 13:
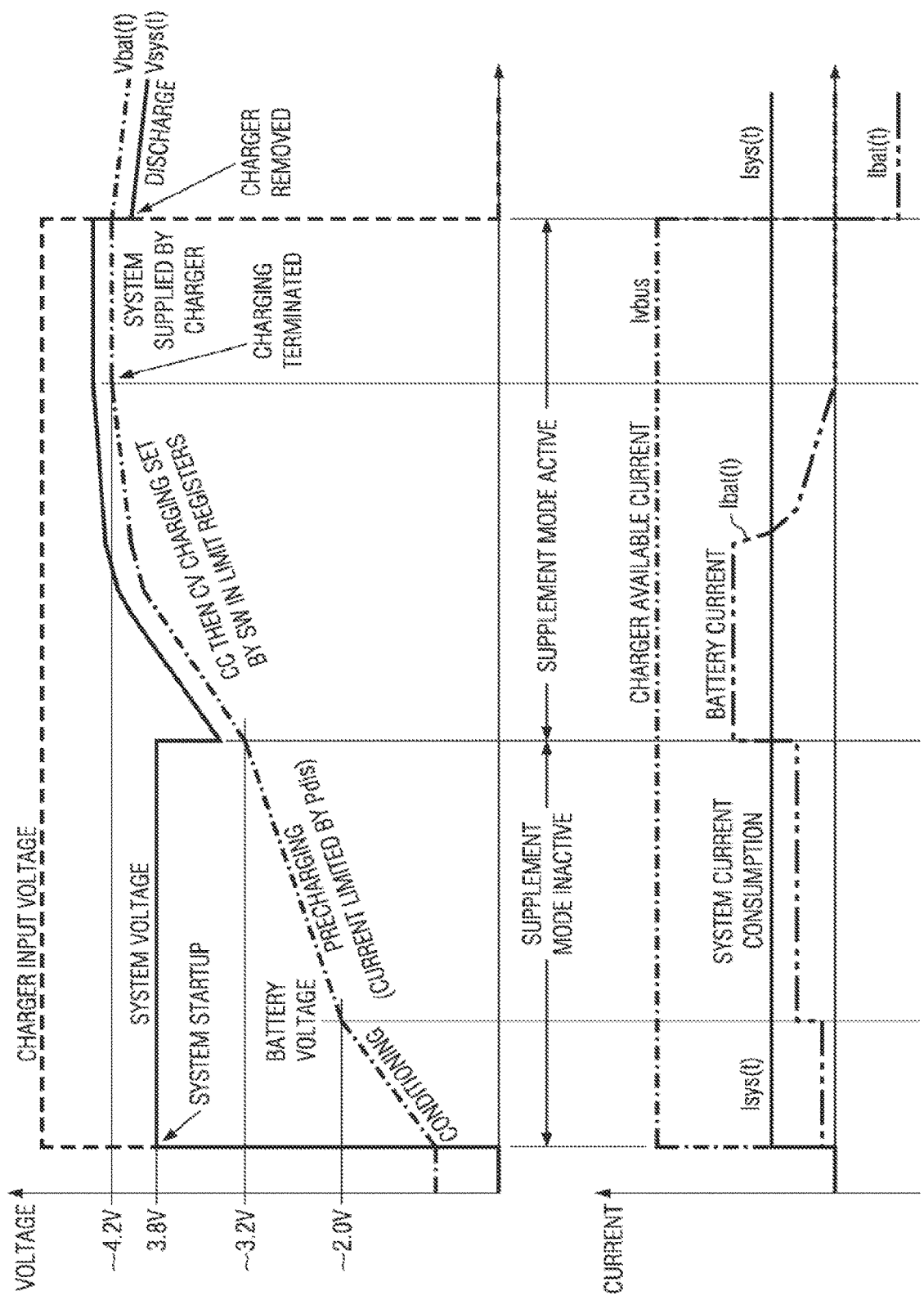
FIG. 13 is a composite diagram of waveform diagrams voltages and currents versus time in a further process embodiment showing a successful supplement mode of operation extended over time in a device embodiment of any of FIGS. 3, 9A, 9B, 10A and 16A wherein the charger capacity is sufficient to support particular device operations as well as charge the battery.

In FIG. 13, a view of a charging process embodiment is shown over a somewhat longer time scale that fully charges the initially-empty battery and shows successful coordination of the FIG. 3 battery linear charger 130, charger controller 140, and anti-crash loop mechanism 170. For some background, recall the USB terminology provided in connection with FIG. 10C hereinabove. The charger 105 provides a substantially constant input voltage and has sufficient current capacity to start up the system and maintain the system voltage $V_{SYS}$ at e.g. 3.8 volts. The battery voltage $V_{BAT}$ initially is quite low and increases according to a conditioning process ramp, even though the charging current is kept relatively modest, until $V_{BAT}$ reaches e.g. about 2.0 v. Next a pre-charging ramp under control of the battery linear charger 130 and charger controller 140 effectively but less rapidly increases the battery voltage in a manner such that a now somewhat-higher battery current $I_{BAT}$ is limited so that a charging power dissipation level $P_{dis}$ is not exceeded for the battery 125. During both the conditioning ramp and pre-charging ramp, the safe-start state machine 178 forces PWGOOD inactive so that system 160 is off and thus a supplement mode is inactive. In due course, the battery voltage $V_{BAT}$ increases. Constant current CC charging is followed by constant voltage CV charging. When at a predetermined point on the battery voltage $V_{BAT}$ ramp, $V_{BAT}$ has increased to Vbatminhi in FIG. 5A, PWGOOD goes active. A successful supplement mode is available. Then system circuit 160 can be powered On or Off at user discretion, but in FIG. 13 user keeps the system circuit 160 off. Battery charging may be continued to store battery energy full, and battery current Ibat(t) ultimately tapers off to a low level.

Subsequently, user turns the system On and the system draws battery current $I_{SYS}=-I_{BAT}$, and the system voltage $V_{SYS}$ in consequence falls somewhat below the battery voltage $V_{BAT}$.

Figure 14:
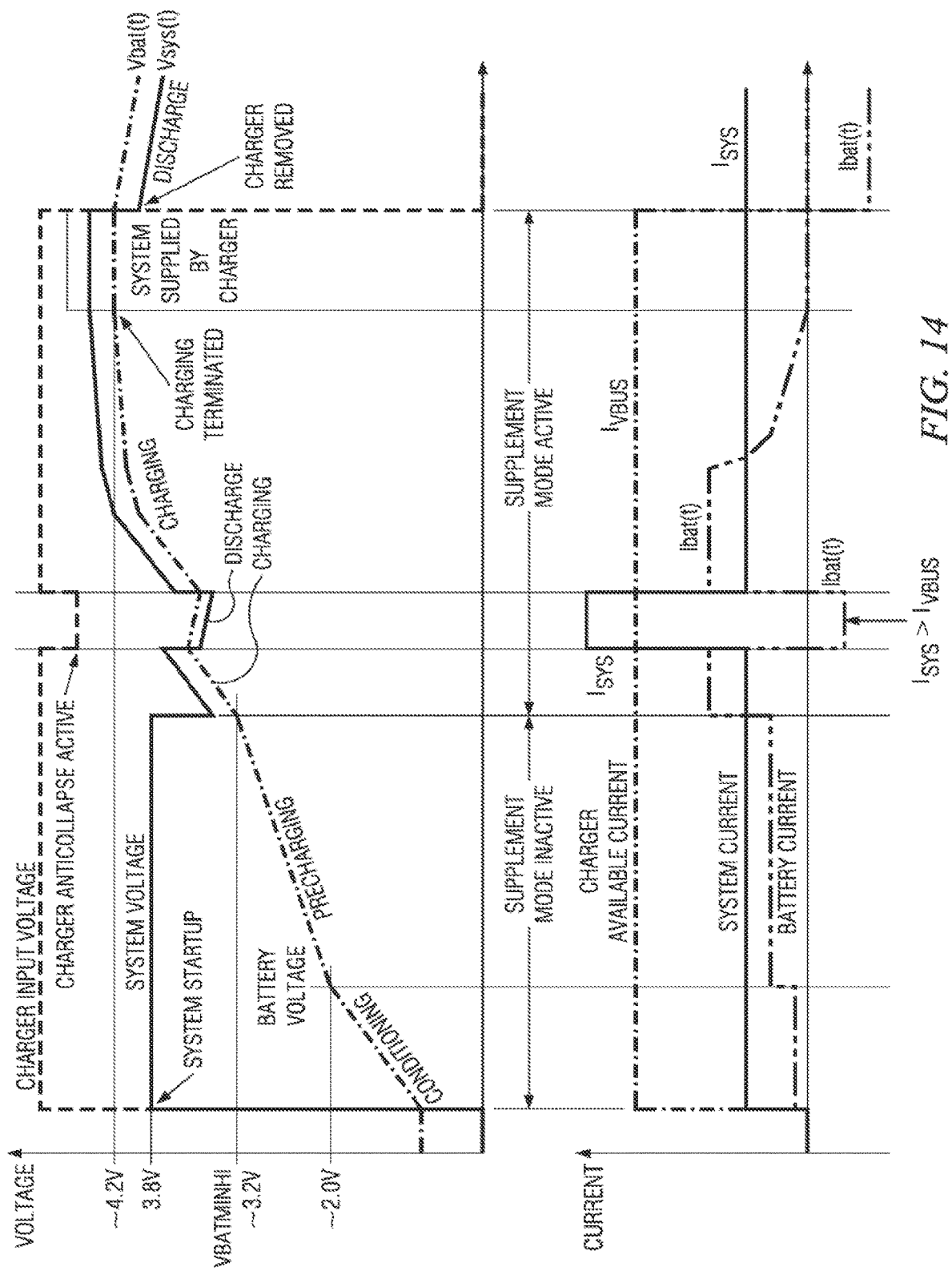
FIG. 14 is a composite diagram of waveform diagrams voltages and currents versus time in a still further process embodiment also showing a supplement mode of operation extended over time in a device embodiment of any of FIGS. 3, 9A, 9B, 10A and 16A and operating successfully even when the charger capacity is insufficient to support particular temporary device operations as well as charge the battery.

In FIG. 14, if the user turns FSM 180, power distribution 150 and functional circuit 160 On in the middle of charging as illustrated, the system voltage may drop at that point in an ordinary moderate way without descending to Vsysminlo. The supplement mode is successful to operate the system without a crash because sufficient charge has entered the battery 125 so that battery 125 can deliver an outward-flowing current from the battery to the system 160 to supplement the possibly-modest current capacity of charger 105 in case system current consumption $I_{SYS}$ exceeds the charger available current $I_{VBUS}$.

In FIGS. 13-14, in due course, the battery voltage $V_{BAT}$ rises still further to full charge. In the meantime, the charger controller 140 with battery linear charger 130 cause and allow the battery current $I_{BAT}$ to reach a high charging current level that is still safe from a battery power dissipation point of view. In due course, the battery voltage reaches a high enough level that the charging current Ibat(t) declines according to a decay curve, whereupon the battery 125 is fully charged and charging is terminated.

Figure 15A:
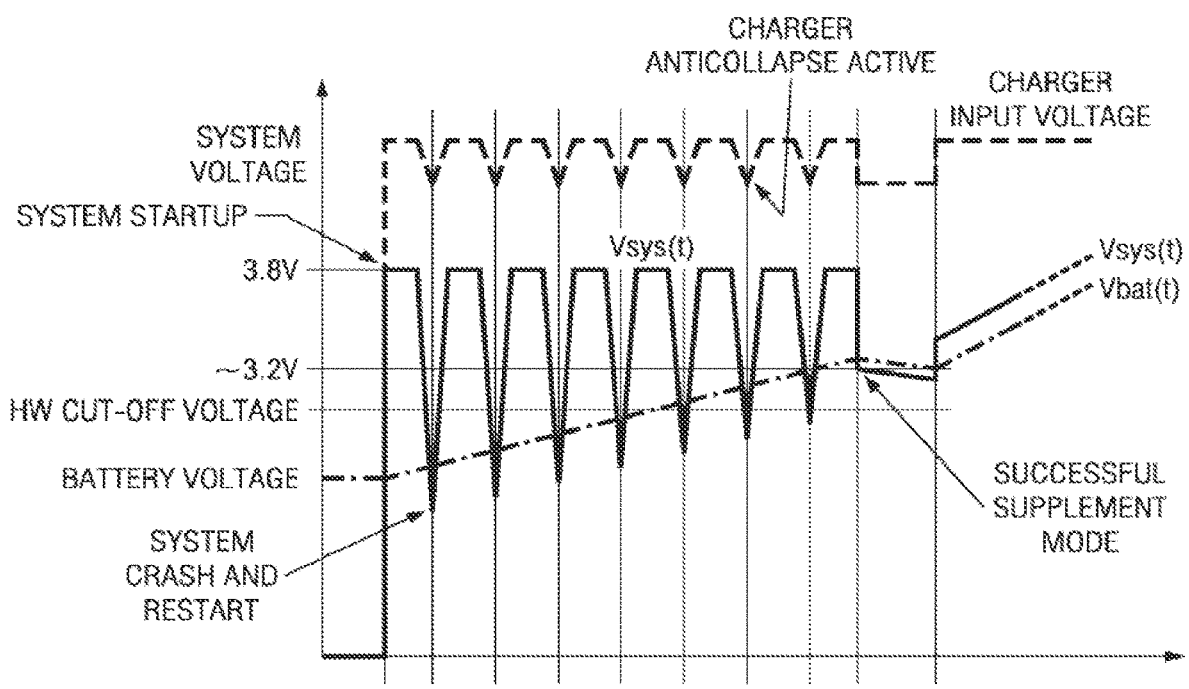
FIGS. 15A and 15B are waveform diagrams respectively of voltages and currents versus time showing a supplement mode that is problematically subject to repeated system crashing in a scenario different from FIGS. 1-2.
Figure 15B:
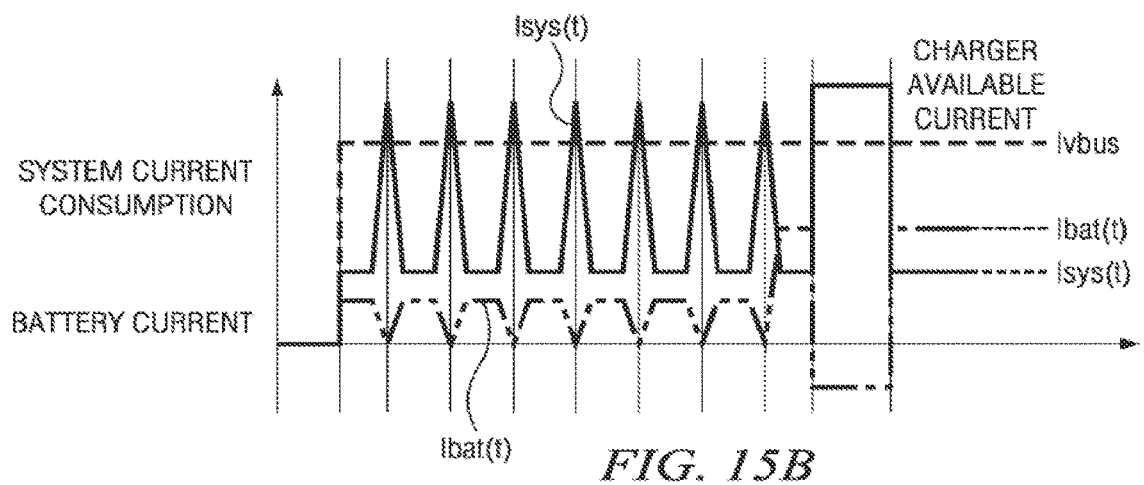

FIGS. 15A and 15B show timewise-corresponding voltage and current curves showing a scenario of repeated system crashes when an anti-collapse process in charger 105 is active but ineffective (cycling through a crash loop). Even though it might be possible eventually to achieve a successful supplement mode, the repeated system crashes are undesirable from at least a user point of view. The anti-crash loop mechanism 170 of FIG. 3 eliminates the repeated crashes of FIGS. 15A and 15B and instead provides anti-crash-loop protection as in FIGS. 12A-12B.

Figure 16A:
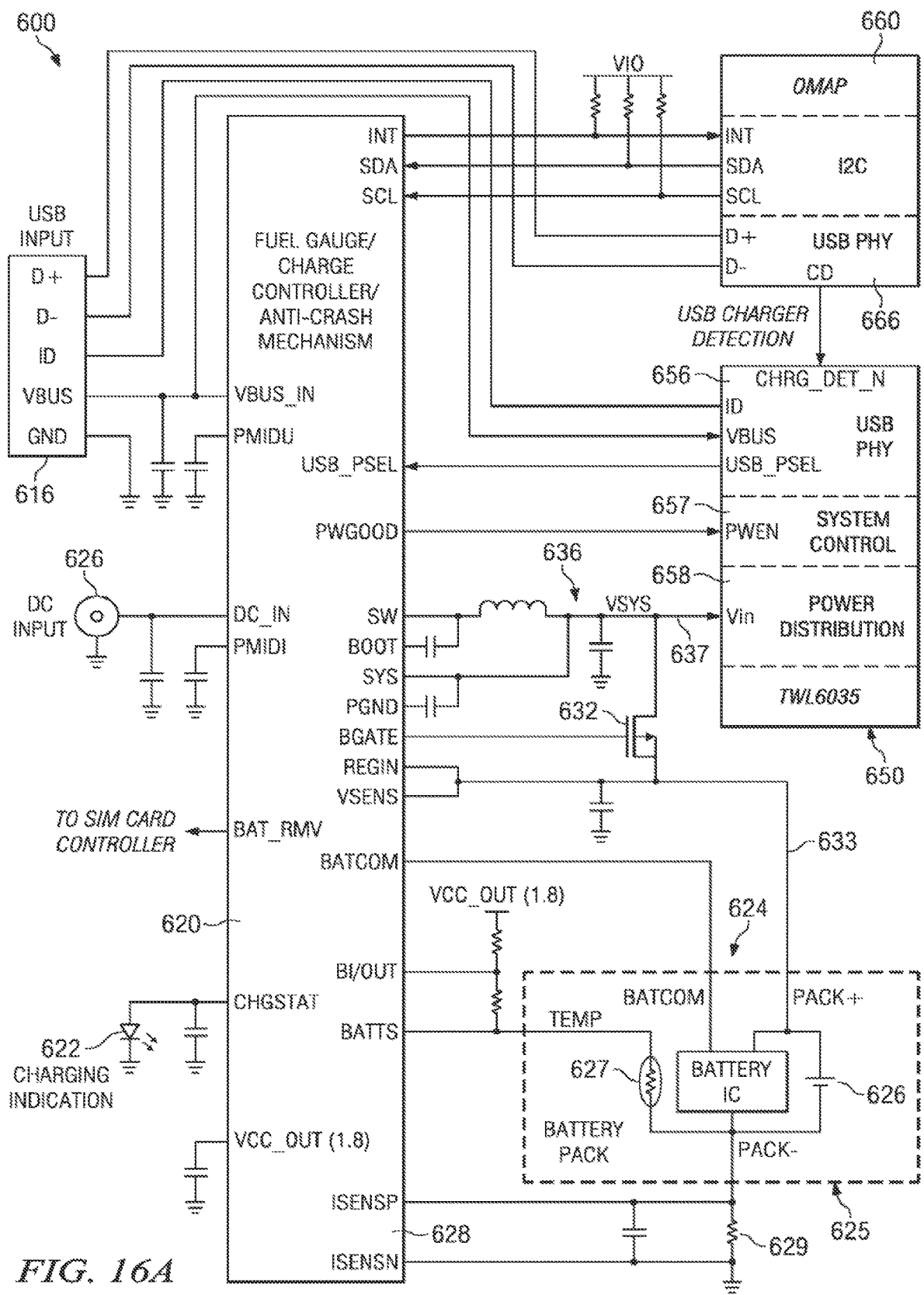
FIG. 16A is a partially-schematic, partially-block diagram of an electronic device embodiment having anti-crash protection such as described by any of FIGS. 3-6, 9-9E or other applicable detail Figures herein.

In FIG. 16A, a block diagram of battery management of an application processor platform embodiment 600 uses a support IC embodiment 620 that provides both USB and auxiliary DC inputs. IC 620 integrates power path management allowing the system to operate with dead or no battery as in the other Figures herein. It also integrates advanced accurate battery monitoring and fuel gauging functions. An additional IC 650 may be added to enable a USB OTG accessory supply.

A battery management sub-system 620 with anti-crash protection herein is suitably made to support various rechargeable battery types and comply with standards such as those listed or some other standard, or a proprietary type implementation. Examples of standards are: USB2.0, USB3.0, OTG2.0, USB BCS 1.2, YD-T1591 Chinese charger—2009 release; IEE1725, JIS C 8714, ITU-UCS (Universal Charging Solution), and European standard (2010).

The battery management subsystem 620 with anti-crash protection herein ensures its own powering from battery pack 625 or from a charging input such as USB input connector 616 or DC input connector 626 if battery 626 is dead. One supply input is provided for powering 10 buffers interfacing processor and/or other ICs 660. A control interface for FIG. 10A or FIG. 16A Battery Management 410 or 620 can provide several operational modes: 1) Fully autonomous charging or SW controlled charging depending on customer system implementation. 2) Control interface provides input signals for controlling USB current draw, indicating battery validity, sensing charging current and sensing battery temperature. 3) Control interface provides output signals for indicating System supply validity and current limitation, battery presence, charging status through LEDs. 4) Control interface provides I2C interface for register configuration of the battery management sub-system by processor 660 such as a host processor or application processor.

Battery interface for subsystem 620 is manufacturer-specific or battery pack-specific so that it includes any of an analog interface, digital interfaces like HDQ-1 wire or a manufacturer-specific interface, battery presence detection, identification functions, authentication functions, and MIPI BIF, for example. Battery identification and authentication functions desirably work autonomously in case of a dead software scenario in the system so that optimum charging parameters are applied. In case battery 626 or battery pack 625 may not be authenticated, charging current and voltage are reduced to prevent risk of overheating or worse with some batteries especially counterfeits. The battery interface may be implemented with a dedicated chip called Battery IC in battery pack 625, and in such case the subsystem 620 suitably provides a hardware input BATCOM for battery validity check. A battery connector 624 has terminals PACK+ for battery voltage (charging output from transistor 632), BATCOM for battery pack communications, and TEMP (temperature of e.g. thermistor) with reference to a battery pack common terminal PACK−.

In FIG. 16A, a package of subsystem 620 encloses electronic control circuitry including the safe-start mechanism 170 (370) and power conditioner or powering circuitry 120, 130 for system voltage $V_{SYS}$ and with a control output BGATE for charging current-control transistor 632. The powering circuitry 120, 130 is coupled with USB connector 616 for as a charging input for entry of power from USB connector 616 via an electrical input VBUS Ind. into the powering circuitry of chip 620. DC input connector 626 is also coupled as another charging input for entry of power from connector 626 via an electrical input DC_IN into the powering circuitry of chip 620. The charging output BGATE via transistor 630 and the safe-start mechanism via input VSENS for $V_{BAT}$ are both coupled by a battery-related line 623 of the circuit to battery connector 624. Chip 620 in some embodiments includes a battery gauge circuit 140 (345) coupled with safe-start mechanism 170 and together including a processor independent of functional electronic circuit 660 and coupled with a memory electronically representing battery management program instructions 418 for the processor in chip 620. A bad battery detection circuit is also suitably included in chip 620, such as taught herein.

In FIG. 16A, a second physically separate package encloses power combination chip 650. Power combination chip 650 includes a system control 656 which acts like power management circuit 180 (420) and is coupled with the functional electronic circuit 660. Functional electronic circuit 660, and the safe-start mechanism 170 (370, cf 410) in chip 620, each are coupled to $V_{SYS}$ voltage output from the power conditioner or powering circuitry in chip 620. Functional electronic circuit 660 is coupled via power distribution 658 (150) to $V_{SYS}$ voltage output from the powering circuitry in chip 620, while safe-start mechanism 170 is internally connected inside chip 620 to $V_{SYS}$. Power combination chip 650 has a serial data transfer physical layer circuit e.g. USB PHY 656. A serial data transfer connector such as USB connector 616 is coupled (ID, VBUS) with the physical layer circuit 656, which in turn is coupled with functional electronic circuit 660. Chip 620 receives control USB_PSEL from USB PHY 656. The safe-start mechanism 170 supplies PWGOOD control to power enable input PWEN of system control circuitry 657 in power combination chip 650.

Battery monitoring and fuel gauging 140 (345) in subsystem 620 are suitably used to continually check the battery voltage VSENS=$V_{BAT}$ and alert a system software cut-off control that provides a programmable voltage threshold and measures voltage during a current spike from battery. Energy gauging is provided in hardware to directly measure the amount of battery energy remaining so that no processing is needed for such gauging in processor system 660 itself.

The battery management subsystem 620 provides safety/security in the following areas: battery charging voltage and current limitation vs temperature Tbat, battery charging current limitation versus $V_{BAT}$, battery current draw $I_{BAT}$ versus temperature Tbat, over-voltage protection for charging inputs, programmable current limiter for charging inputs, and junction over-heat protection. External fuse, TVS and EMI filters are implemented in hardware to prevent failure in case of a software crash.

Providing security for battery parameters can be challenging to handle in an open source OS environment. Over-optimistic or malicious applications might attempt to increase charging current and voltage limits to reduce charging time (and consequent battery life), affecting system safety adversely or even dangerously. For this reason, battery parameters in some device embodiments are suitably hardcoded into battery management hardware. Open-source/open-application nature of the software might be an issue for battery safety if an over-optimistic or malicious application accesses charging limits for example. Therefore, Battery Management 410 such as in chip 620 provides Public and Private parameters for software protection purposes. Only Public parameters providing high level information can be accessed by application/host processor 660. Public parameters suitably also provide USB current limit and thermal mode programmability.

In FIG. 16A, and for a particular example system embodiment, a three-chip system embodiment 600 has a Fuel Gauge/Charge Controller/Anti-Crash Mechanism in a first combination chip 620. Chip 620 is provided with circuits from FIG. 3-6 or FIGS. 9A-9E or other Figures such as for blocks 120, 130, 140, and 170 to form an integrated circuit subcombination embodiment. Chip 620 is coupled to provide system voltage $V_{SYS}$ and control signal PWGOOD to the power-enabling input PWEN of a power combination chip 650 that includes a USB PHY (physical layer) 656, system control circuitry, and power distribution circuitry 658. Power combination chip 650 is suitably a TWL6035 or similar chip from Texas Instruments Inc., Dallas, Tex., or other suitable analogous circuit. A PWGOOD input on the TWL6035 chip is referred to as PWEN and the system control circuitry therein is made appropriately responsive to power-enabling input PWEN under control of the PWGOOD signal. Power combination chip 650 is coupled with a USB (Universal Serial Bus) input connector 616 and signals that USB power is selected by sending a USB_PSEL signal to charger controller 140 in chip 620. Chip 650 is coupled with a user-functional chip 660 such as an OMAP™ applications processor chip from Texas Instruments Inc., Dallas, Tex., or other suitable analogous circuit or some other functional circuit with another suitable functional capability. As shown in FIG. 16A, the user-functional chip 660 has I2C serial interfacing with chip 620, and interconnects with the chip 650 as well. The chip 660 in this example has USB-related circuitry 666 connected to the D+/D−lines from the USB connector 616.

In FIG. 16A, battery pack 625 has a rechargeable battery 626 connected to a linear charger charging transistor 632 that in turn couples to the system voltage $V_{SYS}$ line. Note the L-C decoupling components 636 associated with the $V_{SYS}$ line as well. Battery voltage $V_{BAT}$ is also sensed on a line designated VSENS on chip 620. Another input BATCOM can communicate with and receive identifying information from a Battery IC in battery pack 625. A temperature-sensing thermistor 627 in battery pack 625 is coupled to an input BATTS of chip 620 circuitry for dynamically determining a safe charging current, which in turn is controlled by that circuitry using the output BGATE from chip 620 to the gate of charging transistor 632. Battery current $I_{BAT}$ is sensed as a small voltage by circuitry 628 in chip 620 across inputs ISENSP and ISENSN that are connected to a low resistance current-shunt sensing resistor 629. When battery 626 is charging, a charging indication LED 622 is lit via a circuit in chip 620 by the output CHGSTAT to LED 622. Charging from a battery charger can alternatively be provided via a charging connector 626 to an input DC_IN of chip 620. Various other components such as decoupling capacitors and inductors are suitably provided as shown.

Figure 16B:
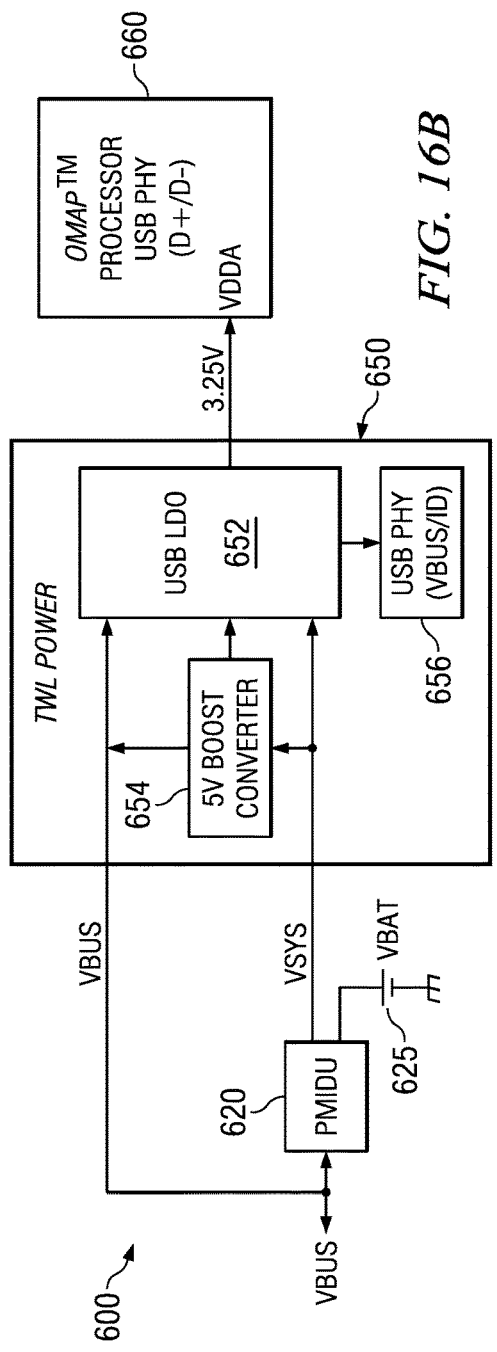
FIG. 16B is a block diagram detailing part of FIG. 16A.

In FIG. 16B, a partial detail of chip 650 includes a USB LDO (low dropout regulator) having inputs coupled from VBUS and $V_{SYS}$, and from a voltage boost converter 654. USB PHY 656 is included and coupled with USB LDO 652. Blocks 620 and 650 with battery pack 625 of FIG. 16B are shown in other detail in FIG. 16A.

In FIG. 16B, USB accessory supply is supported by a chip 650 such as TWL6035. A 5V boost converter 654 is added to generate power to VBUS and USB OTG accessories. In such case, power output of the boost converter 654 is connected to USB charging input. Software is arranged to disable USB charging while generating VBUS voltage with boost converter 654. In another version, 5V generation may also be included in a USB input power-stage converter working in reverse mode.

In FIG. 16A, USB chargers are detected thru D+ and D− lines by chip 660 USB PHY 666, and thru ID identification and VBUS lines by USB PHY 656 of chip 650. In a dead battery situation, both PHYs 656 and 666 are powered by VBUS USB LDO 652 of FIG. 16B. Then, when battery 626 is becoming charged, the system is powering-on and USB LDO 652 is taking power from system voltage $V_{SYS}$. The 5V boost converter 654 is automatically enabled if battery voltage $V_{BAT}$ is too low for supplying USB LDO 652. Control of the USB LDO 652 is automatically handled by the power management circuitry of chip 650, e.g. TWL6035, with little or no need for software programming. Conveniently, only the USB operation mode (A-Device or B-Device) is set with software.

In FIG. 16B, USB LDO 652 powers the USB physical layer (PHY) 666. As noted hereinabove, 5V boost converter 654 is also used for generating VBUS in OTG use cases. USB dedicated chargers and charging downstream ports are detected by USB PHY 666 in chip 660 thru D+/D− lines. ACA chargers are suitably detected by chip 650 thru VBUS and ID lines in FIG. 16A. The chip 660 charger detection result is sent to chip 650 through a USB charger detection CD signal CHRG_DET_N. Chip 650 combines the detection result at CHRG_DET_N with its own charger detection operations and sends suitable USB_PSEL signaling or other appropriate signaling to charger circuitry 120, 130 in chip 620.

Figure 17A:
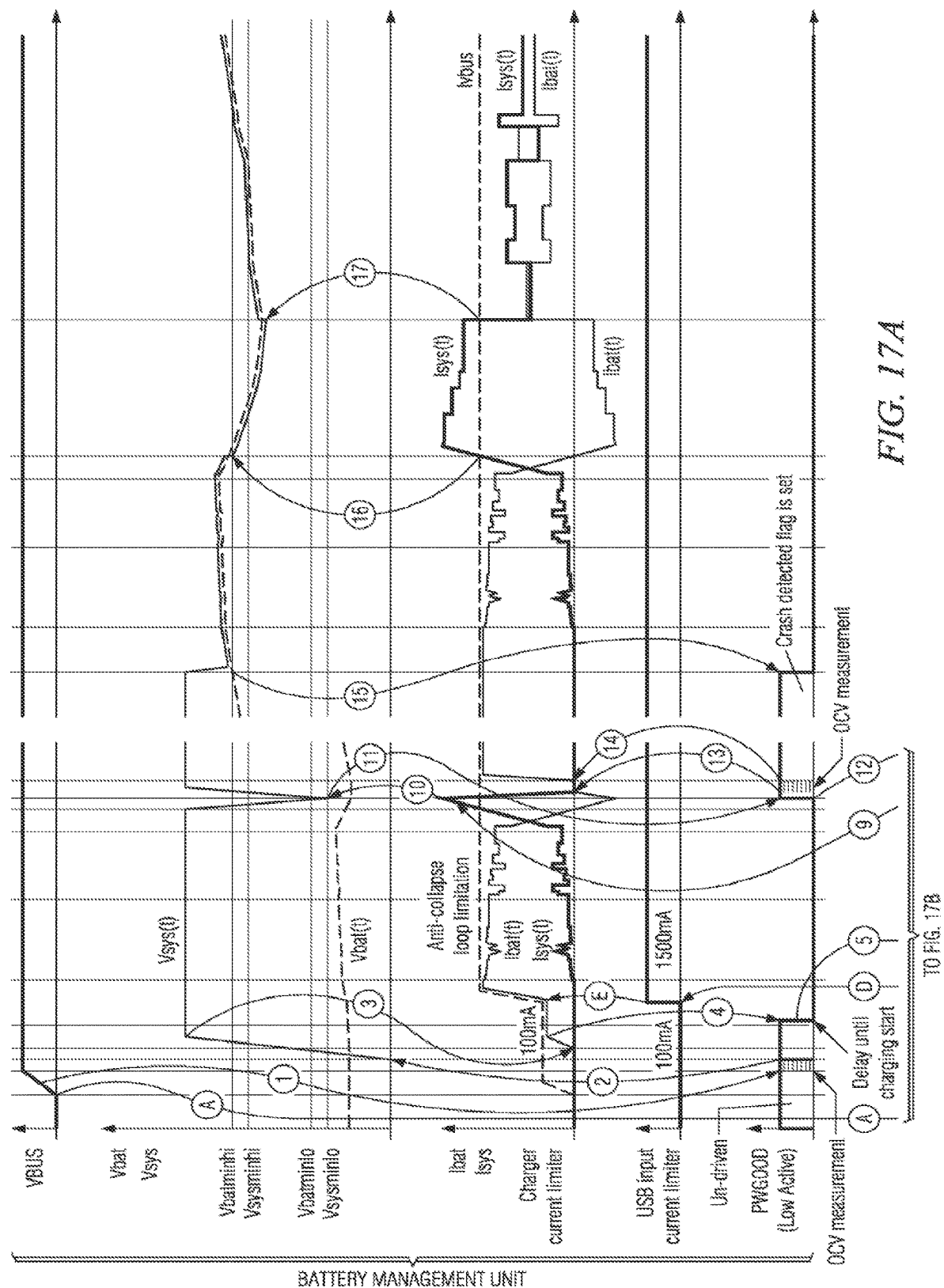
FIGS. 17A-17B (collectively, "FIG. 17") are a composite waveform diagram of numerous circuit voltages and currents versus time in still another process embodiment showing a successful supplement mode of operation having anti-crash protection in a device embodiment in any of FIGS. 3, 9A, 9B, 10A and 16A.
Figure 17B:
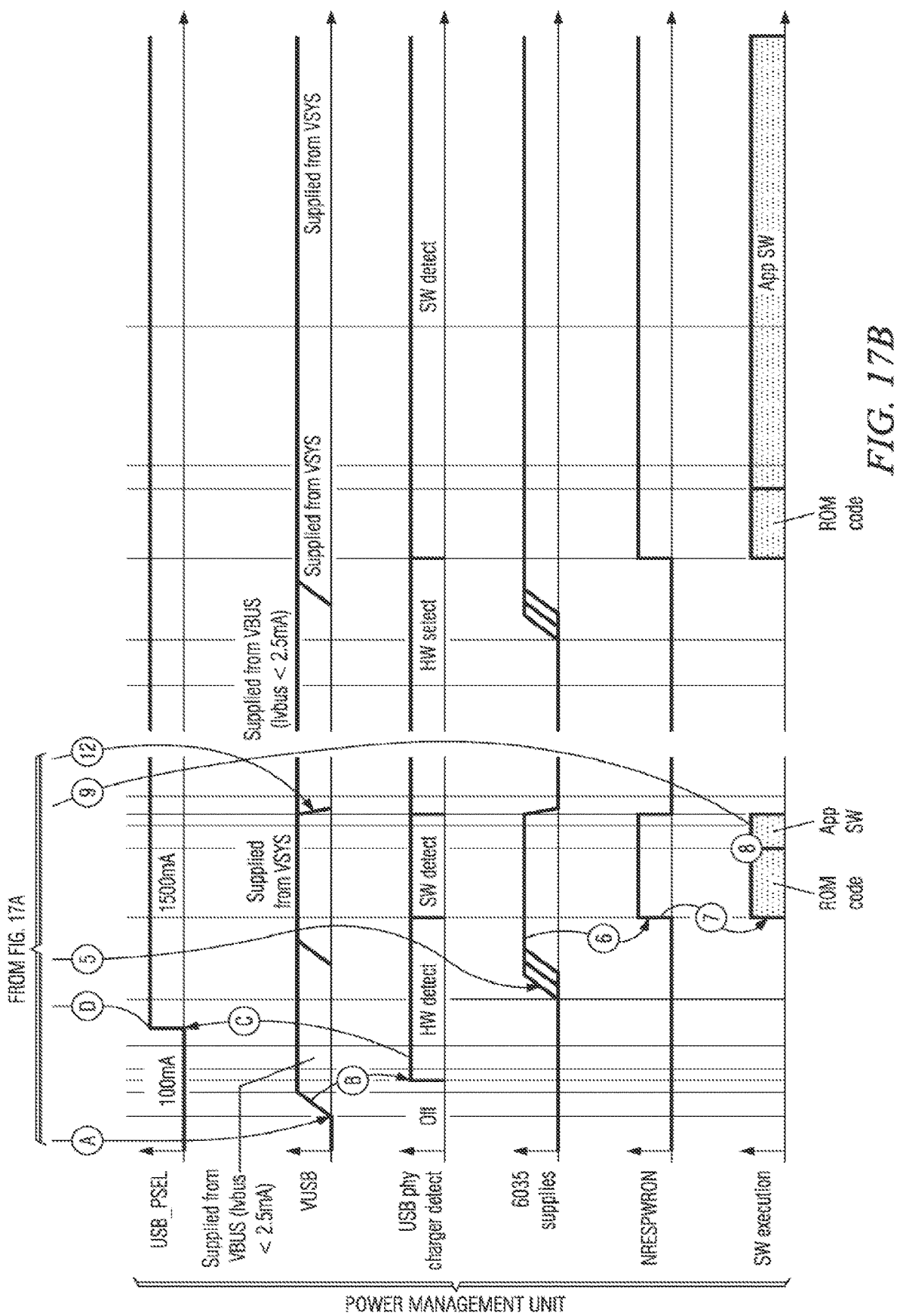

In FIG. 17, a waveform diagram shows concurrent operations in Battery Management Unit 410 and Power Management Unit 420 of FIG. 10A in a system embodiment like that of FIG. 16A. The scenario assumes a USB charger 105 is provided that has only modest charging current capacity.

The waveforms of FIG. 17 are on a magnified time scale and detail operations in a more extensive process embodiment that has some waveform portions behaving similar to the operations depicted in FIGS. 12A/12B and 11A/11B. FIGS. 17 and 12A/12B show a low-active PWGOOD signal. In FIG. 17, many operations could be described the same as corresponding operations in FIGS. 12A/12B and 11A/11B, so only differences from the latter four Figures and additional description for FIG. 17 are provided at this point. With reference to FIGS. 3, 9A, 10A, 16A and 17, Battery Management Unit 410 description for FIG. 17 involves mostly the Fuel Gauge/Charge Controller/Anti-Crash Mechanism in chip 620 and including limiter/linear charger circuitry 120, 130, 632. Description for FIG. 17 operations of Power Management Unit 420 involves mostly the USB PHY circuits 656, 666, and the chip 650 and their signals and voltage levels. For convenience, a generalized waveform at bottom is also diagrammatically provided in FIG. 17 to indicate presence and type of software execution, and it pertains primarily to operations of the user-functional part 160 of chip 660.

In FIGS. 16A-17, a USB connector of the USB charger is connected to the USB input 616 of system 600, and in FIG. 17 beginning at that time instant A, a VUSB voltage ramp B and a VBUS voltage ramp 1 concurrently occur. At first PWGOOD is undriven or state-indeterminate before the VBUS voltage ramps up because the battery 626 is essentially dead. During the VBUS, VUSB ramp, charger current limiter 120 defaults to a charging current limit level of, e.g., 100 mA but no charging current $I_{BAT}$ flows because the linear charger 130, 632 is not conductive; and the system or load current $I_{SYS}$ is off also. Then the USB PHY circuit 666 detects the charger 105 by an OCV (open circuit voltage) measurement of VUSB at time instant 2 and puts its Charger_Detect line high to USB PHY portion 656. The battery voltage is below a low-battery threshold (Vbat<Vbatminlo), but VBUS voltage is now present at chip 620 so the state machine 178 has power for its own operation and its NO SUPPLY state puts PWGOOD high (inactive, power-on is not granted to system). (Note that the inactive/active meanings in FIG. 17 are the same for PWGOOD as in FIG. 5A, and the voltage levels used to indicate inactive/active are same as between FIGS. 5A, 12B and FIG. 17 but opposite to each of FIGS. 8 and 11B.)

In FIGS. 16A-17, system voltage $V_{SYS}$ rapidly rises to a high level starting at time instant 2, and charging (e.g., 100 mA) starts at time instant 3. The limiter/linear charger circuitry 120, 130, 632 now are active together and charging current in a first step (e.g., 100 mA) brings battery current $I_{BAT}$ up before a time instant 4. Anti-crash loop mechanism 170 initiates further operations, and state machine 178 provisionally puts PWGOOD active (low) at time instant 4. Meanwhile, at time instant C, USB PHY portion 656 activates control signal USB_PSEL to chip 620 in response to Charger_Detect. By a second or last step at time instant D, E the available charging current through the limiter/linear charger circuitry 120, 130, 632 is made still higher (e.g., 1500 mA). The control signal USB_PSEL thus controls a limiter/linear charger circuitry 120, 130, 632 at time instant D, which in turn causes the limiter/linear charger circuitry 120, 130, 632 to increase the available charging current at operational point E. Battery current $I_{BAT}$ receives most of the charging current $I_{VBUS}=I_{BAT}(t) I_{SYS}(t)$, while the chip 650 (FIGS. 16A-17, TWL6035) powers up and its supply lines become active at time instant 5. Processor 660 reset NRESPWRON is released due to power on at time instant 6, ROM code is accessed at time instant 7, and then application software code is loaded at time instant 8. A relatively-minor amount of system current $I_{SYS}(t)$ starts flowing with sporadic variations during the interval between time instants 5-8.

Then at system run-time beginning at time instant 9, and due to the charger 105 providing most of the system current $I_{SYS}$, that system current ramps up sharply while battery current $I_{BAT}$ of the nearly dead battery correspondingly falls sharply. Concurrently, system voltage $V_{SYS}$ falls rapidly and reaches by time instant 10 the lower hardware cutoff voltage Vsysminlo, which signifies imminent system crash at time instant 11. At essentially the same time, FIG. 4 comparator 172 and state machine 178 detect the low system voltage $V_{SYS}$<Vsysminlo and force PWGOOD inactive (high) at time instant 11. Processor 660 reset NRESPWRON is forced active (low) to reset the functional circuitry 160 (660). Voltage VUSB no longer is supplied from $V_{SYS}$ as of time instant 12 but continues being supplied at a low current level (e.g. 2.5 mA) from VBUS. The chip 650 (TWL6035) supplies ramp down also at time instant 12. Note that during this time, battery current $I_{BAT}$ briefly goes negative as much of what little battery charge exists is discharged, and the battery 125 (626) is thus unable to successfully supplement the modest-capacity USB charger 105. The system drain $I_{SYS}$ on the battery is shut off by time instant 13 anyway in response to the PWGOOD inactive (high, flag is set). State machine 178 condition ($V_{SYS}$>Vsysminlo) is satisfied and the FIG. 5A CHARGE state is reached at time instant 14. Also, OCV measurement detects charger voltage, and limiter/linear charger circuitry 120, 130, 632 is controlled at time instant 14 to continue the full-capacity (e.g., 1500 mA) charging current that is essentially all delivered into battery 626 as current $I_{BAT}$, whereby battery charging resumes. FIG. 17 has a break in the waveforms and time axes to indicate a period of battery charging and increase of battery voltage $V_{BAT}$.

In due course, state machine 178 FIG. 5A power resumption conditions $V_{SYS}$>Vsysminhi and/or $V_{BAT}$>Vbatminhi are met when the battery 626 has become more-fully charged after the period of battery charging; and state machine 178 forces PWGOOD back active (low, active grant of power-up), all at time instant 15. At first, battery current $I_{BAT}$ still receives most of the charging current $I_{VBUS}$. VUSB becomes supplied from $V_{SYS}$ again. The chip 650 (FIGS. 16A-17, TWL6035) powers up and its supply lines become active, and then processor reset NRESPWRON is released due to power on so that functional circuitry 160 of chip 660 is operative, ROM code is accessed, and then application software code is loaded and ready. If the user calls for a particular application to run, then intensive processing commences at time instant 16, whereupon system current $I_{SYS}$ ramps up sharply and exceeds the charger current $I_{VBUS}$ available from the VBUS, i.e., $I_{SYS}$>$I_{VBUS}$. Simultaneously, battery current $I_{BAT}$ of the now at least partially-charged battery correspondingly falls negative ($I_{BAT}$=($I_{VBUS}$−$I_{SYS}$)<0). Battery 626 thus begins discharging and supplementing the charger current effectively by contributing enough of the system current to keep the system 660 (160) running. Concurrently, system voltage $V_{SYS}$ falls somewhat below Vsysminhi and decreases somewhat thereafter, but comes nowhere near reaching the lower hardware cutoff voltage Vsysminlo and there is no risk of system crash. The supplement mode is successful. At time instant 17, the user finishes using the temporary intensive processing functions and in FIG. 17 may even continue but by using less intensive processor/software applications that are within the charger capacity $I_{VBUS}$, i.e. so that system current $I_{SYS}$<$I_{VBUS}$. The control signal PWGOOD remains active (low, PWGOOD=0) since the power availability continues to be good and the system 160 in chip 660 can be powered if desired. Charging continues at a rate and with currents given by Equations (7) and (7A) until the battery 626 is full or the USB charger 105 is disconnected. Concurrently, the system voltage $V_{SYS}$ and the battery voltage $V_{BAT}$ rise somewhat as well, as charging continues.

$$I_{BAT}(t)=I_{VBUS}(t)-I_{SYS}(t) \tag{7}$$

$$I_{VBUS}(t)=I_{BAT}(t)+I_{SYS}(t) \tag{7A}$$

In FIG. 17, the waveform for VUSB has or supplies voltage and initially has current limit of $I_{VBUS}$<2.5 mA in this particular example. The reason is that an OTG product acting as B-device or OTG compliant peripheral should always draw less than 2.5 mA average before configuration so that enumeration always happens whatever the host (e.g. 600) current capabilities might be. After configuration and enumeration, much more charging current very likely becomes available and the voltage is related to $V_{SYS}$.

An outline or summary of operations in FIG. 17 is thus tabulated as follows in TABLE 1. In FIG. 17, a start-up sequence is depicted for both Battery management 410 and Power management 420, for example. Scenario assumes dead battery, platform initially off, and a USB charger 105 with limited capability has asserted or called for power-up sequence.

Table 1: Summary of FIG. 17 Operations
Attempted Normal Startup:
(1) VBUS rising above e.g. 4.4V triggers Battery OCV measurement.
(2) Once OCV measurement is done, $V_{SYS}$ rises.
(3) Once $V_{SYS}$ has stabilized, charging loop can power-up.
(4) Once charging loop has started, power-up of the system is granted by forcing PWGOOD low.
(5) PWGOOD dropping low triggers TWL6035 power-up. VUSB LDO input automatically switches to $V_{sys}$ supply voltage.
(6) Once power supplies and system clock are up and running, application processor reset signal is released. USB charger detection switches to software-controlled detection. USB_PSEL signal is maintained.
(7) ROM code starts executing.
(8) Application SW starts executing.
(A) VBUS rising powers-up VUSB LDO.
(B) VUSB LDO supplies and triggers chip 660 USB charger detection by PHY 666.
(C) USB charger detection is reflected by USB_PSEL signal thru chip 650 PHY 656.
(D) USB input current limiter is set accordingly to charger detection.
(E) Charging current is automatically maximized to input capability.

If no crash occurs, the system operates normally. Operations in FIG. 17 in case of a crash event are outlined next.
Crash Event:
(9) Application software is enabling too many features or too much performance so that system 660 power-consumption exceeds charger 105 capability.
(10) Power consumption excess makes $V_{SYS}$ voltage drop below Vsysminlo since battery 626 is still dead or insufficiently charged.
(11) $V_{SYS}$ voltage below Vsysminlo makes PWGOOD rise to its inactive state. This also sets a "crash detected" flag.
(12) Chip 650 (e.g. TWL6035) immediately shuts-down. Reset is asserted.

Recovery:

(13) Charging is stopped while OCV measurement is in progress.

(14) End of OCV measurement triggers battery charging restart with maximum permissible current.

(15) Vbat reaching Vbatminhi makes PWGOOD drop low (active). "Crash detected" flag is reset. Platform powers-up again.

Successful Supplement Mode:

(16) System power-consumption exceeds charger capability. Supplement mode is becoming active. Vsys drops below Vbat. Battery 626 starts to discharge.

(17) System power-consumption decreases below charger capability. Supplement mode is becoming inactive. Vsys rises above Vbat. Battery starts to charge again.

Figure 18:
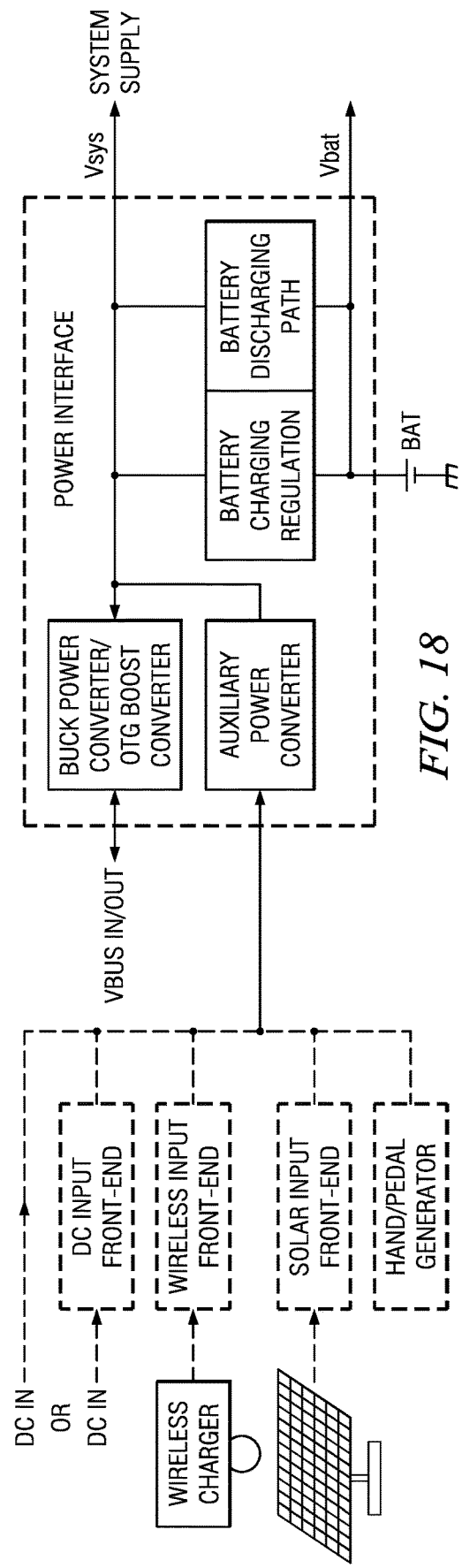
FIG. 18 is a block diagram showing a system embodiment portion including additional circuits for providing power to embodiment circuitry of any of FIGS. 3, 9A, 9B, 10A and 16A.

Turning to FIG. 18, a battery management power interface topology enables instant-on function with dead battery or battery removed. Smart phones and tablets represent two examples of somewhat different application environments that are likely to have somewhat different battery configurations, current requirements and ampere-hour charge specifications. A battery-supplementing mode of operation desirably is provided so that user device operation continues while parallel charging the battery from an on-the-go (OTG)/accessory supply. Support is provided for external DC, wireless or solar charger detection/identification. The charger may alternatively be a small hand-powered or pedal-powered generator such as for use in rural areas. The generator may be a DC generator connected to the DC input conditioning circuit or instead may be an AC generator connected by a rectifier diode(s) to the DC input conditioning circuit.

Figure 19:
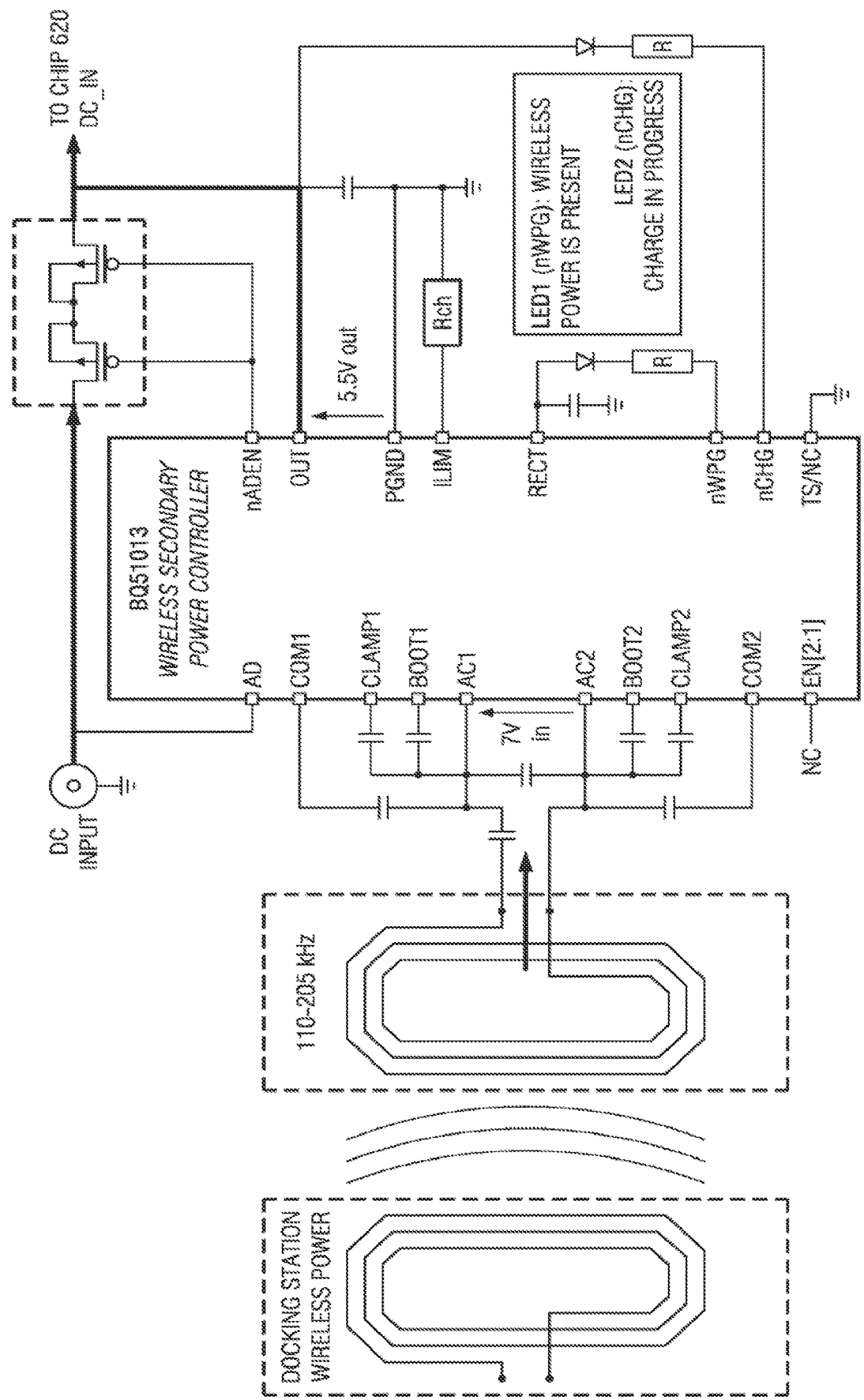
FIG. 19 is a block diagram detailing a wireless secondary power circuit for one of the additional circuits of FIG. 18.

In FIG. 19, a wireless charger is based on any suitable wireless secondary power controller chip, such as a Texas Instruments BQ51013 that is connected, for instance, to a DC auxiliary input DC_IN of FIG. 16A chip 620 and does not interfere with USB charger operation when the latter is present. When an AC adapter is connected and system 600 is at the same time on a wireless charging pad, DC charging is enabled and wireless charging is disabled.

Figure 20:
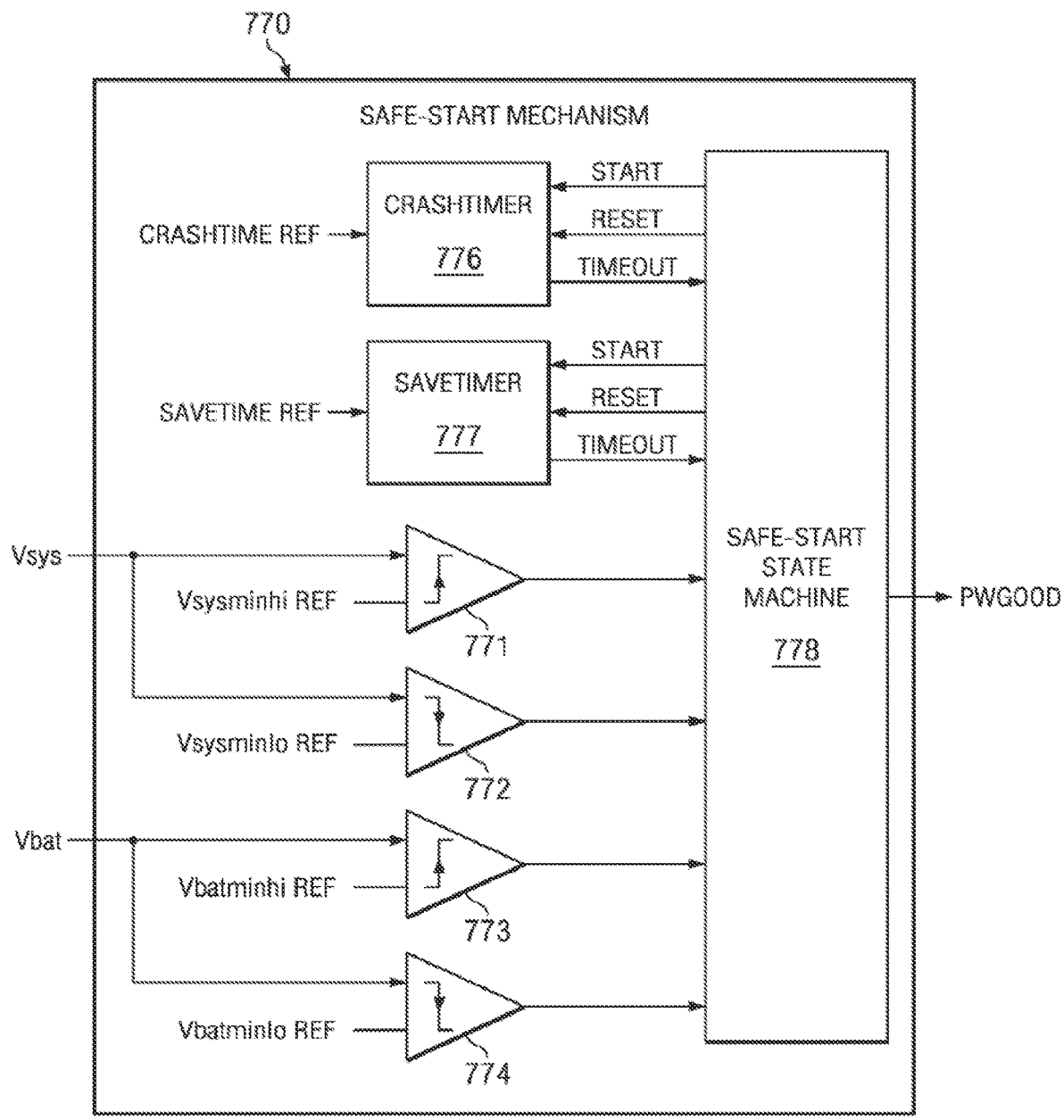
FIG. 20 is a block diagram of an alternative anti-crash loop mechanism embodiment for use in the electronic devices of FIGS. 3, 9A, 9B, 10A, and 16A.
Figure 21:
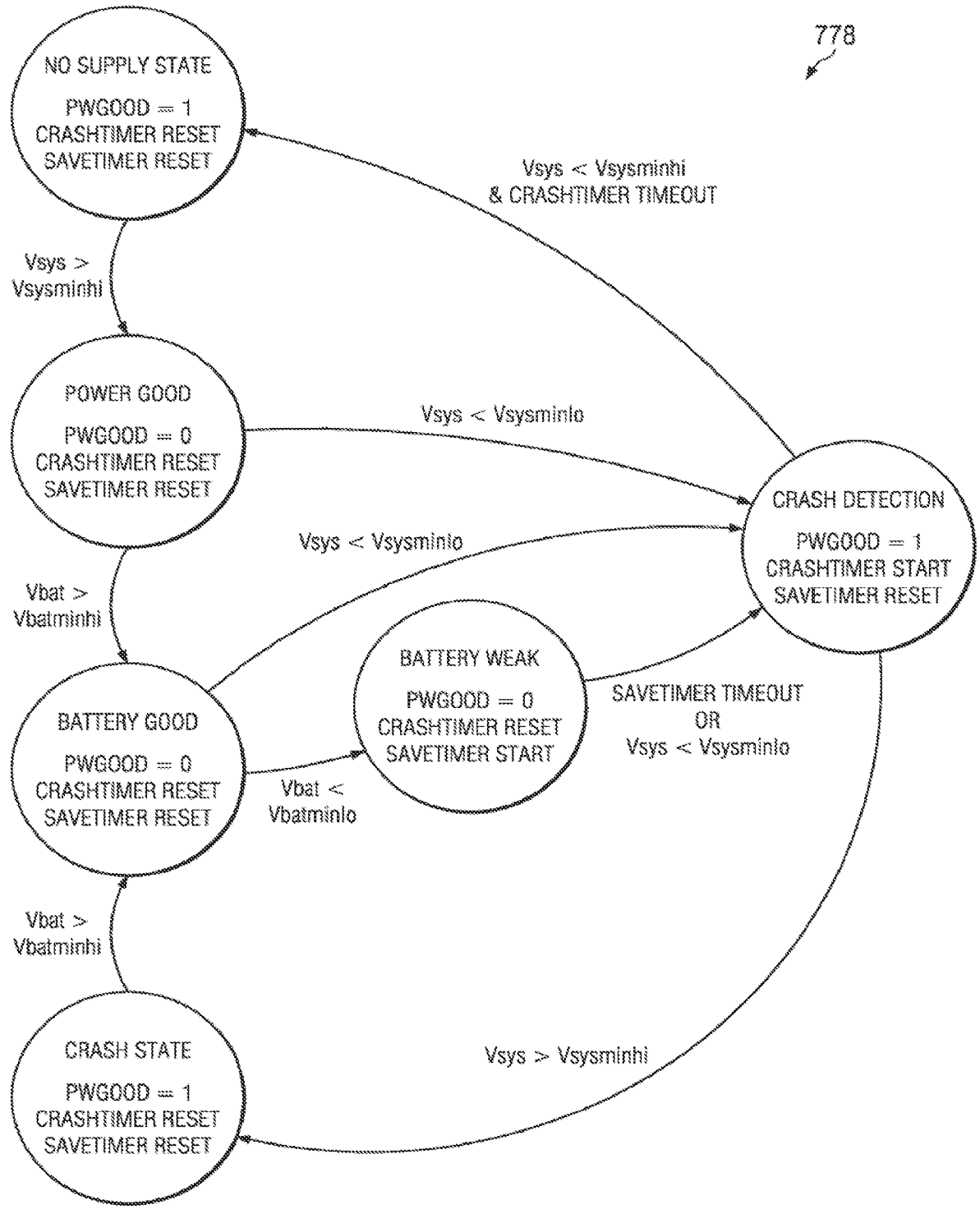
FIG. 21 is a state transition diagram of a state machine embodiment for use in the anti-crash loop mechanism of FIG. 20 and producing a power-good control signal PWGOOD.

In FIGS. 20-21, the embodiment described in FIGS. 4-5 is modified for introducing a crash condition based on battery low voltage. To do this, the embodiment 770 of FIG. 20 provides and couples all four comparators 771-774 (cf. 171-174 of FIG. 4) to a special state machine 778 of FIG. 21 and uses two time-out timers: Crash Timer 776 and a Savetimer 777. (Some embodiments use a single timer demuxed into the state machine 778, and state machine 778 enters different timeout times Savetime and Crashtime and demux control.) Parameters are detailed as follows:

1) Comparator 774 threshold Vbatminlo is set to the battery voltage representing or approximately corresponding to the minimum battery accumulated energy needed by the system circuit 160 for saving context and user data and then shutting-down when operating from battery only (no charger adapter connected).

2) Savetime parameter is counter time-out of Savetimer 777 set to the maximum time required by the system circuit 160 for saving context and user data and then shutting-down.

In FIG. 21, a minimum battery voltage Vbatminlo condition is provided in the state machine 778. Compared to FIG. 5A, FIG. 21 adds a BATTERY GOOD and a BATTERY WEAK state. BATTERY WEAK state starts Savetimer 777, and all other states reset Savetimer 777. (Note that BATTERY GOOD and BATTERY WEAK state for state machine 778 are a distinct topic herein and not necessarily identified with the USB Good Battery or Weak Battery concept for USB purposes.) CRASH DETECTION state starts Crashtimer 776, and all other states reset Crashtimer 776. Control signal PWGOOD is set active or maintained if already active (e.g., =0) in each of POWER GOOD, BATTERY GOOD, and BATTERY WEAK states, and PWGOOD is made inactive (e.g. =1) in all the other states.

In FIG. 21, a state transition diagram for a state machine 778 embodiment is rearranged so that it has different transition logic and states of operation than in FIG. 5A. Let state machine 778 power up and default to the POWER GOOD state. If the battery voltage is adequate, a condition Vbat>Vbatminhi is satisfied and a transition takes operations to BATTERY GOOD state. In FIG. 21 and FIG. 20, an input line from comparator 774 to state machine 778 logic is included so that if FIG. 4 comparator 774 detects a low battery condition (Vbat<Vbatminlo) during BATTERY GOOD state, then a transition is made to BATTERY WEAK state that maintains activation PWGOOD=0 and starts the Savetimer 777. BATTERY WEAK state thus keeps system circuit 160 powered instead of being Off as in the FIG. 5A CRASH DETECTION state.

This FIG. 21 embodiment accommodates a user functional circuit 160 that does an orderly shutdown independently in response to low battery condition (Vbat<Vbatminlo). As noted earlier hereinabove, threshold Vsysminlo can be set in a way to implicitly allow enough time for a clean system shutdown in case of low battery. Using the low battery condition Vbat<Vbatminlo to trigger the transition into BATTERY WEAK state can save some time elapsing before getting crash timer 776 started in FIG. 21 relative to some time that might be consumed in FIG. 5A POWER GOOD state between the instant of Vbat<Vbatminlo and the instant of Vsys<Vsysminlo. In FIG. 21, the Savetimer 776 timeout interval Savetime is explicitly set long enough to encompass a reasonable interval needed for the system including circuit 160 to do such orderly shut down.

FIG. 21 may also be interpreted as providing an optionally-subdivided power good state having two sub-states POWER GOOD and BATTERY GOOD with identical control outputs. In this way, a failure-resistant redundancy is introduced by having parallel transition paths available and operable either on the condition (Vsys<Vsysminlo) or a sequential condition (Vbat<Vbatminlo followed by Savetimer timeout). Some embodiments may combine these two sub-states POWER GOOD and BATTERY GOOD. And some of these embodiments may further omit the condition (Vsys<Vsysminlo) and transition from POWER GOOD through BATTERY WEAK to CRASH DETECTION based solely on the sequential condition (Vbat<Vbatminlo followed by Savetimer timeout).

In FIG. 21, when Savetimer 777 times out, state machine 778 executes a transition from BATTERY WEAK state to a CRASH DETECTION state that resets the Savetimer 777 and starts the crash timer 776 and deactivates PWGOOD (e.g. high inactive=1), which now does remove power from system 160. State machine 778 in the CRASH DETECTION state responds depending on whether a charger 705 is connected, and subsequent transition to NO SUPPLY state or CRASH state is governed similarly to FIG. 5A. Notice that variants of the state machines of, e.g., FIGS. 5D and 5F can be provided by including a BATTERY WEAK state therein and the associated transitions on either side of BATTERY WEAK from FIG. 21.

Figure 22:
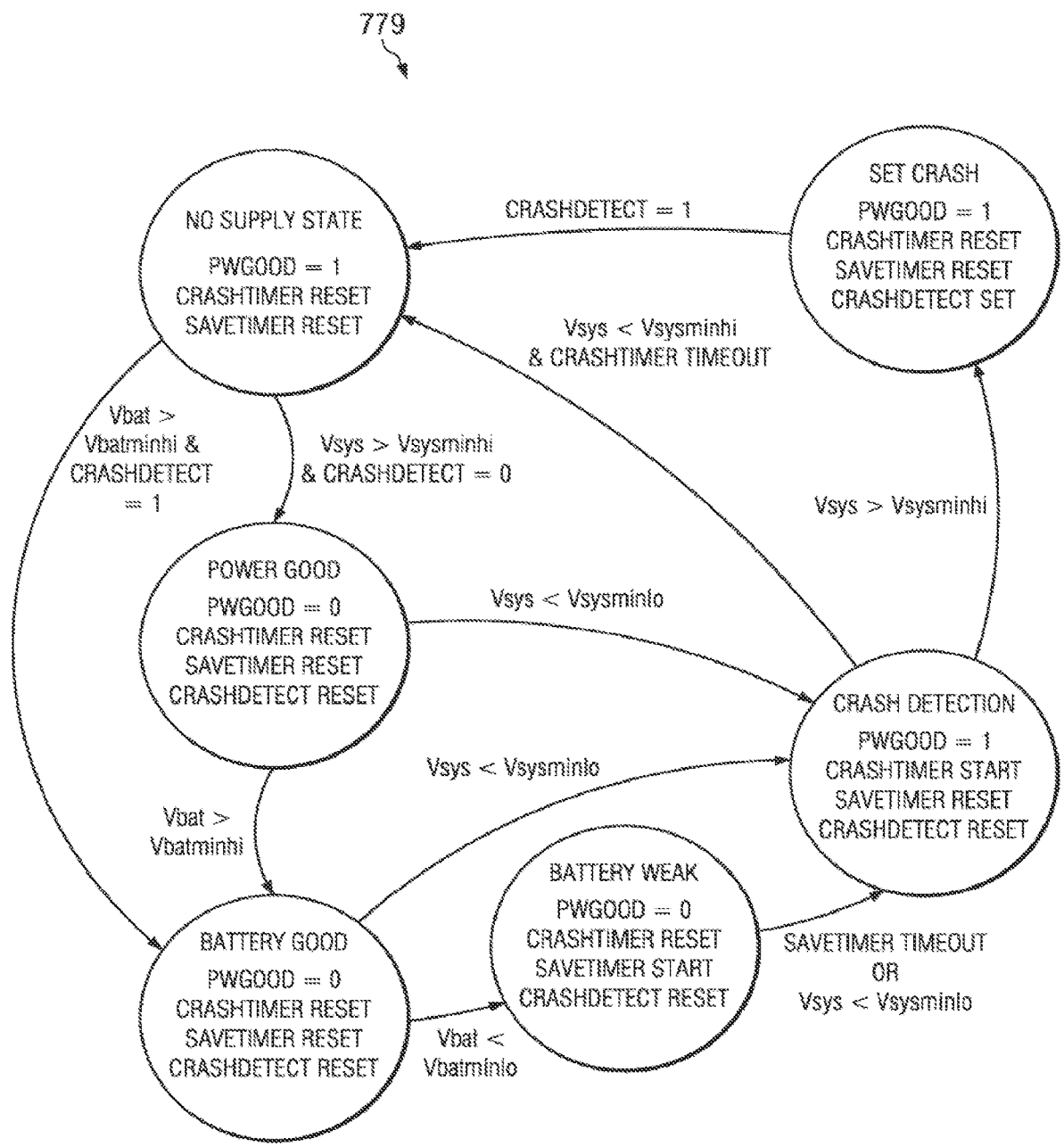
FIG. 22 is a state transition diagram of another state machine embodiment for use in the anti-crash loop mechanism of FIG. 20 and producing a power-good control signal PWGOOD.

In FIG. 22, a state machine 779 embodiment is a modified form of state machine 778 of FIG. 21 and of state machine 278 of FIG. 5B. In FIG. 22, a combined state NO SUPPLY is formed by combining the FIG. 21 states NO SUPPLY and CRASH and revising the transitions into and out of combined state NO SUPPLY in the general manner discussed in connection with FIG. 5B. Note, however, that the transition logic for (Vbat>Vbatminhi & crashdetect=1) takes operations from NO SUPPLY to BATTERY GOOD separately from the transition logic (Vsys>Vsysminhi & crashdetect=0) that takes operations from NO SUPPLY to POWER GOOD. Various interpretations and possible modifications of FIG. 22 can be made analogous to the discussion for FIG. 21.

Figure 23:
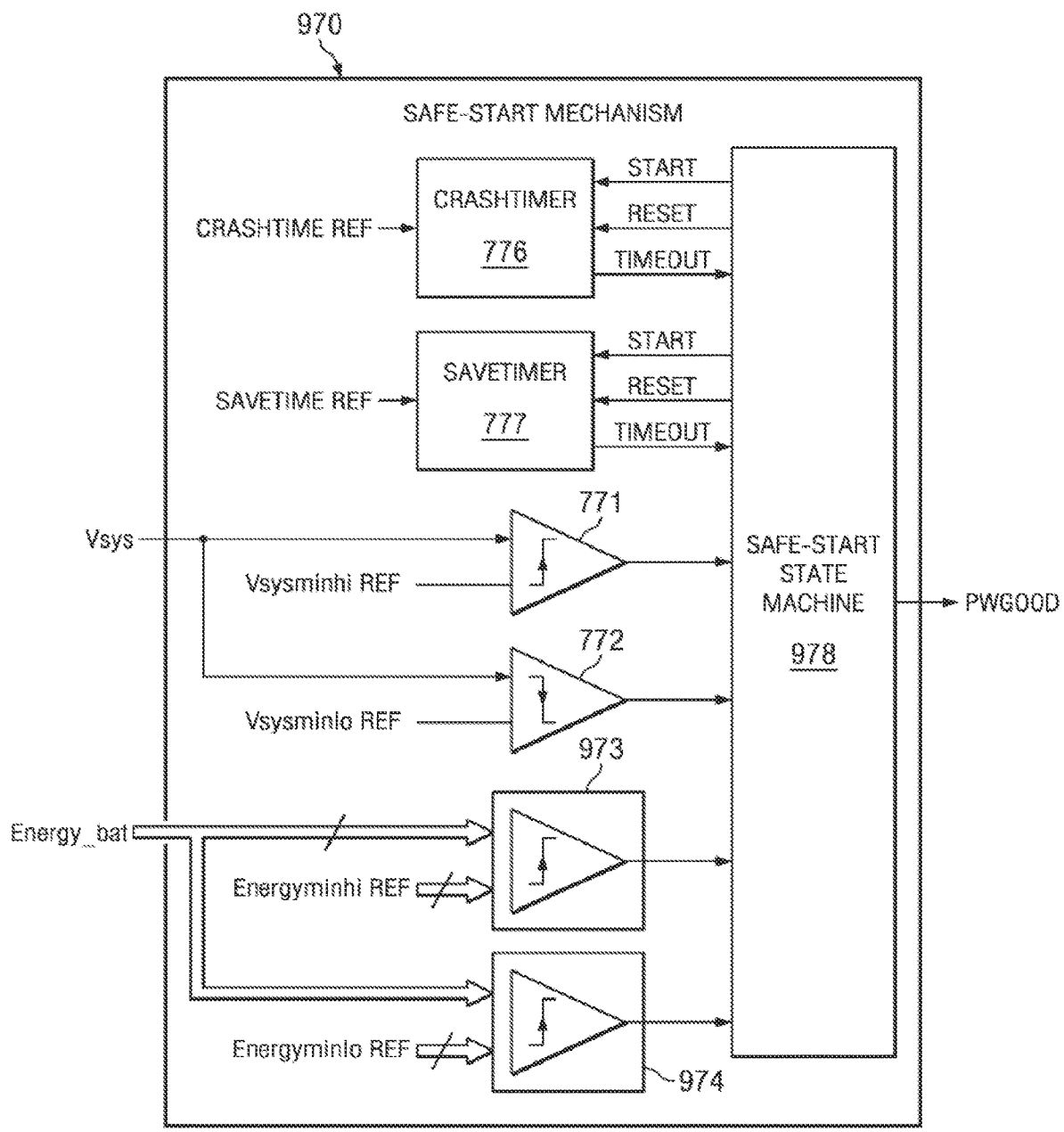
FIG. 23 is a block diagram of yet another anti-crash loop mechanism embodiment for use in the electronic devices of FIGS. 3, 9A, 9B, 10A, and 16A.

In FIG. 23, an alternative embodiment 970 revised from FIG. 20 can be provided when using advanced fuel-gauging as depicted in FIG. 3 or 9B. The Vbatminhi comparator 773 threshold of FIG. 20 is replaced by an Energyminhi comparator 973 threshold in FIG. 23. The Vbatminlo comparator 774 threshold of FIG. 20 is replaced by an Energyminlo comparator 974 threshold in FIG. 23. The Energyminlo threshold is set to the minimum battery accumulated energy needed by the system for saving context and user data and then shutting-down when operating from battery only (no charger adapter connected). Energyminlo reference can be a digital value representing any of 1) battery accumulated energy in Amp-hours (Ah) by accumulating a current measurement, 2) percentage X % of battery total capacity, 3) battery accumulated energy in accumulated Volt-Amps, or 4) remaining run-time in time units, e.g., seconds.

Figure 24:
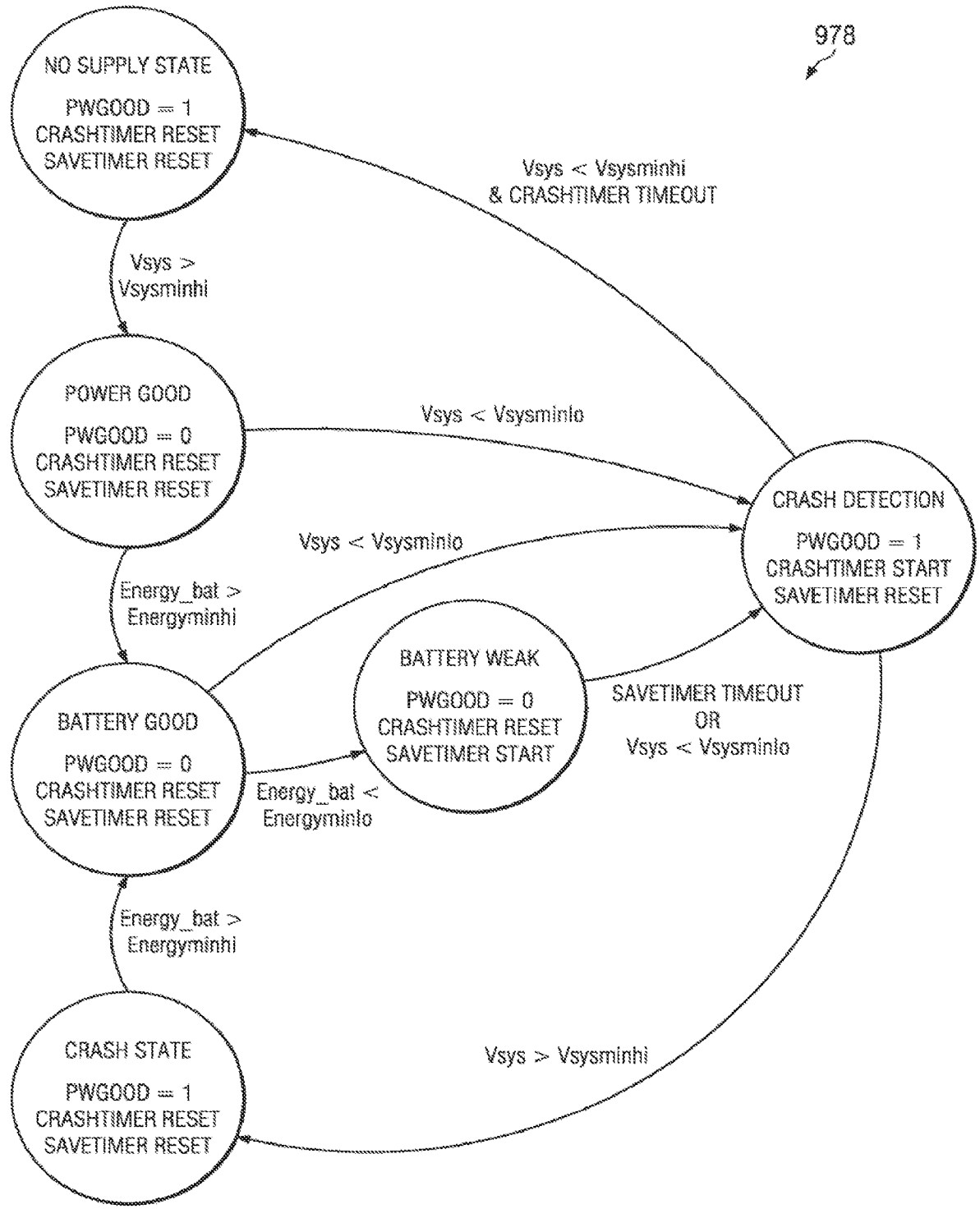
FIG. 24 is a state transition diagram of a state machine embodiment for use in the anti-crash loop mechanism of FIG. 23 and producing a power-good control signal PWGOOD.

In FIG. 24, these battery energy Energyminhi and Energyminlo conditions (Energy_bat>Energyminhi) and (Energy_bat<Energyminlo) are provided and used in a state machine 978 embodiment analogous to the state machine 778 arrangement of FIG. 21 with its Vbatminhi and Vbatminlo conditions. The description for the rest of FIG. 24 generally parallels the description of FIG. 21.

Figure 25:
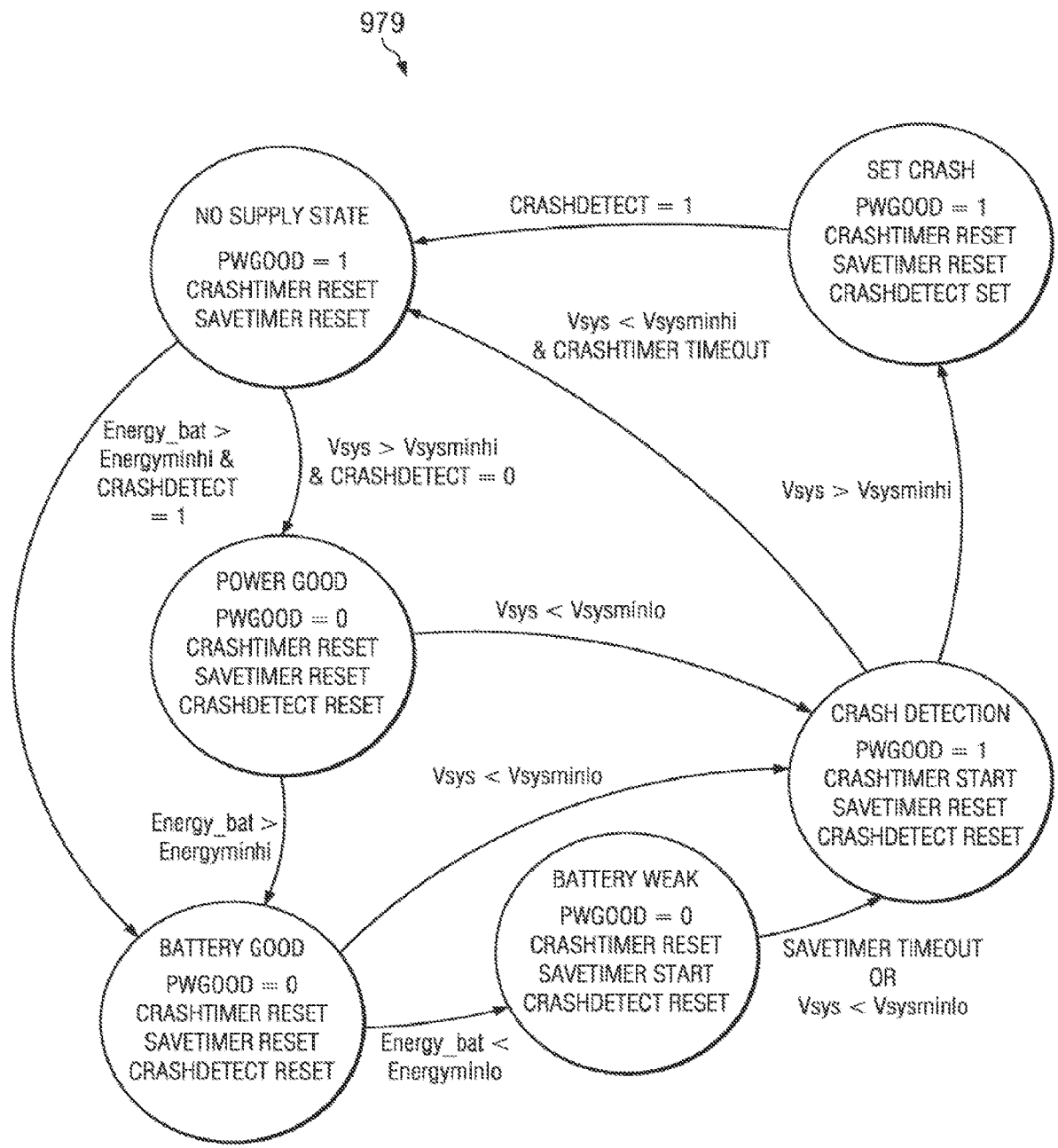
FIG. 25 is a state transition diagram of another state machine embodiment for use in the anti-crash loop mechanism of FIG. 23 and producing a power-good control signal PWGOOD.

In FIG. 25, a state machine 979 embodiment is a modified form of state machine 978 of FIG. 24. In FIG. 25, analogous to FIG. 22, a combined state NO SUPPLY is formed by combining the FIG. 24 states NO SUPPLY and CRASH and revising the transitions into and out of combined state NO SUPPLY in the general manner discussed in connection with FIG. 5B. Battery energy Energyminhi and Energyminlo conditions are provided in the state machine 979 analogous to the state machine 779 arrangement of FIG. 22 for Vbatminhi and Vbatminlo conditions. The description for the rest of FIG. 24 generally parallels the description of FIG. 22.

Figure 26:
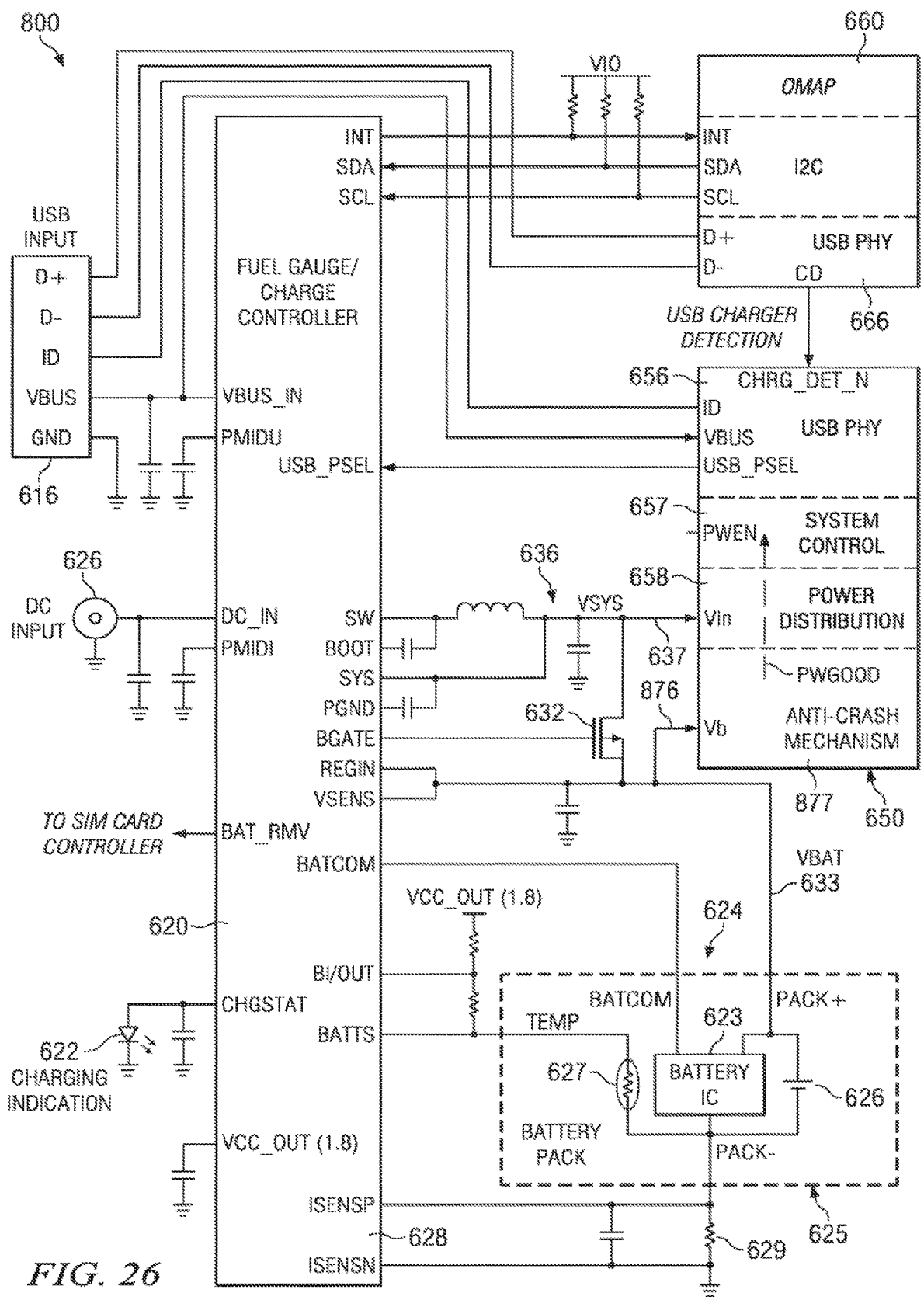
FIG. 26 is a partially-schematic, partially-block diagram of another electronic device embodiment having anti-crash protection such as described by any of FIGS. 3-6, 9-9E or other applicable detail Figures herein.

In FIG. 26, a block diagram and description of battery management of an application processor platform embodiment 800 are generally the same as for FIG. 16A, except that the anti-crash-loop mechanism is implemented as a block 877 in the IC 650 instead of the IC 620. The description of FIG. 26 is otherwise the same as FIG. 16A, and is therefore mostly omitted for conciseness. In FIG. 26, anti-crash-loop mechanism 877 has an input Vb for a line 876 connected to $V_{BAT}$ line 633. Anti-crash-loop mechanism 877 is of any type taught herein that is responsive to $V_{BAT}$ and $V_{SYS}$, and in FIG. 26 mechanism 877 has the output line PWGOOD coupled internally to input PWEN in system control 657 instead of externally from IC 620. A comparator like 171-174 can have a transistor included in anti-crash mechanism 877, e.g., that makes a gate/source comparison of voltage $V_{SYS}$ with a predetermined threshold Vsysminhi, Vsysminlo, and voltage $V_{BAT}$ with a predetermined threshold Vbatminhi, Vbatminlo. A given predetermined threshold voltage for use in the comparison is suitably provided in response to a digitally-stored predetermined threshold value by a simple digital-to-analog converter DAC in anti-crash mechanism 877. The DAC can be simple because of the few inequalities or relationships that make the threshold values relatively non-critical.

In view of the Figures like 9A, 16A and 26, still other variations of embodiments can also be provided, such as combining the state transition diagrams provided for illustration herein with a FSM 180 state machine, putting the anti-crash loop mechanism 887 into the IC 660 (e.g., associated with a power, resets, and control module PRCM) or situating the anti-crash loop mechanism 887 in a battery IC 623 physically inside a battery enclosure or battery pack itself. Different locations for the anti-crash loop mechanism may involve a different mix of circuitry type and pinout of a given chip like 620, 650, 660, 623 that can commend a particular location of a anti-crash loop mechanism in a particular product or application.

It is contemplated that the skilled worker provides and uses the herein-described circuits or cores in various types of integrated circuit chips, or provided into one single integrated circuit chip, in a manner optimally combined or partitioned between the chips, to the extent needed by any of the applications supported by a personal computer(s) with microprocessors, various modems, cellular telephones, radios and televisions, Internet audio/video content players, fixed and portable entertainment units, tablets, video phones, routers, pagers, personal digital assistants (PDA), organizers, scanners, faxes, copiers, household appliances, office appliances, embedded devices with microcontrollers coupled to controlled mechanisms for fixed, mobile, personal, robotic and/or automotive use, combinations thereof, electronic circuits generally and other application products now known or hereafter devised for increased, partitioned or selectively determinable advantages.

The embodiments may be used with a variety of different kinds of rechargeable batteries such as lithium-ion, nickel metal hydride, etc., and/or with supercapacitors (super-caps) alone or in combination with batteries. Various types of chargers 105 and internal circuits such as DC/DC limiter 120 and charging circuit 130 may be used in or with different embodiments. In different embodiments, some of those circuits may be omitted or combined with others. While a linear charger 130 often offers desirable low noise and simplicity, especially for mobile applications, other types of chargers circuits such as pulse chargers or switch-mode chargers can also be used with some other embodiments. Various parameters such as voltage thresholds, ramp rates, current limits, time limits, and otherwise are suitably configured appropriately to form various embodiments and combinations of embodiments.

ASPECTS (See explanatory notes at end of this section)

21A. The mobile device claimed in claim 21 wherein said powering circuit includes a DC current limiting circuit coupled between said electrical input and said voltage output.

21B. The mobile device claimed in claim 21 wherein said powering circuit includes a linear charging circuit coupled between said voltage output and said charging output.

21C. The mobile device claimed in claim 22 wherein said linear charging circuit is operable so that if the voltage at said charging output exceeds the voltage at said voltage output, then substantial electrical current is able to flow from said charging output to said voltage output.

21D. The mobile device claimed in claim 21 wherein said powering circuit includes a DC current limiting circuit coupled between said electrical input and said voltage output, and further includes a linear charging circuit coupled between said voltage output and said charging output.

31A. The control process claimed in claim 31 further comprising using a third state to also activate the control output to represent the power-good condition, and transitioning from the first state to the third state when the battery line voltage is less than a fourth threshold that is less than the third threshold, and transitioning from the third state to the second state at least upon persistence of the third state for a predetermined period of time.

31A1. The control process claimed in claim 31A wherein the transitioning from the third state to the second state is also responsive to the system line voltage becoming less than approximately the first threshold, in case such occurs before the third state persists for the predetermined period of time.

33A. The control process claimed in claim 33 further comprising using a fourth state, and transitioning from the second state in case the system line voltage exceeds the second threshold to the fourth state, the fourth state setting a flag, and then transitioning from the fourth state to the third state when that flag is set.

33A1. The control process claimed in claim 33A wherein the process includes transitioning from the third state to the first state according to a voltage condition that also depends on whether the flag is set or not.

33A2. The control process claimed in claim 33A wherein the process includes transitioning from the third state to the first state according to a voltage logic in cases of: (i) system line voltage becomes greater than approximately the second threshold when the flag is not set, and (ii) the battery line voltage is greater than a third threshold when the flag is set.

31A3. The control process claimed in claim 33A wherein the process has a fifth state that is coupled to activate the control output to represent the power-good condition, and the process includes transitioning from the third state selectively to a given one of the first state and the fifth state, depending on voltage conditions that also include whether the flag is set or not.

Notes: Aspects are description paragraphs that might be offered as claims in patent prosecution. The above dependently-written Aspects have leading digits and may have internal dependency designations to indicate the claims or aspects to which they pertain. The leading digits and alphanumerics indicate the position in the ordering of claims at which they might be situated if offered as claims in prosecution.

Process diagrams herein are representative of flow diagrams for operations of any embodiments using any one, some or all of hardware, software, or firmware, and processes of manufacture thereof. Flow diagrams, state transition diagrams, and block diagrams are each interpretable as representing structure and/or process. Transitions and transitioning should be interpreted broadly and can be either direct between identified states or made between them via one or more intermediate states. While this invention has been described with reference to illustrative embodiments, this description is not to be construed in a limiting sense. Various modifications and combinations of the illustrative embodiments, as well as other embodiments of the invention may be made. Some embodiments may have fewer, different or more than all the states and/or fewer, different or more than all the transitions compared to state machines or otherwise effective circuits in illustrated embodiments. The terms including, includes, having, has, with, or variants thereof are used in the detailed description and/or the claims to denote non-exhaustive inclusion in a manner similar to the word 'comprising' or 'characterised.'

While various embodiments of the present invention have been described above, it should be understood that they have been presented by way of example only, and not of limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. An electronic circuit comprising:
   a powering circuit having an electrical input, a charging output and a voltage output;
   a functional electronic circuit coupled to the voltage output and configured to be controlled based on a state of a control signal; and
   a safe-start circuit configured to:
      when a system voltage at the voltage output drops below a first threshold, deassert the control signal, and cause a crash timer to activate for a first period of time, and
      in response to the system voltage increasing above a second threshold during the first period of time, cause the functional electronic circuit to be in a low-power state until detecting a first charging condition based on the charging output.

2. The electronic circuit of claim 1, wherein the safe-start circuit is configured to:
   detect a charger detachment event when the system voltage remains below the second threshold during the first period of time;
   in response to detecting the charger detachment event, deassert the control signal; and
   after the charger detachment event, and in response to detecting a next charger attachment event, assert the control signal.

3. The electronic circuit of claim 1, wherein the safe-start circuit is configured to, in response to the system voltage remaining below the second threshold during the first period of time, transition into a circuit state indicative of no-supply.

4. The electronic circuit of claim 1, further comprising a power management circuit configured to control the functional electronic circuit based on the control signal.

5. The electronic control circuit claimed in of claim 4, wherein the safe-start circuit is coupled by a control output line to the power management circuit, wherein the control output line is configured to carry the control signal.

6. The electronic circuit of claim 5, further comprising:
   a battery connector;
   a first package enclosing the safe-start circuit and the powering circuit; and
   a second package enclosing the power management circuit, wherein:
      the charging output is coupled to the battery connector, and
      the safe-start circuit is coupled to the battery connector.

7. The electronic circuit of claim 1, wherein the powering circuit is coupled to a USB connector for entry of power from the USB connector via the electrical input into the powering circuit.

8. The electronic circuit of claim 1, further comprising a battery gauge circuit configured to, in cooperation with the safe-start circuit, control a charging of a battery coupled to the charging output.

9. The electronic circuit of claim 1, wherein the safe-start circuit comprises a bad-battery detection circuit.

10. The electronic circuit of claim 1, further comprising a serial data transfer physical layer circuit and a serial data transfer connector coupled to the serial data transfer physical layer circuit, the serial data transfer physical layer circuit coupled to the functional electronic circuit and to the safe-start circuit.

11. The electronic circuit of claim 1, wherein the low-power state of the functional electronic circuit is a power down state.

12. The electronic circuit of claim 1, wherein the second threshold is higher than the first threshold.

13. The electronic circuit of claim 1, wherein detecting the first charging condition comprises detecting a battery voltage at the charging output being higher than a third threshold.

14. The electronic circuit of claim 13, wherein the third threshold is lower than the second threshold and higher than the first threshold.

15. The electronic circuit of claim 2, wherein detecting the next charger attachment event comprises detecting the next charger attachment event based on the system voltage.

16. The electronic circuit of claim 1, wherein the powering circuit comprises:
a DC/DC circuit having an input coupled to the electrical input, and an output coupled to the voltage output; and
a linear charger having an input coupled to the voltage output, and an output coupled to the charging output.

17. The electronic circuit of claim 1, wherein the safe-start circuit comprises:
a first comparator having a first input coupled to the voltage output, and a second input configured to receive the first threshold; and
a second comparator having a first input coupled to the voltage output, and a second input configured to receive the second threshold.

18. The electronic circuit of claim 17, wherein the safe-start circuit further comprises a state machine having a first input coupled to an output of the first comparator, a second input coupled to an output of the second comparator, a third input coupled to an output of the crash timer, and an output configured to generate the control signal.

19. The electronic circuit of claim 18, wherein the safe-start circuit further comprises a third comparator having a first input coupled to the charging output, and an output coupled to the state machine.

20. The electronic circuit of claim 18, wherein the safe-start circuit further comprises an energy level digital comparator having a first input coupled to the charging output, and an output coupled to the state machine.

* * * * *